US012582264B2

(12) United States Patent　　(10) Patent No.:　US 12,582,264 B2

Roberts et al.　　(45) Date of Patent:　Mar. 24, 2026

(54) CONTAINER FOR FOOD PROCESSING SYSTEM

(71) Applicant: SharkNinja Operating LLC, Needham, MA (US)

(72) Inventors: Matt Roberts, Medfield, MA (US); Edward Lockyer, Pimlico (GB); Christopher William Hedges, Hampshire (GB)

(73) Assignee: SharkNinja Operating LLC, Needham, MA (US)

( * ) Notice: Subject to any disclaimer, the term of this patent is extended or adjusted under 35 U.S.C. 154(b) by 874 days.

(21) Appl. No.: 17/680,664

(22) Filed: Feb. 25, 2022

(65) Prior Publication Data

US 2023/0148799 A1　　May 18, 2023

Related U.S. Application Data

(60) Provisional application No. 63/280,351, filed on Nov. 17, 2021.

(51) Int. Cl.
　　*A47J 43/00*　　　(2006.01)
　　*A47J 43/046*　　 (2006.01)
　　　　　　(Continued)

(52) U.S. Cl.
　　CPC ......... *A47J 43/0727* (2013.01); *A47J 43/046* (2013.01); *A47J 43/0722* (2013.01);
　　　　　　(Continued)

(58) Field of Classification Search
　　CPC ... A47J 43/0727; B01F 27/091; B01F 27/808; B01F 27/90; B01F 2101/06
　　See application file for complete search history.

(56) References Cited

U.S. PATENT DOCUMENTS

| 1,174,828 | A | 3/1916 | Copeland |
| D200,494 | S | 3/1965 | Bezark |

(Continued)

FOREIGN PATENT DOCUMENTS

| CA | 164836 | 8/2016 |
| CN | 204734381 | 11/2015 |

(Continued)

OTHER PUBLICATIONS

Ninja SS101 Nutrient Extractor, posted at Amazon.com on Aug. 18, 2020, [site visited Aug. 8, 2022]. Available from internet, URL: <https://www.amazon.com/Ninja-SS 101-smartTORQU E-multi-functions-Stainless/dp/B08C1 DJ N R2/> (Year: 2020).

(Continued)

*Primary Examiner* — Anshu Bhatia

(74) *Attorney, Agent, or Firm* — The Webb Law Firm

(57)　　　　ABSTRACT

An attachment for use with a food processing system is provided. The attachment includes a container body having a sidewall, a first end configured to be mounted to a food processing base, and a second end remote from the first end. The first end being open and the second end being partially closed. The attachment further includes a first agitating member including one or more blades. The first agitating member is receivable at the first end. The attachment also includes a second agitating member receivable at the second end including a fluid agitator. The fluid agitator is configured to direct a fluid to one or more regions of the container body.

9 Claims, 40 Drawing Sheets

(51) Int. Cl.

| | |
|---|---|
| *A47J 43/07* | (2006.01) |
| *A47J 43/08* | (2006.01) |
| *B01F 27/091* | (2022.01) |
| *B01F 27/808* | (2022.01) |
| *B01F 27/90* | (2022.01) |
| *B01F 101/06* | (2022.01) |

(52) U.S. Cl.

CPC ........... *A47J 43/085* (2013.01); *B01F 27/091* (2022.01); *B01F 27/808* (2022.01); *B01F 27/90* (2022.01); *B01F 2101/06* (2022.01)

(56) References Cited

U.S. PATENT DOCUMENTS

| | | | |
|---|---|---|---|
| 3,373,975 A | | 3/1968 | Congdon |
| 3,415,497 A | | 12/1968 | Johnson |
| 3,417,972 A | | 12/1968 | Conway |
| 3,434,518 A | | 3/1969 | Motis |
| 3,537,691 A | | 11/1970 | Miwa et al. |
| 3,627,008 A | | 12/1971 | Samuelian |
| 3,933,315 A | | 1/1976 | Popeil |
| 3,957,215 A | | 5/1976 | Otto |
| 4,100,612 A | | 7/1978 | Hoover et al. |
| 4,417,506 A | | 11/1983 | Herbst |
| D281,945 S | | 12/1985 | Boyce et al. |
| 4,561,782 A | | 12/1985 | Jacobsen et al. |
| 4,878,627 A | | 11/1989 | Otto |
| 4,946,285 A | | 8/1990 | Vennemeyer |
| D327,256 S | | 6/1992 | Bannister et al. |
| 5,302,021 A | | 4/1994 | Jennett et al. |
| 5,360,170 A | * | 11/1994 | Cartellone .......... A47J 43/0705 |
| | | | 241/282.1 |
| 5,383,613 A | | 1/1995 | Sundquist |
| 5,549,385 A | | 8/1996 | Goncalves |
| 6,527,433 B2 | | 3/2003 | Daniels, Jr. |
| 6,585,179 B2 | | 7/2003 | Weibel et al. |
| D489,501 S | | 5/2004 | Dretzka |
| 6,935,767 B2 | | 8/2005 | Nikkhah |
| 6,994,465 B2 | | 2/2006 | Tague et al. |
| D517,862 S | | 3/2006 | Sands |
| D518,994 S | | 4/2006 | Lin |
| 7,040,799 B2 | | 5/2006 | Pryor |
| 7,100,854 B2 | | 9/2006 | Aby-Eva et al. |
| D545,126 S | | 6/2007 | White |
| D595,084 S | | 6/2009 | Metaxatos et al. |
| 7,648,264 B2 | | 1/2010 | Breviere et al. |
| D624,359 S | | 9/2010 | Schleinzer |
| 8,056,848 B1 | | 11/2011 | Liang |
| D655,133 S | | 3/2012 | Brinckerhoff et al. |
| D668,114 S | | 10/2012 | Cozzolino et al. |
| D684,817 S | | 6/2013 | Leavitt |
| D690,152 S | | 9/2013 | Palermo et al. |
| D690,159 S | | 9/2013 | Gursel et al. |
| D700,013 S | | 2/2014 | Chu |
| 8,794,822 B2 | | 8/2014 | Serra |
| D725,969 S | | 4/2015 | Garner |
| D734,988 S | | 7/2015 | Smith |
| D737,629 S | | 9/2015 | Sands |
| D738,685 S | | 9/2015 | Sands |
| D749,893 S | | 2/2016 | Bazzicalupo et al. |
| D750,436 S | | 3/2016 | Hopkins et al. |
| D758,799 S | | 6/2016 | Audette |
| D760,026 S | | 6/2016 | Smith et al. |
| D761,056 S | | 7/2016 | Kemker |
| D770,228 S | | 11/2016 | Pan |
| D770,231 S | | 11/2016 | Hume et al. |
| D775,892 S | | 1/2017 | Smith |
| 9,560,936 B2 | | 2/2017 | Wade et al. |
| D782,866 S | | 4/2017 | Suess et al. |
| D783,353 S | | 4/2017 | Smith |
| D783,355 S | | 4/2017 | Tu |
| 9,656,227 B2 | | 5/2017 | Paget |
| D788,527 S | | 6/2017 | Smith et al. |
| D790,275 S | | 6/2017 | Audette |
| D793,803 S | | 8/2017 | Patel |

| | | | |
|---|---|---|---|
| 9,750,372 B2 | | 9/2017 | Foxlee et al. |
| 9,770,133 B2 | | 9/2017 | Dickson, Jr. et al. |
| D798,668 S | | 10/2017 | Steel |
| D800,498 S | | 10/2017 | Lee |
| D800,499 S | | 10/2017 | Repac |
| D803,001 S | | 11/2017 | Bodum |
| D803,622 S | | 11/2017 | Tu |
| D813,604 S | | 3/2018 | Tu |
| D813,606 S | | 3/2018 | O'Nan et al. |
| D817,082 S | | 5/2018 | Lee |
| D817,701 S | | 5/2018 | Ho |
| D828,080 S | | 9/2018 | Ou et al. |
| D832,641 S | | 11/2018 | Sapire |
| D836,385 S | | 12/2018 | Arzunyan |
| D839,042 S | | 1/2019 | Krivos et al. |
| D844,374 S | | 4/2019 | McConnell et al. |
| D846,339 S | | 4/2019 | Smith |
| D852,574 S | | 7/2019 | McConnell et al. |
| 10,357,131 B2 | | 7/2019 | Dickson, Jr. et al. |
| 10,383,482 B1 | | 8/2019 | Pamplin |
| 10,427,116 B2 | | 10/2019 | Altenritter et al. |
| D865,935 S | | 11/2019 | Hu |
| D871,831 S | | 1/2020 | Liu |
| D877,652 S | | 3/2020 | Hung |
| D878,862 S | | 3/2020 | Kettavong et al. |
| D885,116 S | | 5/2020 | Krivos et al. |
| 10,638,884 B2 | | 5/2020 | Zakowski et al. |
| 10,653,274 B2 | | 5/2020 | Brunner |
| D889,191 S | | 7/2020 | Finnance |
| D889,192 S | | 7/2020 | Finnance |
| 10,792,630 B1 | | 10/2020 | Pamplin |
| 10,799,070 B2 | | 10/2020 | Koscak |
| 10,905,285 B2 | | 2/2021 | Zakowski |
| D913,033 S | | 3/2021 | Jones |
| D914,453 S | | 3/2021 | Kettavong et al. |
| D919,359 S | | 5/2021 | Seo et al. |
| D921,418 S | | 6/2021 | Thun et al. |
| D921,419 S | | 6/2021 | Yang |
| D925,271 S | | 7/2021 | Palladino et al. |
| D925,981 S | | 7/2021 | McConnell et al. |
| D927,254 S | | 8/2021 | Chen |
| D932,242 S | | 10/2021 | Finnance |
| 11,172,786 B2 | | 11/2021 | Tu |
| D937,624 S | | 12/2021 | Tu et al. |
| D938,220 S | | 12/2021 | Tu et al. |
| 11,241,119 B2 | | 2/2022 | Roberts et al. |
| D948,940 S | | 4/2022 | Pamplin |
| D951,007 S | | 5/2022 | Yang |
| D956,471 S | | 7/2022 | Tu |
| D969,535 S | | 11/2022 | Tu et al. |
| D974,841 S | | 1/2023 | Pamplin |
| D979,321 S | | 2/2023 | Coakley |
| D982,971 S | | 4/2023 | Tu |
| D984,210 S | | 4/2023 | Tu et al. |
| D985,330 S | | 5/2023 | Tu et al. |
| D992,338 S | | 7/2023 | Tu et al. |
| D999,020 S | | 9/2023 | Tu et al. |
| D999,589 S | | 9/2023 | Tu et al. |
| 11,779,162 B1 | | 10/2023 | Full |
| 2003/0099154 A1 | | 5/2003 | Daniels |
| 2004/0206837 A1 | | 10/2004 | Lee |
| 2004/0264294 A1 | | 12/2004 | Pryor |
| 2005/0205704 A1 | | 9/2005 | Yurchenco et al. |
| 2009/0129200 A1 | | 5/2009 | Breviere |
| 2009/0193982 A1 | | 8/2009 | Chou |
| 2012/0080549 A1 | | 4/2012 | Rukavina |
| 2014/0241109 A1 | | 8/2014 | Paget |
| 2015/0036458 A1 | | 2/2015 | Holm |
| 2015/0250360 A1 | | 9/2015 | Hyp |
| 2015/0272394 A1 | | 10/2015 | Lin et al. |
| 2015/0272395 A1 | | 10/2015 | Dahlback et al. |
| 2015/0374175 A1 | | 12/2015 | Garr |
| 2016/0045073 A1 | | 2/2016 | Kozlowski et al. |
| 2016/0256010 A1 | | 9/2016 | Le |
| 2017/0035250 A1 | | 2/2017 | Pan |
| 2017/0224167 A1 | * | 8/2017 | Zakowski ........... A47J 43/0716 |
| 2017/0224168 A1 | | 8/2017 | Lin et al. |
| 2018/0014693 A1 | | 1/2018 | Dickson, Jr. |
| 2018/0028020 A1 | | 2/2018 | Sapire et al. |

(56) References Cited

U.S. PATENT DOCUMENTS

| 2018/0140137 A1 | 5/2018 | Barnard et al. |
| 2019/0000275 A1 | 1/2019 | Sapire |
| 2019/0117013 A1 | 4/2019 | Kim |
| 2019/0142221 A1 | 5/2019 | Miller et al. |
| 2020/0078749 A1 | 3/2020 | Yuan et al. |
| 2020/0113388 A1 | 4/2020 | Sapire |
| 2020/0281409 A1 | 9/2020 | Bannister et al. |
| 2021/0046437 A1* | 2/2021 | Burroughs .......... B01F 35/3202 |
| 2021/0177210 A1 | 6/2021 | Tu |
| 2021/0302016 A1 | 9/2021 | Pan |
| 2022/0142409 A1 | 5/2022 | Beckstrom et al. |
| 2023/0008111 A1 | 1/2023 | LePori |

FOREIGN PATENT DOCUMENTS

| CN | 206213931 | 6/2017 |
| CN | 209172094 | 7/2019 |
| DE | 1296607 | 6/1969 |
| EM | 090153 | 3/2016 |
| EP | 2394546 A1 | 12/2011 |
| EP | 3578089 | 12/2019 |
| GE | 795-0004 | 12/2018 |
| IL | 62842 | 1/2018 |
| JP | H10-117944 | 5/1985 |
| JP | S60194964 | 12/1985 |
| JP | H02-116324 | 5/1990 |
| JP | H02-195921 | 8/1990 |
| JP | 2014-136046 | 7/2014 |
| KR | 300867691.0000 | 8/2016 |
| KR | 20200103227 A | 9/2020 |
| TW | 177516-0001 | 8/2016 |
| WO | 2018085369 A1 | 5/2018 |

OTHER PUBLICATIONS

Notice of Allowance mailed Jul. 29, 2022, for related JP Application No. 2021-008608, 2 pgs.

Notice of Reasons for Rejection mailed Jul. 12, 2022, for related JP Application No. 2021-101776, 7 pgs.

AxPower Extractor Blade, posted at Amazon.com on Sep. 21, 2019, [site visited Jul. 23, 2022]. Available from internet, URL: <https://www.amazon.com/AxPower-Extractor-Blades-Replacement-Bottom-Blender/dp/B07Y682 RVH/> (Year: 2019).

9Lucky Tech Blender Replacement Nutri Ninja, posted at Amazon.com on Jan. 12, 2020, [site visited Jul. 23, 2022]. Available from internet, URL: <https://www.amazon.com/dp/B083RS4JSK/> (Year: 2020).

Feilifan Blender Blade for Ninja Blender, posted at Amazon.com on Aug. 27, 2020, [site visited Jul. 23, 2022]. Available from internet, URL: <https://www.amazon.com/dp/B09WCN91 N1/> (Year: 2020).

* cited by examiner

CONTAINER FOR FOOD PROCESSING SYSTEM

CROSS-REFERENCE TO RELATED APPLICATIONS

This application claims priority to and benefit of U.S. Provisional Application No. 63/280,351, filed Nov. 17, 2021, entitled CONTAINER FOR FOOD PROCESSING SYSTEM, the entire contents of which are incorporated herein by reference for all purposes.

TECHNICAL FIELD

Aspects of the present disclosure relate to a blender and, more particularly, to a container of a blender configured to receive one or more food items therein.

BACKGROUND

Blenders are commonly used to process many different food products, including liquids, solids, semi-solids, gels and the like. It is well-known that blenders are useful devices for blending, cutting, and dicing food products in a wide variety of commercial settings, including home kitchen use, professional restaurant or food services use, and large-scale industrial use. They offer a convenient alternative to chopping or dicing by hand, and often come with a range of operational settings and modes adapted to provide specific types or amounts of food processing, e.g., as catered to particular food products.

When blending thick or frozen ingredients, the ingredients will often stick to the sidewalls of the container, resulting in areas of unprocessed food. This accumulation at the sidewalls of the container, also known as cavitation, occurs because the ingredients are too thick to form a vortex within the container which typically facilitates movement of the ingredients towards a food processing blade during a blending operation. Accordingly, there is a need for efficient and unobtrusive ways to release accumulated ingredients along the sidewalls for further processing during blending operations.

SUMMARY

The application, in various implementations, addresses deficiencies associated with the performance of blenders to produce more uniform processed food.

This application, in some implementations, describes an exemplary attachment for a food processing system that can blend thick and frozen ingredients and minimize the accumulation of the ingredients on the sidewalls of the container, resulting in more uniform processed food. In one configuration, the attachment includes a pump configured to direct a fluid, e.g., air, toward the sidewalls and/or blades. The pump is arranged to take in the fluid via an inlet when an actuator is extended and/or pulled up which, in some configurations, fills a pump reservoir. If the ingredients stick to or accumulate on the sidewalls of the container, a user can actuate and/or press down on the actuator to expel the fluid in the pump chamber via an outlet into a region of the interior chamber of the container. Such an action releases the ingredients from the sidewalls to be processed again to form a uniform food product. A user-operated and/or actuated fluid agitation system or method provides at least a technical advantage of enabling more efficient, yet less obtrusive, releasing of ingredients from a sidewall during the blending process.

In one aspect, an attachment for use with a food processing system includes a container body having a sidewall, a first end configured to be mounted to a food processing base, and a second end remote from the first end. The first end is open and the second end is partially closed. The attachment further includes a first agitating member including one or more blades which is receivable at the first end. In addition, the attachment includes a second agitating member receivable at the second end. The second agitating member includes a fluid agitator configured to direct a fluid to one or more portions of the container body.

In some implementations, the one or more portions of the container body includes at least one of the sidewall, the first agitating member, the second agitating member, the first end, and the second end. The fluid agitator may include a pump. The fluid agitator may include a manual actuator to direct the fluid to the one or more regions. In some implementations, the fluid agitator includes a diaphragm. The fluid may include air, water, and/or an ingredient-derived or related fluid such as milk, juice, coffee, and so on.

In some implementations, the fluid agitator includes an electronic actuator to direct the fluid to the one or more regions. The fluid agitator may include an inlet in fluid communication with an exterior atmosphere surrounding the container body. The inlet is in fluid communication with a chamber the container body. In one implementation, the chamber is defined by the container body.

In some implementations, the one or more blades of the first agitating member include a first plurality of holes configured to expel fluid toward the sidewall to release food from the sidewall. The second agitating member may include a blade and/or paddle. The blade and/or paddle may include a second plurality of holes configured to direct the fluid toward the chamber.

In another aspect, an attachment for use with a food processing system includes a container body having a sidewall, a first end configured to be mounted to a food processing base, and a second end remote from the first end. The first end is open and the second end includes an end wall oriented transverse to the sidewall making a unitary structure. The attachment further includes a chamber defined by the container body and a first agitating member including one or more blades and receivable at the first end. Further, the attachment includes a second agitating member receivable at the second end. The second agitating member includes a fluid agitator configured to direct a fluid to one or more regions of the chamber of the container body.

In some implementations, the fluid agitator includes an inlet in fluid communication with an exterior atmosphere surrounding the container body. The inlet may be in fluid communication with a chamber the container body. The one or more blades of the first agitating member may include a first plurality of holes configured to expel fluid toward the sidewall to release food from the sidewall. The second agitating member may include a blade and/or paddle. The blade and/or paddle may include a second plurality of holes configured to direct the fluid toward the chamber. The fluid agitator may include a pump. This application, various implementations, describes an exemplary attachment for a food processing system that can blend thick or frozen ingredients and/or minimize the accumulation of the ingredients to the sidewalls of the container, resulting in more uniform processed food. In some implementations, the attachment includes a vibrator to vibrate the container while the food is being processed to loosen or scrape ingredients that are stuck to the sidewalls of the container. Further, the attachment may include a motor on top that automatically rotates an agitator including paddles or blades in one or more directions during operations of the food processor. Such an action releases the ingredients from the sidewalls to be processed again to form a uniform food product. Motor-operated or spring-actuated fluid agitation systems or methods provide at least a technical advantage of enabling more efficient, yet less obtrusive, releasing of ingredients from a sidewall during the blending process.

In a further aspect, an attachment for use with a food processing system includes a container body having a sidewall, a first end configured to be mounted to a food processing base, and a second end remote from the first end. The first end is open and the second end includes an end wall oriented transverse to the sidewall making a unitary structure. The attachment further includes a chamber defined by the container body and a first agitating member including one or more blades and receivable at the first end. Further, the attachment includes a fluid agitator located at an exterior of the chamber and configured to direct a fluid to one or more regions of the chamber of the container body.

This application, various implementations, also describes an exemplary attachment for a food processing system that can blend thick or frozen ingredients and/or minimize the accumulation of the ingredients to the sidewalls of the container, resulting in more uniform processed food. In some implementations, the attachment includes a vibrator to vibrate the container while the food is being processed to loosen or scrape ingredients that are stuck to the sidewalls of the container. Further, the attachment may include a motor on top that automatically rotates an agitator including paddles or blades in one or more directions during operations of the food processor. Such an action releases the ingredients from the sidewalls to be processed again to form a uniform food product. Motor-operated or spring-actuated fluid agitation systems or methods provide at least a technical advantage of enabling more efficient, yet less obtrusive, releasing of ingredients from a sidewall during the blending process.

In one aspect, an attachment for use with a food processing system includes a container body having a sidewall, a first end configured to be mounted to a food processing base, and a second end remote from the first end. The first end is open and the second end includes an end wall oriented transverse to the sidewall to make a unitary structure. The attachment further includes a first agitator having one or more blades which are receivable at the first end. Also, the attachment includes a second agitator receivable at the second end. The second agitator is extendable into the chamber through the second end. Further, the attachment includes an electric motor operably coupled to the second agitator such that the second agitator rotates in response to rotation of the electric motor. The electric motor rotates in a first direction during a first period of operation of the food processing system and rotates in a second direction opposite the first direction during a second period of operation of the food processing system.

In some implementations, the electric motor may be located exterior of the container body. The electric motor may be coupled to the second agitator via a drive shaft such that a portion of the second agitator is positioned within the chamber. One rotation of the electric motor may correspond to one rotation of the second agitator. The electric motor may be coupled to the second agitator via a plurality of gears. The plurality of gears may enable one rotation of the electric motor to correspond to less than one rotation of the second agitating member. The plurality of gears may enable one rotation of the electric motor to correspond to more than one rotation of the second agitating member. The drive shaft of the electric motor may include at least one tooth engaged with a lock. The second end may be closed to the surrounding environment by the device.

In another aspect, an attachment for use with a food processing system, includes a container body having a sidewall, a first end configured to be mounted to a food processing base, and a second end remote from the first end. The first end is open and the second end is at least partially closed. Further, the attachment includes a first agitator having one or more blades that is receivable at the first end. In addition, the attachment includes a vibrator in contact with the container body. The vibrator is configured to vibrate the container body at least during a part of an operation of the food processing system.

In some implementations, the vibrator includes a sonic vibrator. The vibrator may include a piezo electric crystal. The vibrator may include an eccentric rotating mass (ERM) actuator. The vibrator may be located on the sidewall. The vibrator may be located at the second end exterior of the container body. The vibrator may be connected to the food processing base.

In a further aspect, an attachment for use with a food processing system includes a container body having a sidewall, a first end configured to be mounted to a food processing base, and a second end remote from the first end. The first end is open and the second end is at least partially closed. The second end includes an end wall that is oriented transverse to the sidewall to make a unitary structure. Further, the attachment includes a first agitator having one or more blades that is receivable at the first end. The first agitator is arranged to rotate in a first direction. The attachment also includes a second agitator receivable at the second end and a rotatable shaft coupled to the first agitator that is arranged to rotate in the first direction. In addition, the attachment includes a mainspring that is operably coupled to the shaft and the second agitator. The mainspring is rotated in the first direction into a compressed configuration in response to the rotation of the shaft in the first direction. Also, the mainspring rotates in a second direction opposite the first direction and unwinds toward a decompressed configuration after the shaft stops rotating in the first direction to, thereby, rotate the second agitator in the second direction.

In some implementations, the mainspring resides within a spring housing adjacent to the second agitator. The spring housing may be integrally formed with a portion of the second agitator. The spring housing may be detachably connectable to the second agitator. The mainspring may be connected to the shaft via a slipping clutch. The slipping clutch may include a bridle ring. The shaft may operably couple the first agitator to the second agitator.

This application, in various implementations, also describes an exemplary attachment for a food processing system that can blend thick or frozen ingredients and/or minimize the accumulation of the ingredients to the sidewalls of the container, resulting in more uniform processed food. In one configuration, the attachment includes at least one flexible paddle connected to the cutting blades that rotates concurrently while the cutting blades rotate to loosen or scrape ingredients that are stuck to the sidewalls of the container. Therefore, those unprocessed ingredients will move toward the cutting blades to be processed again, enabling a more efficient release of ingredients from a sidewall during the blending process.

In one aspect, the application includes an exemplary attachment for a food processing system that includes a spiral and/or helical structure which is extendable through the container and is connected to the cutting blades. The spiral structure has various diameters from one end to the other end to create turbulent flow while rotating concurrently as the cutting blades rotate during operations of the food processing system. Such an action releases ingredients from the sidewalls to be processed again to form a uniform food product.

In another aspect, an attachment for use with a food processing system includes a container body having a sidewall, a first end configured to be mounted to a food processing base, and a second end remote from the first end. The first end is open and the second end is at least partially closed. Further, the attachment includes a first agitator having one or more blades and a second agitator. The second agitator includes one or more flexible sections and is extendable through the container body. The first agitator and the second agitator are connected to each other and are receivable at the first end.

In some implementations, the second end of the container body is entirely closed to a surrounding and/or ambient environment. The second end may include an end wall oriented transverse to said sidewall. The one or more flexible sections of the second agitator may include at least one paddle. The at least one paddle may be in contact with the sidewall.

In some implementations, the second agitator extends along the sidewall of the container body. The second agitator may be configured to remove at least a portion of a food attached to the sidewall during operation of the food processing system. The second agitator may be configured to stir a food during the operation of the food processing system. The attachment may further include a motor to activate and/or rotate the first agitator and/or the second agitator. The first agitator and the second agitator may operate concurrently and/or simultaneously.

In a further aspect, an attachment for use with a food processing system includes a container body having a sidewall, a first end configured to be mounted to a food processing base, and a second end remote from the first end. The first end is open and the second end is at least partially closed. Further, the attachment includes a first agitator having one or more blades and a second agitator including a spiral structure. The second agitator is extendable through the container body. The first agitator and the second agitator are receivable at the first end.

In some implementations, the spiral structure has a larger diameter near the first end and smaller diameter near the second end. In certain implementations, a diameter of the spiral structure increases from the first end as it extends toward the second end. In other implementations, a diameter of the spiral structure decreases from the first end as it extends toward the second end. The second agitator may include a first portion close to the first end, a middle portion having the spiral structure, and a third portion close to the second end.

In some implementations, the second end of the container body is entirely closed to a surrounding and/or ambient environment. The second agitator may be configured to stir a food during the operation of the food processing system. The second agitator may be configured to remove at least a portion of a food attached to the sidewall by providing a turbulent flow in the container during operation of the food processing system. The attachment may include a connector to connect the first member, the second agitator, and the base. The attachment may further include a motor to activate the first member and the second agitator.

Any two or more of the features described in this specification, including in this summary section, may be combined to form implementations not specifically described in this specification. Furthermore, while this specification may refer to examples of systems, methods, and devices related to food processors, such techniques also apply equally to other types of ingredient or material blending techniques.

The details of one or more implementations are set forth in the accompanying drawings and the following description. Other features and advantages will be apparent from the description and drawings, and from the claims.

The detailed description explains implementations of the invention, together with advantages and features, by way of example with reference to the drawings.

DETAILED DESCRIPTION

Figure 1:
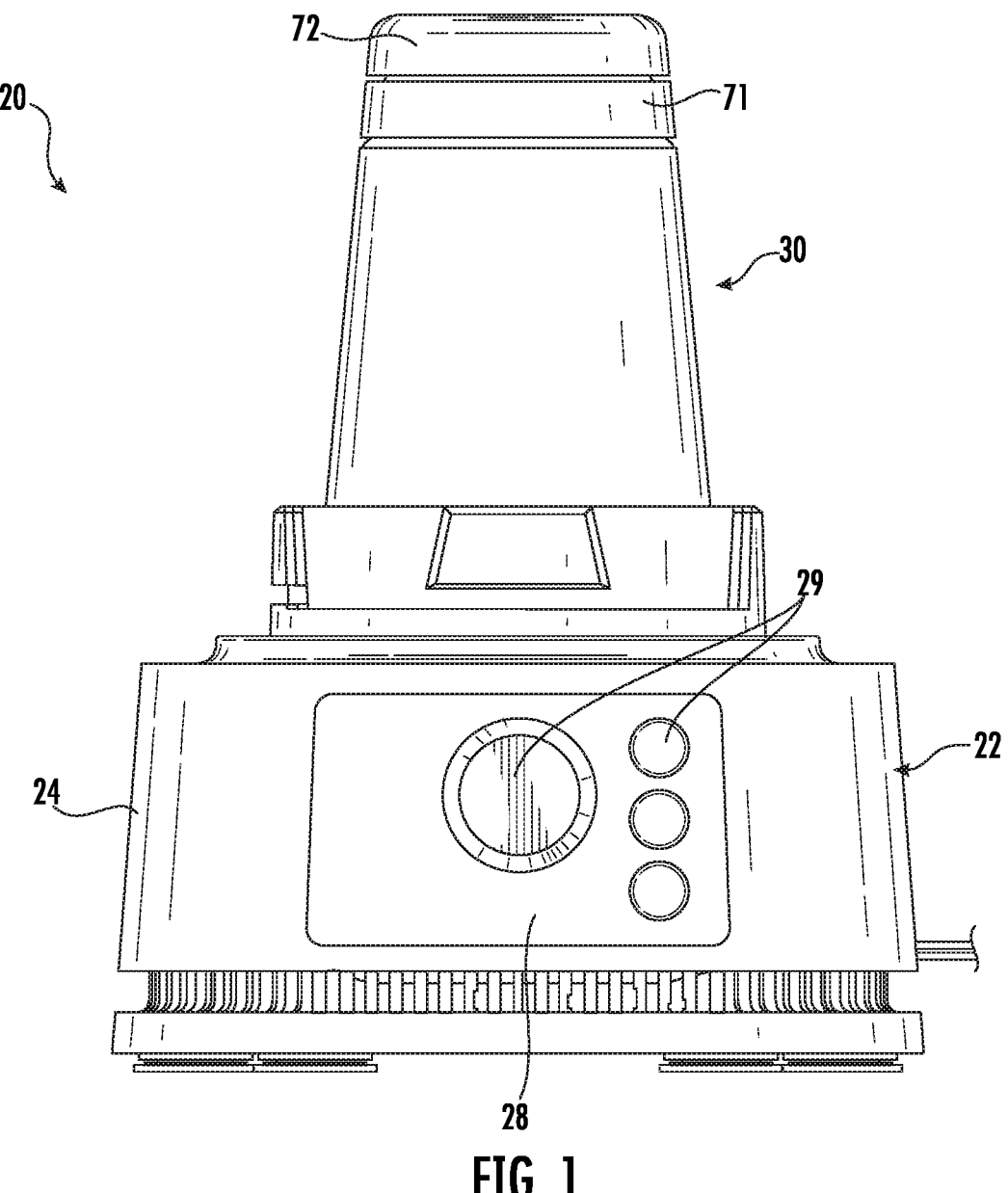
FIG. 1 is a front view of an example of a food processing system.
Figure 2:
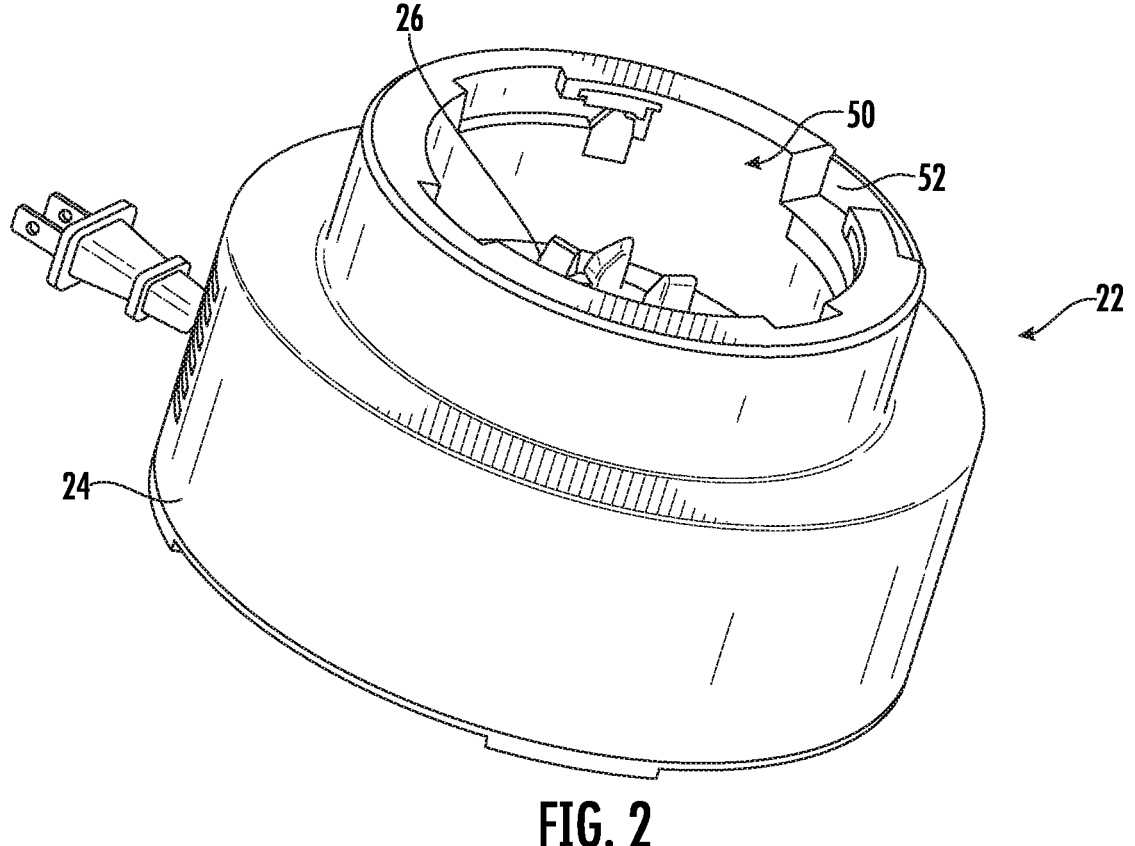
FIG. 2 is a perspective view of an example of a base of the food processing system.

Referring now to FIGS. 1 and 2, an example of a multi-functional food processing system 20 is illustrated. In general, the food processing system 20 can be adapted to perform any food processing or blending operation including as non-limiting examples, dicing, chopping, cutting, slicing, mixing, blending, stirring, crushing, or the like. Although the food processing system illustrated and described herein is a personal blender system, other food processing systems are within the scope of the present disclosure.

The food processing system 20 includes a food processing base 22 having a body or housing 24 within which a drive unit (not shown) and at least one controller not shown) are located. The drive unit includes at least one rotary component, such as a drive coupler 26 (see FIG. 2) for example, driven by a motorized unit (not shown) located within the housing 24. The food processing base 22 may additionally include a control panel or user interface 28 (best shown in FIG. 1) having one or more inputs 29 for turning the motorized unit on and off and for selecting various modes of operation, such as pulsing, blending, or continuous food processing. However, implementations where the food processing system 20 does not include a user interface, such as where the food processing system 20 is operable via an application and implementations where the application of a force to a switch or other component formed in the food processing base 22 (is sufficient to initiate operation of the motorized unit such as in push to operate systems) for example, are also within the scope of the disclosure. The at least one drive coupler 26 is configured to engage a portion of an attachment 30 coupled to the food processing base 22 for the processing of food products located within an interior of the attachment 30. This will become more apparent in subsequent FIGS. and discussion.

Figure 3:
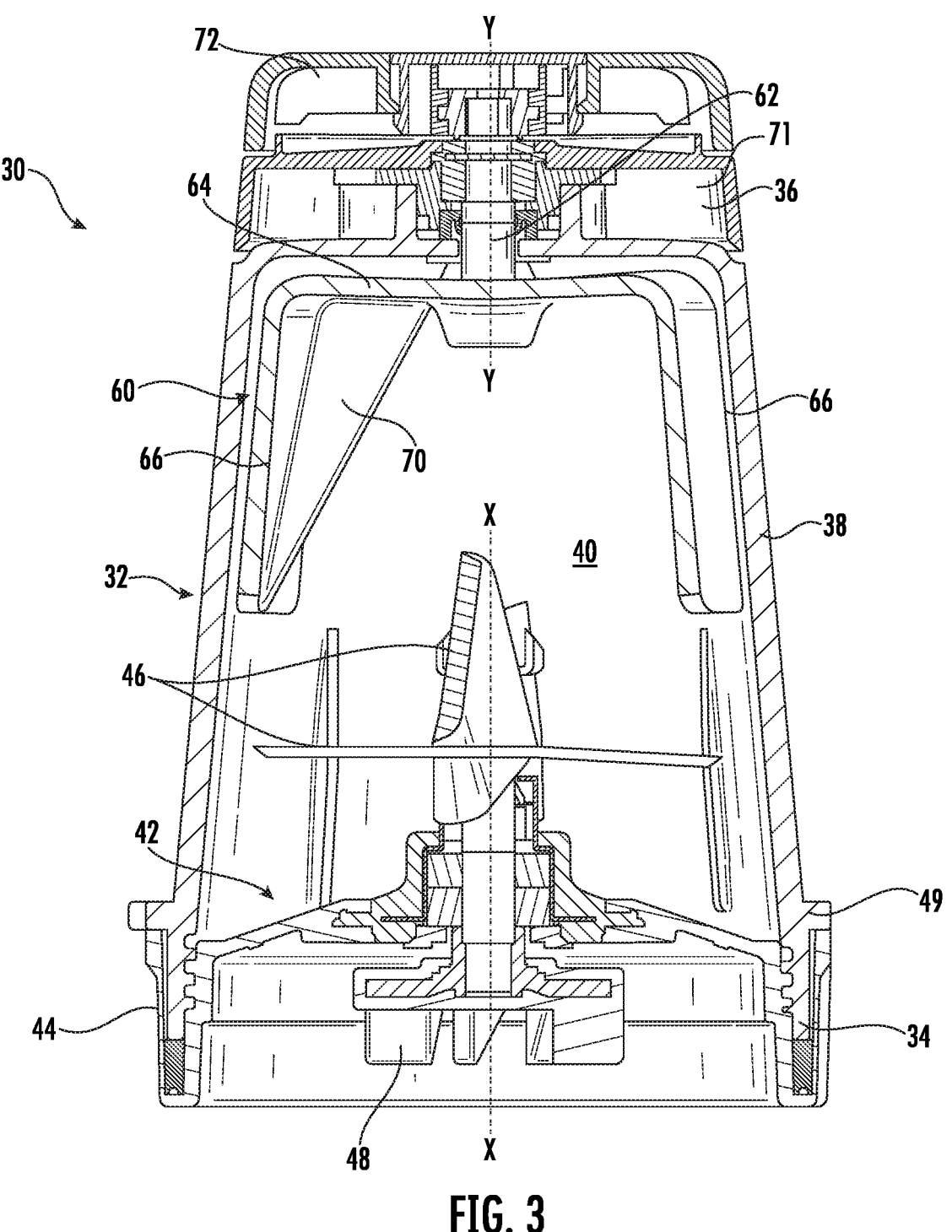
FIG. 3 is a sectioned view of an attachment connectable to the base of the food processing system.
Figure 4:
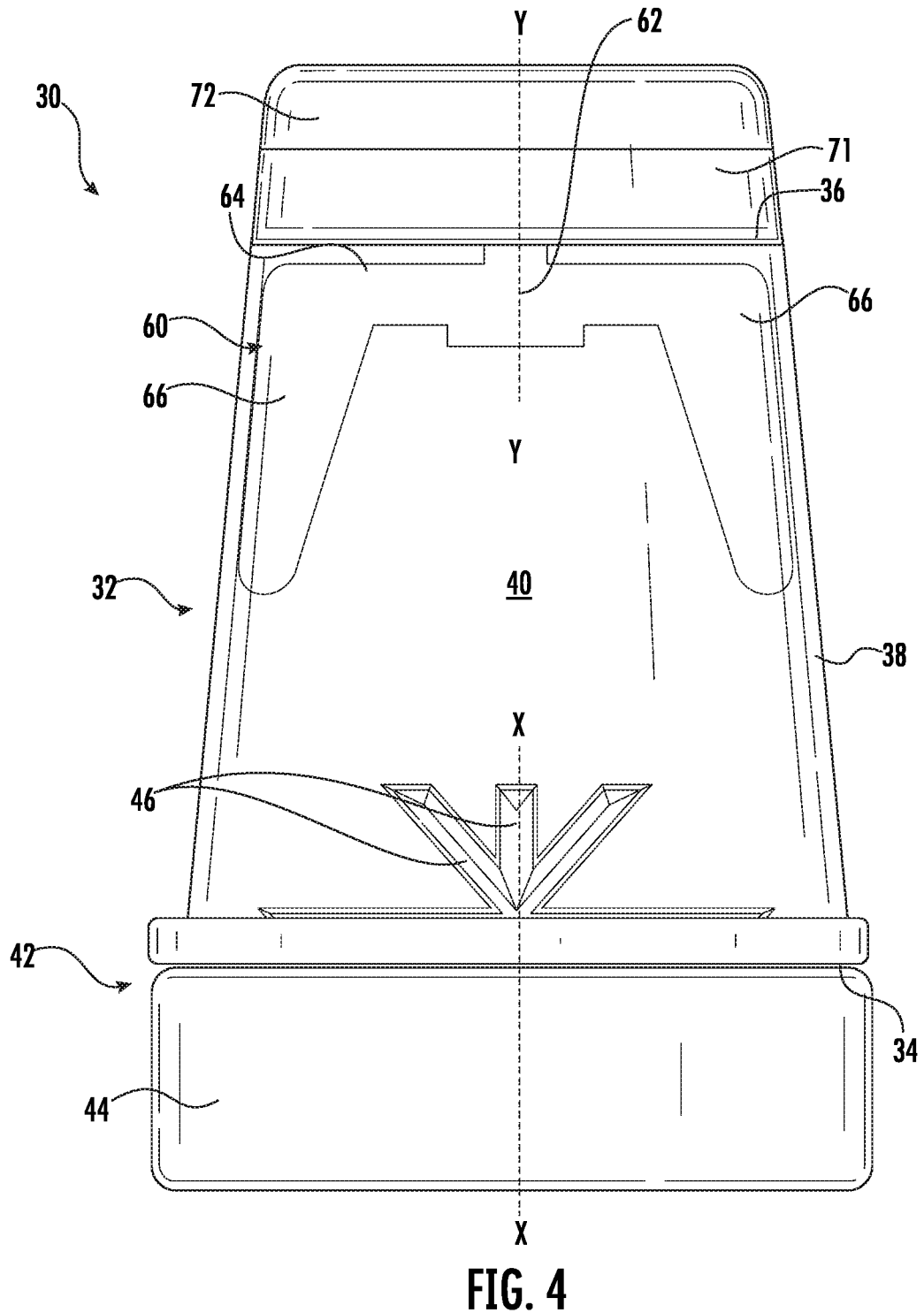
FIG. 4 is a front view of an attachment connectable to the base of the food processing system.

One or more attachments 30 varying in size and/or functionality may be configured for use with the food processing base 22. An example of an attachment 30 suitable for use with the food processing base 22 is illustrated in FIGS. 3 and 4. As shown, the attachment 30 includes an inverted jar or container 32. The container 32 typically includes a body having a first open end 34, a second closed end 36, and one or more sidewalls 38 extending between the first end 34 and the second end 36. The sidewalls 38 in combination with one or more of the ends 34, 36 of the container 32 define a hollow interior or processing chamber 40 of the container 32. In an implementation, the container 32 is a "personal blending container" or "cup" that has a first configuration when separated from the food processing base 22 and a second inverted configuration when coupled to the food processing base 22.

In such implementations, the attachment 30 further includes a first agitating member 42, such as a cutting assembly, configured to removably couple to the first open end 34 of the container 32 to seal the processing chamber 40. In the illustrated, non-limiting implementation, the cutting assembly 42 includes a body 44 and one or more blades 46 rotatable about an axis X relative to the body 44. When the cutting assembly 42 is connected to the end 34 of the container 32, the first agitating member including the least one blade 46 is disposed within the processing chamber 40 of the container 32. The container 32 and the cutting assembly 42 may be threadably coupled together; however, it should be understood that other mechanisms for removably connecting the container 32 and the cutting assembly 42, such as a bayonet connection or a clip for example, are also contemplated herein.

In each of the various attachment configurations, the cutting assembly 42 is configured to operably couple to the food processing base 22 of the food processing system 20. A driven coupler 48 (see FIG. 3) associated with the cutting assembly 42 is positioned at an exterior of the attachment 30. The at least one drive coupler 26 is configured to engage the driven coupler 48 to rotate the at least one blade 46 about the axis X to process the food products located within the chamber 40 of the container 32. It should be understood that the attachment 30 including an inverted container 32 and a cutting assembly 42 is intended as an example only, and that other attachments, are also contemplated herein.

In implementations where the attachment 30 includes an inverted container 32, the attachment 30 may include one or more contact members 49 (FIG. 3), such as tabs for example, positioned about the periphery of the attachment 30. It should be understood that an attachment 30 having any number of contact members 49 is within the scope of the disclosure. In implementations where the attachment 30 includes an inverted container 32 the contact members 49 may extend outwardly from the container 32, the cutting assembly 42, or both.

The contact members 49 of the attachment 30 are configured to cooperate with a mounting area 50 (see FIG. 2) of the food processing base 22 to couple the attachment 30 to the food processing base 22. As shown, the mounting area 50 includes one or more receiving slots 52 within which each of the plurality of contact members 49 of the attachment 30 is receivable. The attachment 30 may be configured to slidably connect to the food processing base 22 of the food processing system 20. Alternatively, or in addition, the attachment 30 may be configured to rotatably connect to the food processing base 22 such that the attachment 30 is locked relative to the food processing base 22. However, it should be understood that any suitable mechanism for coupling the attachment to the food processing base 22 is within the scope of the disclosure.

With continued reference to FIGS. 3 and 4, and further reference to FIGS. reference now to FIGS. 5-16, an attachment 30 of the food processing system 20 suitable for use to process a thick or frozen mixture is described in more detail. As shown, the attachment 30 includes a second agitating member 60 at least partially disposed within the processing chamber 40 of the container 32. As shown, this additional second agitating member 60 includes a shaft 62 extending through the second, sealed end 36 of the container 32. As a result, the second agitating member 60 is arranged opposite the open end 34 of the container 32, and therefore the cutting assembly 42 disposed at the open end 34 of the container 32. The second agitating member 60 is coupled to the shaft 62 such that the shaft 62 drives rotation of the second agitating member 60 about an axis of rotation axis Y. Although the shaft 62 is described herein as being a part of the agitating member 60, in other implementations, the shaft 62 may be separate from the agitating member 60. Axis Y may but need not be coaxial with axis X of the cutting assembly 42.

Any suitable second agitating member 60 is contemplated herein. In the illustrated, non-limiting implementations, the second agitating member 60 includes a base 64 mountable about the shaft 62 and having at least one prong or paddle 66 extending at a nonparallel angle from the base 64, such as towards the open end 34 of the container 32. The base 64 and the one or more paddles 66 may be integrally formed as a unitary structure, or alternatively, may be multiple components connected together to form the second agitating member 60. Further, the base 64 and/or the paddles 66 may be integrally formed with the shaft 62, or alternatively, may be removably mounted thereto. Although the second agitating member 60 shown in FIGS. 3 and 4 includes two paddles 66, it should be understood that any suitable number of paddles, such as a single paddle, or alternatively, three, four (see FIGS. 5C and 5E), five, or more paddles 66 are within the scope of the disclosure. Further, the paddles 66 may be spaced equidistantly about the axis of rotation Y or may be staggered based on a desired operation.

Figure 5A:
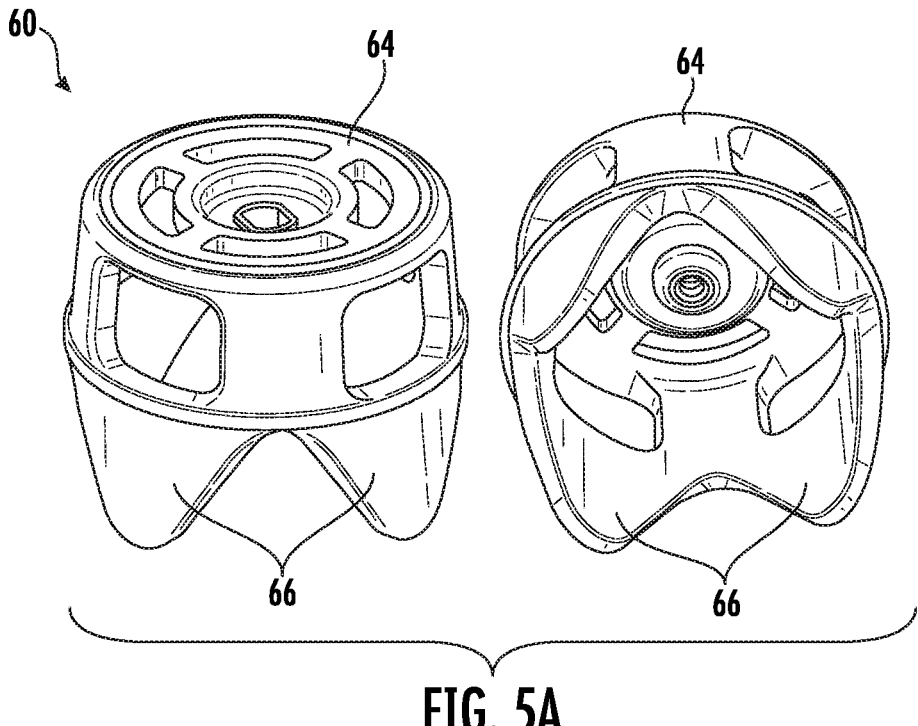
FIGS. 5A, 5B, 5C, 5D, 5E and 5F are various views of different agitating members suitable for use with the attachment.
Figure 5B:
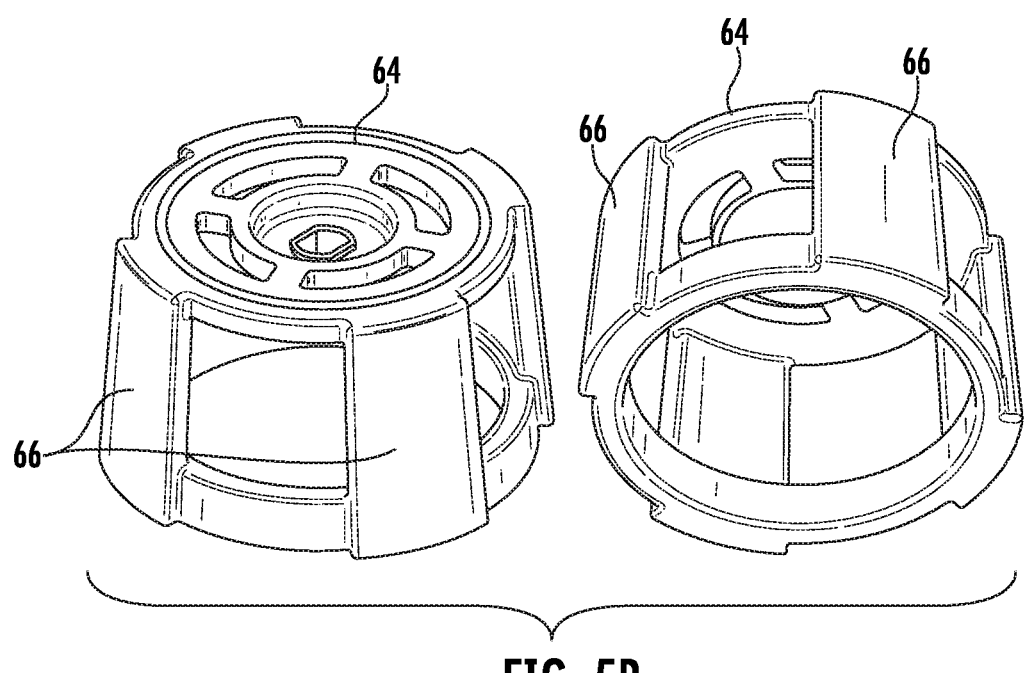
Figures 5C, 5D, 5E:
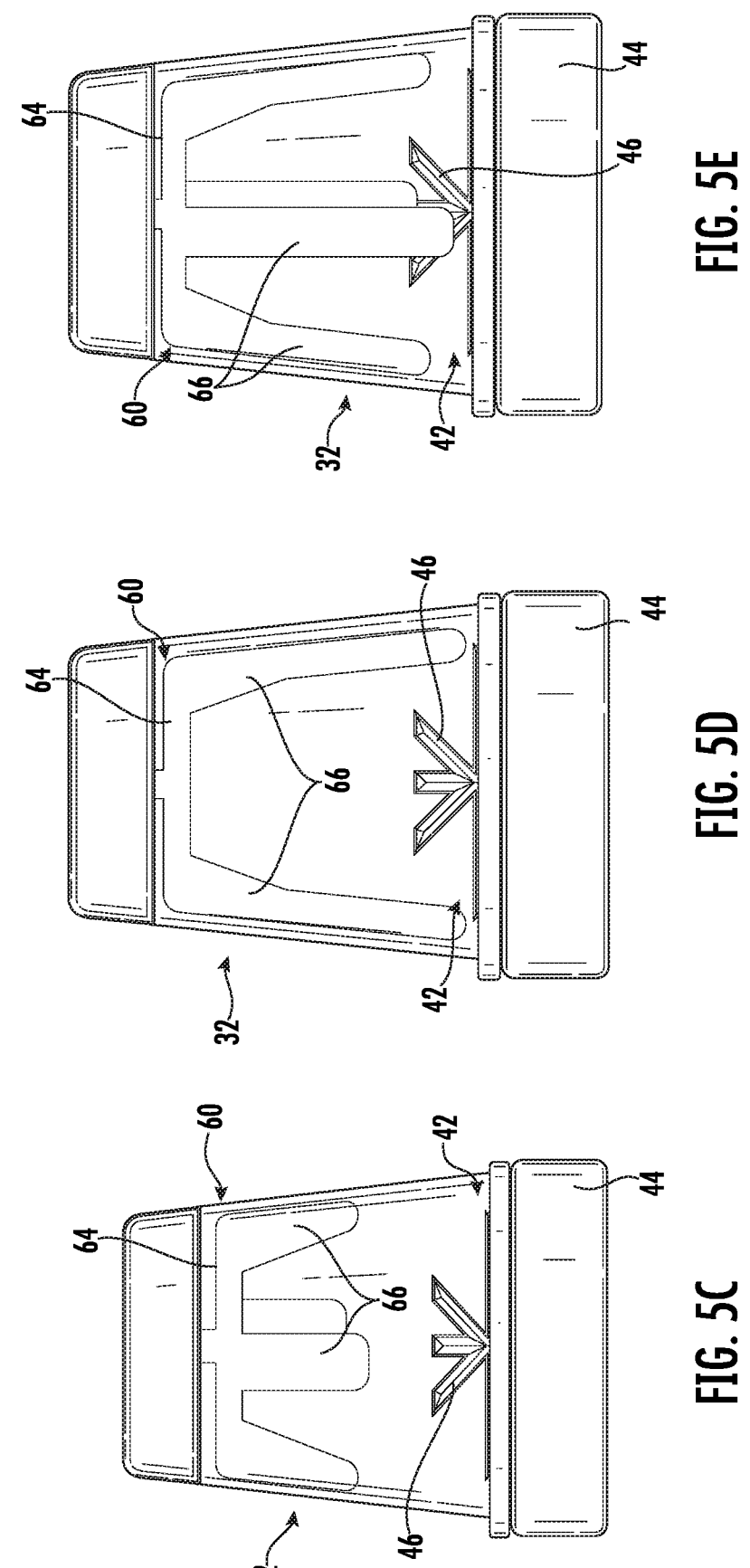

Examples of various configurations of a second agitating member 60 are illustrated in FIGS. 5A-5F. As shown, the paddles 66 of the second agitating member 60 may have any contour or shape and may extend over only a portion of the length of the container 32, or alternatively, over the substantially entire length of the container 32. When a paddle 66 extends over the entire length of the container 32, the distal end of the paddle 66 may be located directly adjacent the body 44 of the cutting assembly 42. In implementations where one or more of the paddles 66 overlap the at least one blade 46 of the cutting assembly 42, such as in FIGS. 5D and 5E, the paddles 66 may be disposed radially outward of the at least one blade 46 to avoid interference therewith. Further, when the second agitating member 60 has multiple paddles 66, the configuration of the paddles 66 may be substantially identical or may vary. In some implementations, as shown in FIG. 5B, a portion of the paddles 66 located remotely from the base 64, such as near the distal end of the paddles 66 for example, may be joined together to enhance the stability or rigidity of the paddles 66 as the second agitating member 60 is rotated. However, in other implementations, the paddles 66 are only connected to one another via the base 64.

A clearance defined between the one or more paddles 66 of the second agitating member 60 and the sidewall 38 of the container 32 may be selected to prevent large food particles from becoming trapped between the second agitating member 60 and the sidewall 38. In an implementation, at least a portion of one of the paddles 66 has an angle generally complementary to the sidewall 38 of the container 32. As a result, when the second agitating member 60 is positioned within the container 32, the paddle 66 and the sidewall 38 may be parallel to one another, with only a minimal clearance defined there between. Further, by designing one or more of the paddles 66 to match a contour of the adjacent portion of the container 32, the second agitating member 60 may only be insertable into the processing chamber 40 when in a specific orientation. As a result, incorrect installation of the second agitating member 60 may be avoided. However, in other implementations, at least a portion of one of the paddles 66 may be arranged at a non-parallel angle relative to the interior of the sidewall 38 of the container 32. A non-parallel orientation may be used be used to eject food and limit or prevent scraping of the interior of the sidewall 38.

Figure 5F:
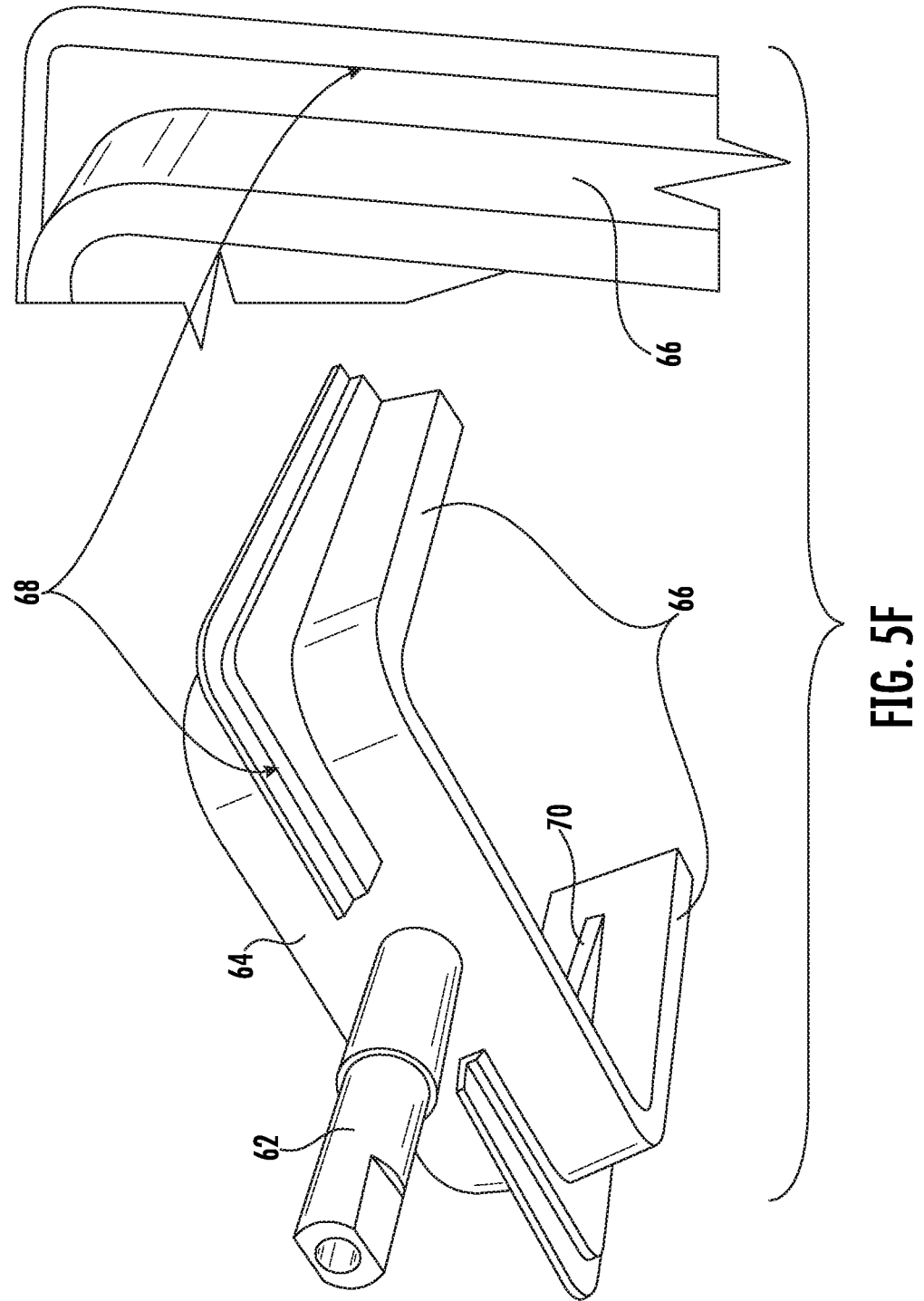

In an implementation, best shown in FIG. 5F, a wiper or scraper 68 extends radially outwardly from one or more surfaces of the second agitating member 60 facing an adjacent surface of the container 32. In the illustrated, non-limiting implementation, a wiper 68 is arranged at the exterior of each paddle 66. However, implementations where a wiper 68 is formed at only a single paddle 66, or at the base 64 of the second agitating member 60 are also contemplated herein. Alternatively, or in addition, one or more ribs 70 may extend radially inwardly from the one or more paddles 66 of the second agitating member 60. Although the rib 70 shown in FIG. 3 is connected to the base 64 and extends over the substantially entire height of the paddle 66, implementations where the rib 70 extends over only a portion of the height of the paddle 66, and implementations where the rib 70 is located at any position relative to the paddle 66 and does not connect to the base 64 are also within the scope of the disclosure.

To retain the second agitating member 60 at a desired position within the chamber 40, a mounting member 71 may be connected to a portion of the container 32, such as an exterior 11 of the second end 36 for example. The mounting member 71 includes a through hole (not shown) configured to receive a portion of the shaft 62. When coupled to the container 32, the mounting member 71 is rigidly affixed to the body of the container 32. Accordingly, the second agitating member 60 is configured to rotate about the axis Y relative to the stationary mounting member 71. The mounting member 71 may be connected to the container body via any suitable means, such as via one or more fasteners for example.

In an implementation, the second agitating member 60 is manually operated via an input from a user. As shown, a manual input device 72, such as a dial or cap for example, is operably coupled to the second agitating member 60 and/or the shaft 62 about which the second agitating member 60 is mounted. The manual input device 72 is connected to the shaft 62 at a location external to the container 32. In the non-limiting implementations illustrated in FIGS. 1, 3-4 and 6, the manual input device 72 and the second agitating member 60 are disposed on opposite sides of the mounting member 71. However, in other implementations, the attachment 30 may not have the mounting member 71 and the manual input device 72 may be located near or directly adjacent to the second sealed end 36 of the container 32. Further, it should be understood that a mounting member 71 may additionally be included in any of the implementations of the attachments 30 illustrated and described herein.

Figure 6:
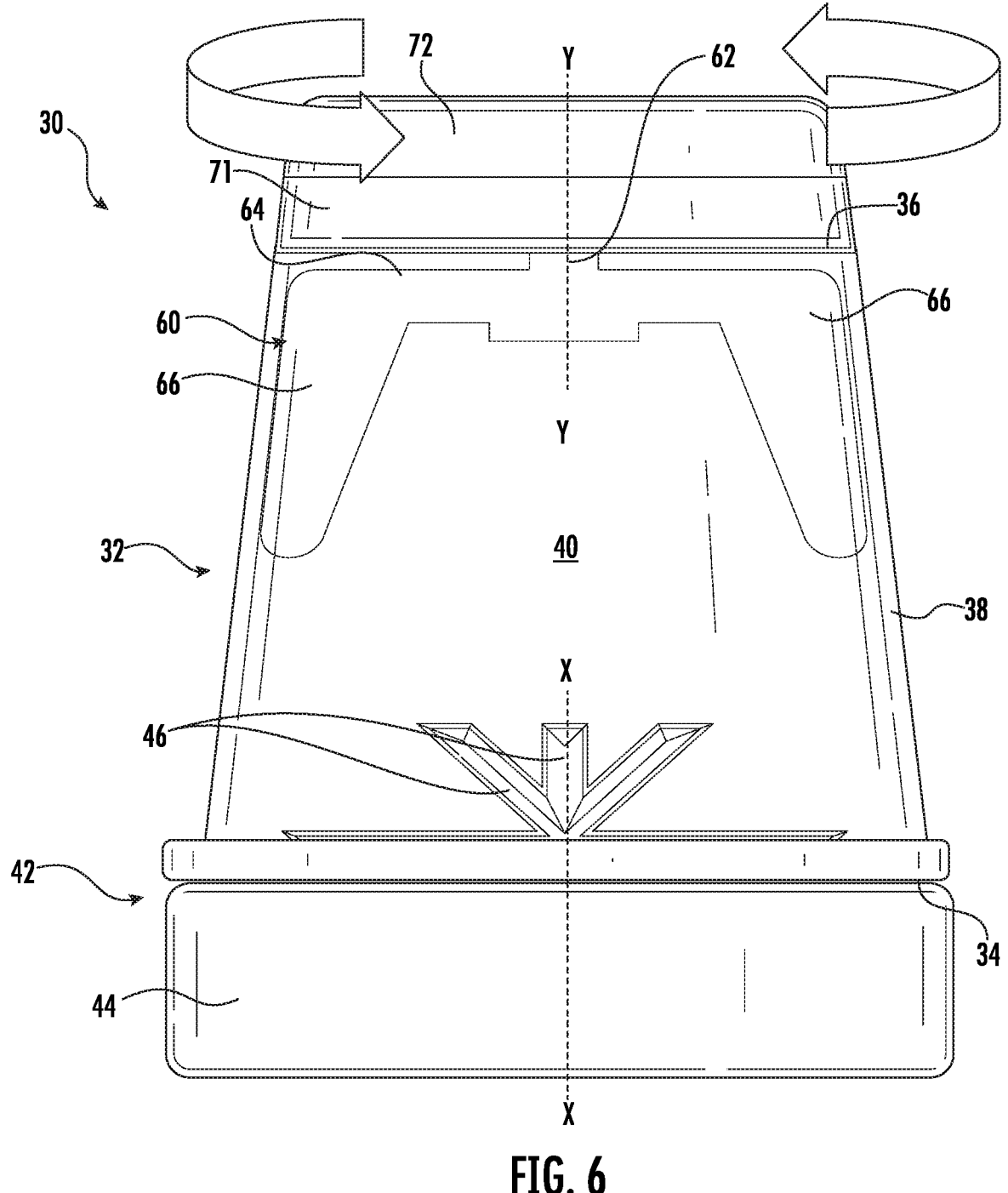
FIG. 6 is a front view of an attachment including a rotatable dial.
Figure 10:
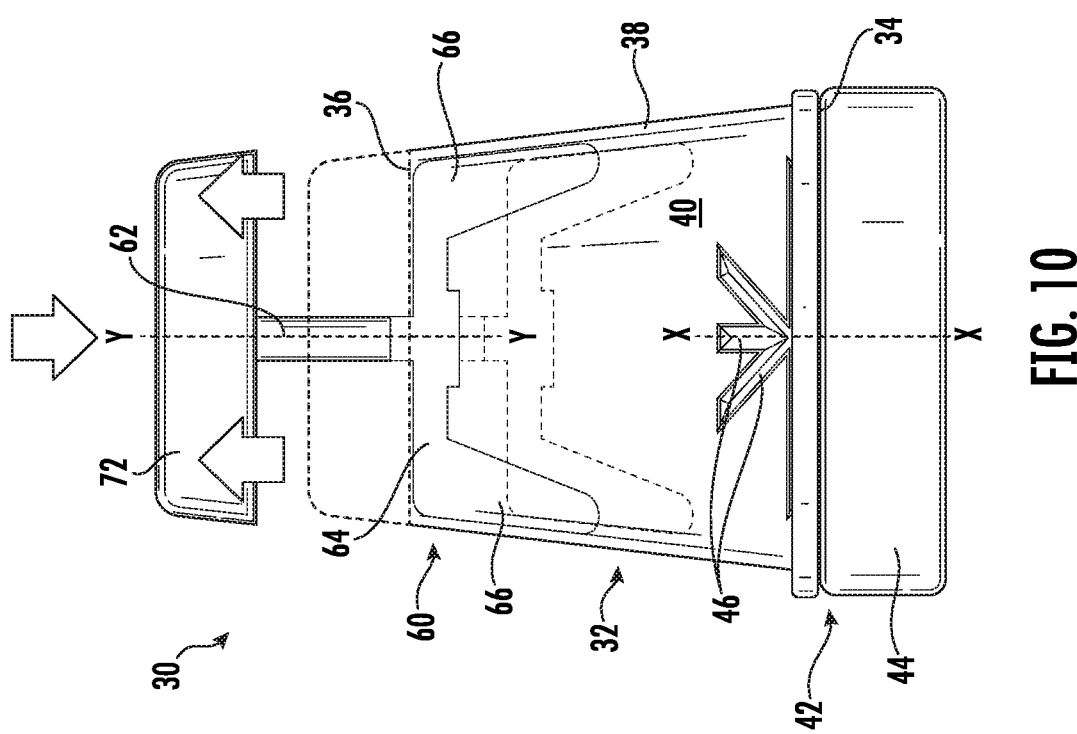
FIG. 10 is a front view of an attachment including a rotatable and translatable manual input device.
Figure 9:
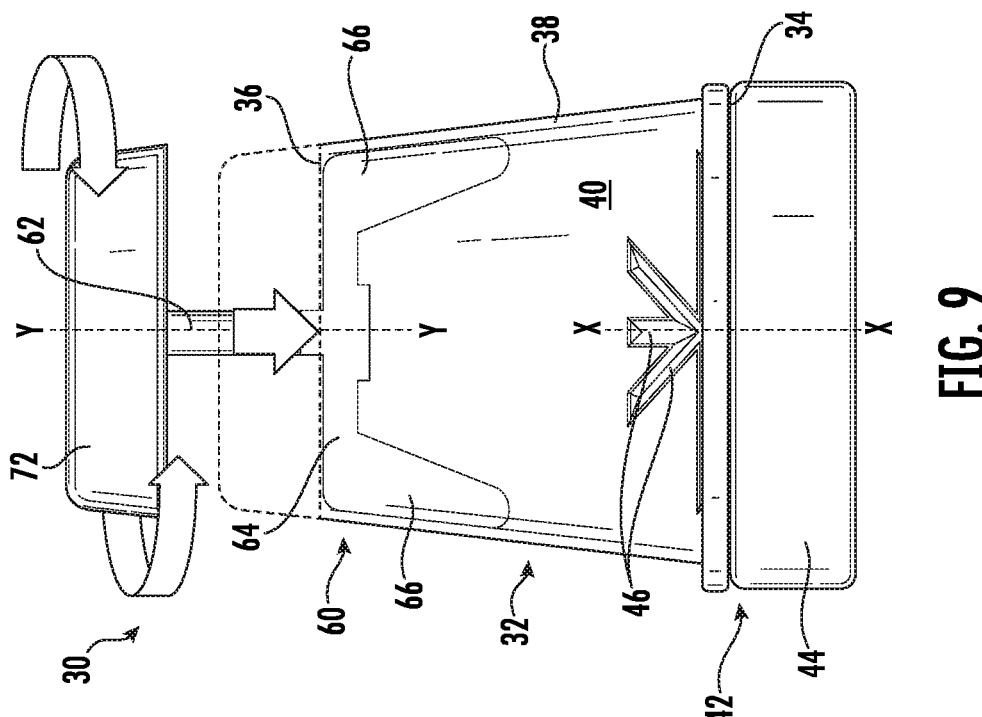
FIG. 9 is a front view of an attachment including a rotatable and translatable manual input device.

In an implementation, illustrated in FIG. 6, the manual input device 72 is rotatable in one or more directions to drive rotation of the second agitating member 60 about axis Y to "scrape" or loosen food stuck at the sidewall 38 of the container 32. Alternatively, or in addition, in some implementations, the manual input device 72 may be operable to translate the second agitating member 60 along the axis Y, such as to push food downwardly towards the cutting assembly 42. In such implementations, the manual input device 72 may be threadably coupled to the container 32 (see FIG. 9), such that rotation of the manual input device 72 causes the second agitating member 60 to not only rotate but also translate, resulting in movement of the second agitating member 60 along a helical path. In other implementations, as shown in FIG. 10, the manual input device 72 may be movably mounted to the container 32 using a biasing mechanism (not shown). Accordingly, when a downward force is applied to the manual input device 72, the second agitating member 60 moves downwardly, away from the second end 36 of the container 32, towards the first end 34 of the container 32. When the force is released from the manual input device 72, the biasing force of the biasing mechanism, causes the manual input device 72 and therefore the second agitating member 60 to translate upwardly along the Y axis towards a neutral position, such as adjacent the second end 36 of the container 32.

The manual input device 72 may be directly connected to the second agitating member 60 such that a single turn of the manual input device 72 results in a corresponding single turn of the second agitating member 60. However, implementations where the manual input device 72 is indirectly coupled to the second agitating member 60, such as via a gearing mechanism, are also within the scope of the disclosure. In such implementations, a single turn of the manual input device 72 may result in several turns of the second agitating member, or alternatively, less than one turn of the second agitating member 60.

Figure 7:
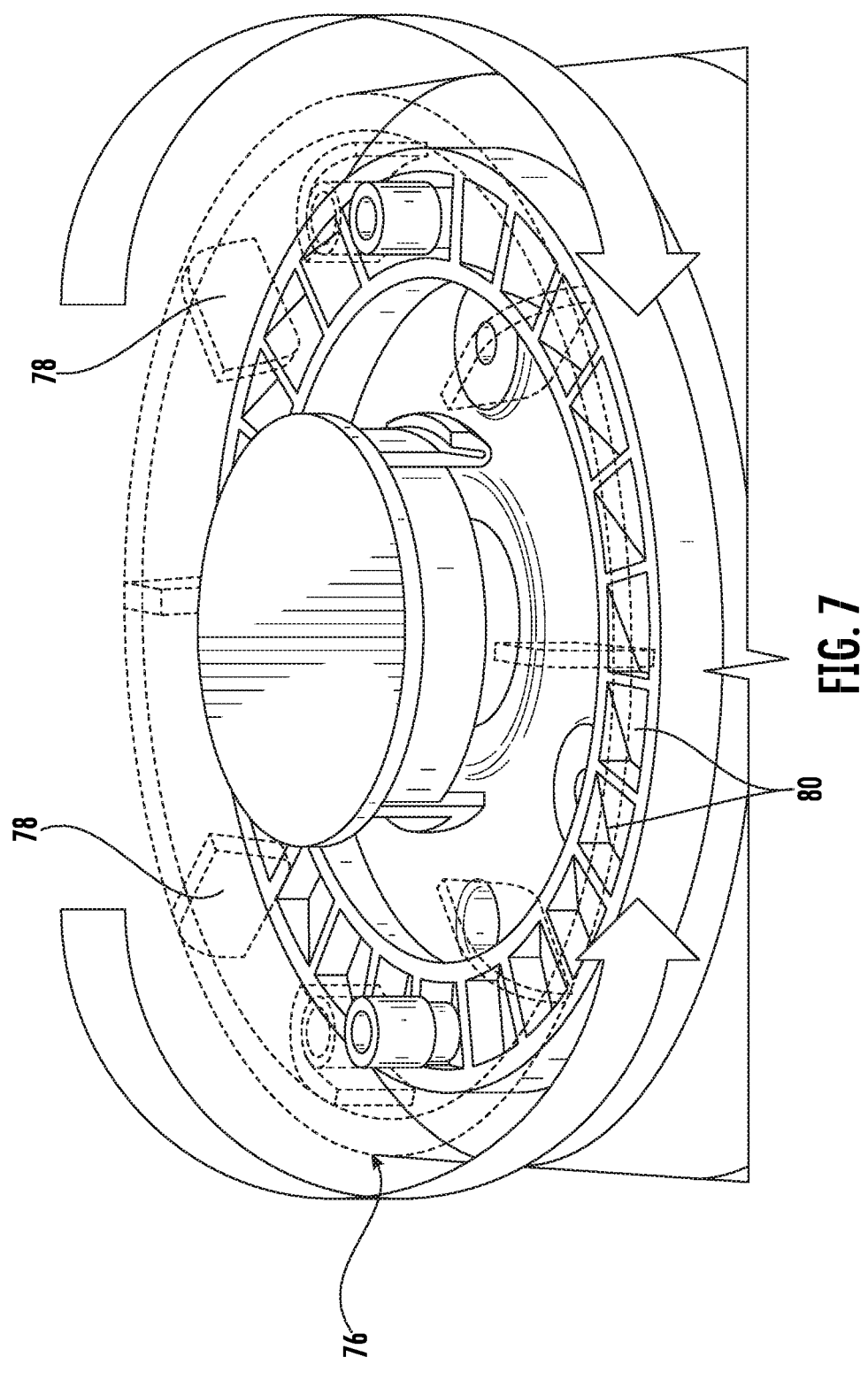
FIG. 7 is a perspective view of a lock associated with the agitating member.

In an implementation, the second agitating member 60 does not move during operation of the cutting assembly 42. To prevent undesired movement of the second agitating member 60 relative to the container 32 during operation of the cutting assembly 42, the attachment 30 may further include a lock 76 operably coupled to the second agitating member 60. In an implementation, the lock 76 includes a ratchet or a one-way clutch device associated with the shaft 62 and/or the manual input device 72. In such implementations, the ratchet 76 may be a separate device mounted to the second end of the container 32, such as between the container 32 and the manual input device 72, as shown in FIG. 7. Alternatively, the features of the ratchet 76 may be integrally formed into the second end 36 of the container 32 (see FIGS. 8A and 8B). As shown in FIG. 7, the one or more ratchet teeth 78 extend from the manual input device 72 for engagement with the grooves 80 of the ratchet 76 mounted at the second end of the container 32. As a result of the configuration of the grooves 80 and the teeth 78, the ratchet 76 restricts rotation of the manual input device 72, shaft 62, and second agitating member 60 in a first direction about the axis Y. In such implementations, during operation, the cutting assembly 42 may be configured to rotate about axis X in the direction of restricted rotation of the second agitating member 60 about axis Y. Further, when the manual input device 72 is rotated in the second, allowable direction about the axis Y, the engagement of the teeth 78 with each groove 80 in the ratchet 76 will provide a haptic or tactile feedback to a user. In an implementation, a pad (not shown) formed from an elastic material, such as silicone for example, may be included adjacent the interface between the teeth 78 and the grooves 80 to soften or limit the noise and/or vibration of the haptic feedback provided to a user.

Figure 8B:
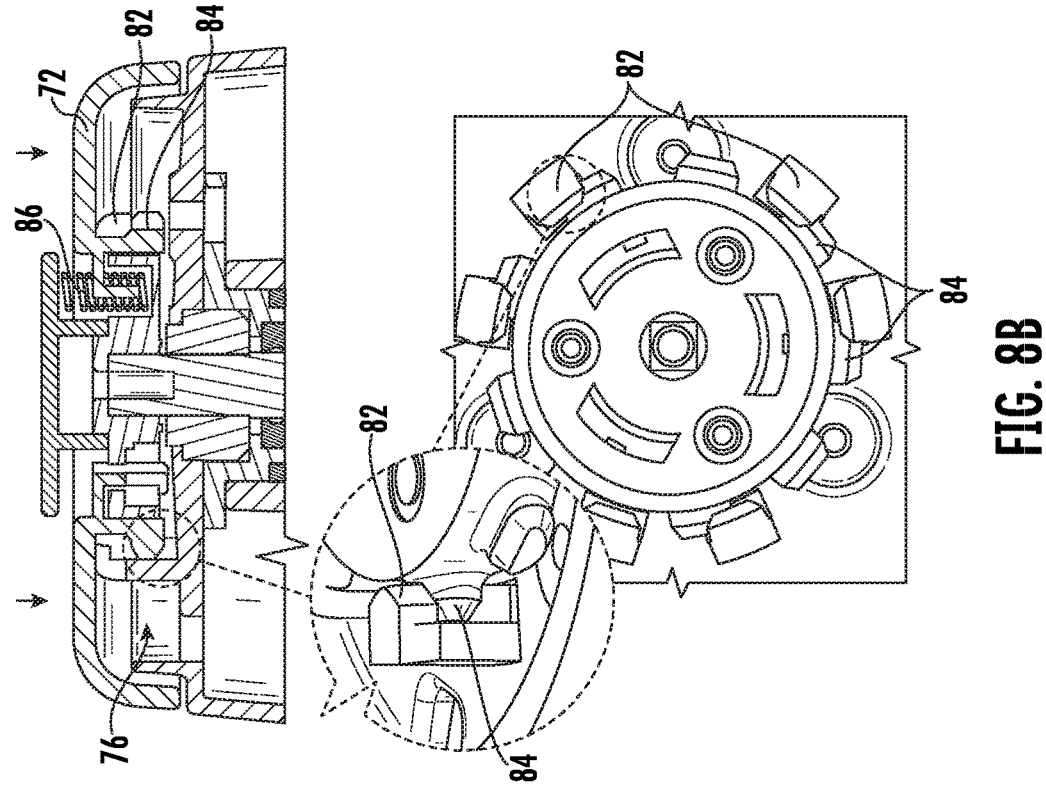
FIG. 8B includes various views of a lock associated with the agitating member in a retracted position.
Figure 8A:
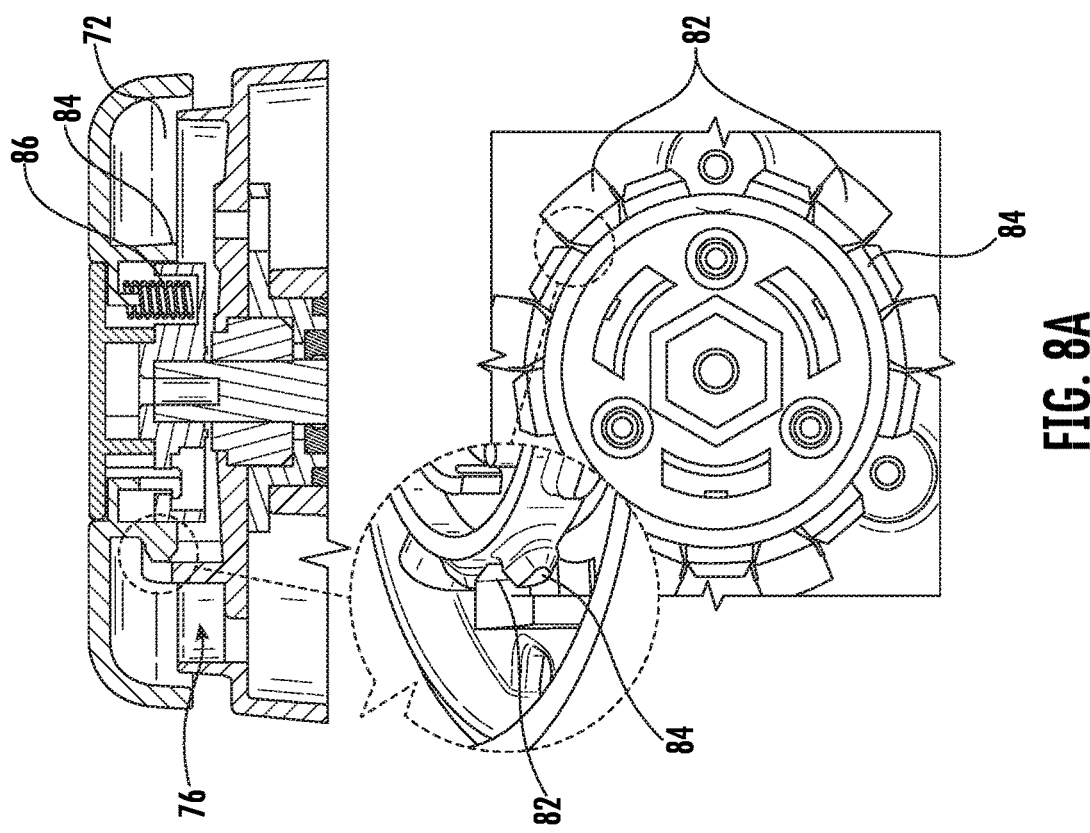
FIG. 8A includes various views of a lock associated with the agitating member in a neutral or extended position.

In another implementation, illustrated in FIGS. 8A and 8B, the lock 76 includes a plurality of first teeth 82 extending from the second end 36 of the container 32. The manual input device 72 similarly includes a plurality of second teeth 84 positionable between the plurality of first teeth 82, as shown in FIG. 7A. The manual input device 72 is further mounted with a biasing mechanism 86 such that the manual input device 72 is movable vertically relative to the plurality of first teeth 82. The biasing force of the biasing mechanism 86 positions the manual input device 72 in a first neutral, extended position where the plurality of second teeth 84 are interposed with the plurality of first teeth 82. As a result, rotation of the manual input device 72 about the axis Y when in the extended position is restricted. However, when a downward force is applied to the manual input device 72, the force opposes the bias of the biasing mechanism 86 and the plurality of second teeth 84 move out of the plane of the plurality of first teeth 82. When the manual input device 72 is in this second, depressed position (FIG. 8B), the manual input device 72 is rotatable about the axis Y in at least one direction, and in some implementations, in two directions. Once the force is removed from the manual input device 72, the biasing force of the biasing mechanism 86 will cause the manual input device 72 to return to the extended position, where rotation of the manual input device 72 is restricted.

Figure 11:
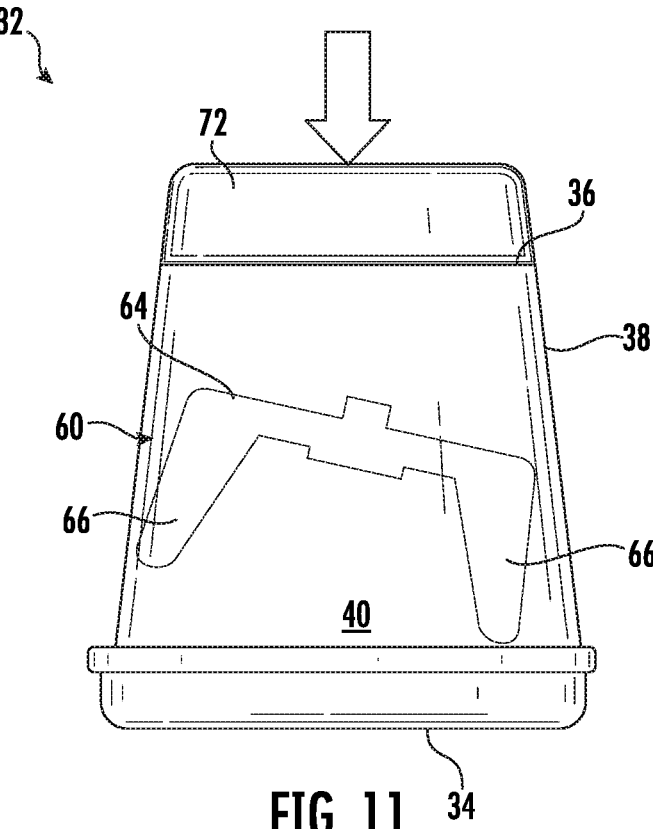
FIG. 11 is a front view of an attachment including an agitating member that is separable from the manual input device and the container.
Figure 12:
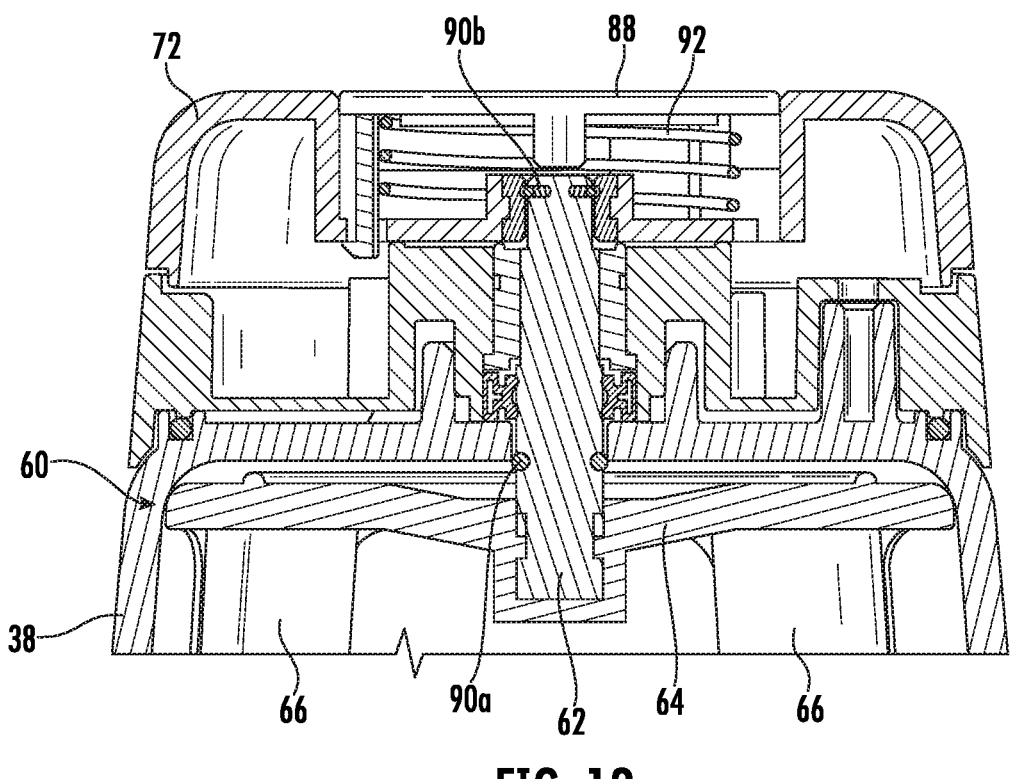
FIG. 12 is a detailed cross-sectional view of the interface between the agitating member and the manual input device.

The second agitating member 60 may be permanently affixed to the container 32. However, in an implementation, the second agitating member 60 is separable from the container 32, the mounting member 71, and/or the manual input device 72, such as to facilitate cleaning thereof. With reference now to FIGS. 11 and 12, the manual input device 72 may include a push button 88 operable to selectively decouple the second agitating member 60 therefrom. In such implementations, the shaft 62 may have at least one spring biased detent formed therein. As shown, a first detent 90*a* may be arranged at the interface between the shaft 62 and the container 32. Alternatively, or in addition, a second detent 90*b* may be arranged at the interface between the shaft 62 and the manual input device 72. In the extended positions, the detents 90a, 90b engage a groove or other feature formed in the adjacent component to restrict movement of the shaft 62 relative to the container 32, or the manual input device 72 relative to the shaft 62/container 32, respectively. Application of a force to a push button 88 formed in the manual input device 72 the first and second detent 90a, 90b to retract radially inwardly into the shaft 62, thereby separating the detent 90a, 90b from the groove or feature formed in the adjacent components. As a result, in this retracted position, the shaft 62 can be translated relative to the container 32. This allows the second agitating member 60 and the shaft 62 to be separated from the container 32, and in some implementations, the manual input device 72 to be separated from the second agitating member 60 and even the mounting member 71 and the container 32. When the force is released from the push button 88, a biasing mechanism 92 coupled to the push button 88 causes the push button 88 to return to its original position and the detents 90a, 90b to return to the extended position.

Figures 13, 14:
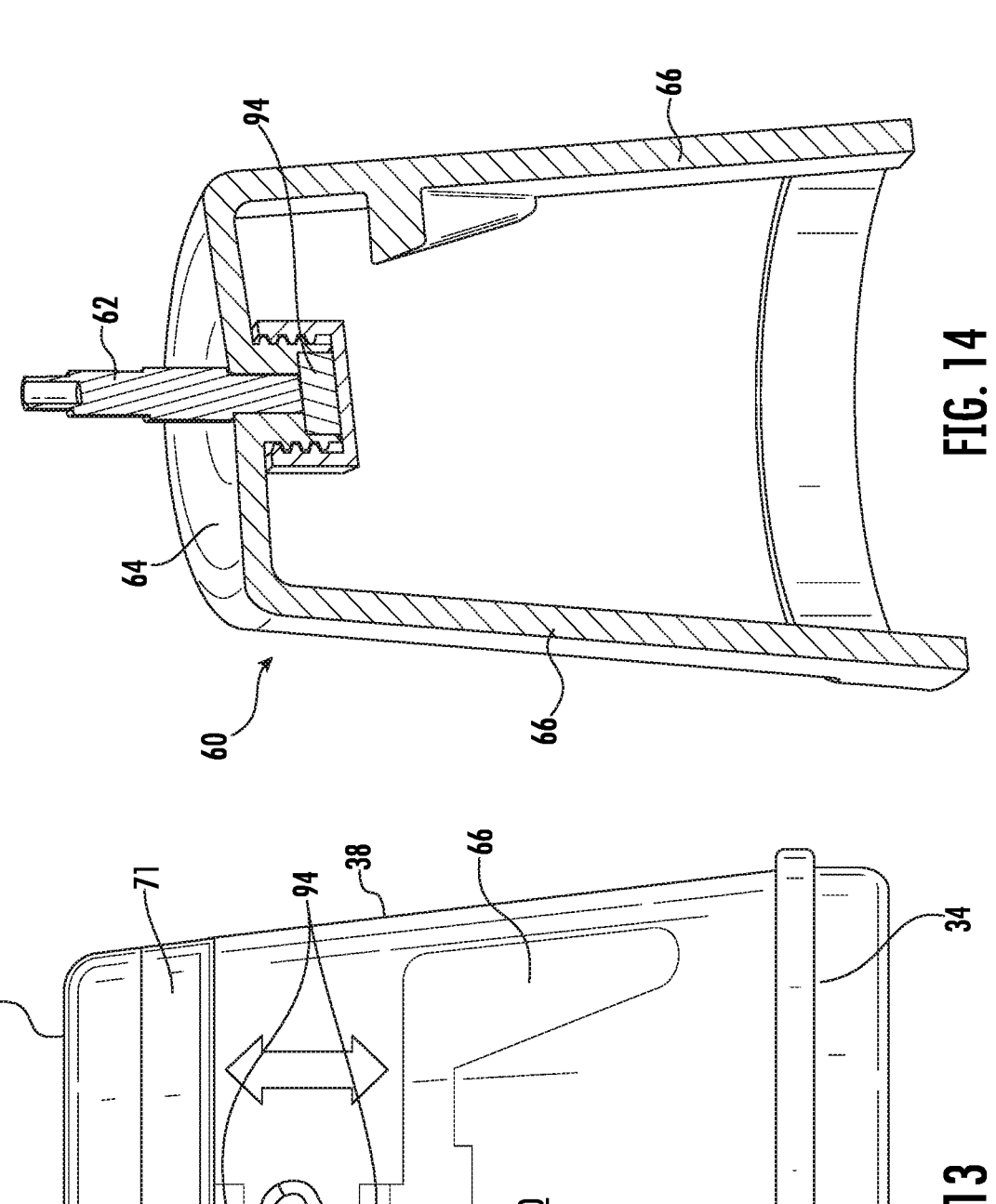
FIG. 13 is a front view of an attachment including an agitating member that is separable from the manual input device and the container.
FIG. 14 is a detailed cross-sectional view of the interface between the agitating member and the shaft.
Figure 16:
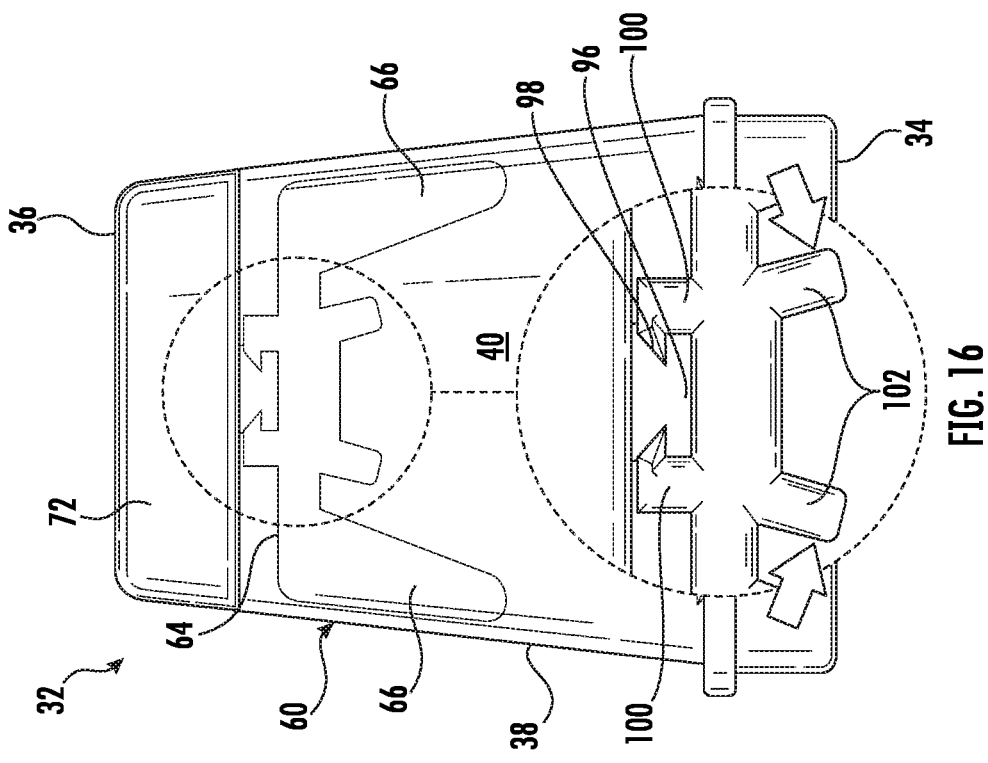
FIG. 16 is a front view of an attachment including an agitating member that is separable from the manual input device and the container.

With reference to FIGS. 13 and 14, in another implementation, the second agitating member 60 and/or shaft 62 may be retained within the processing chamber 40 via a magnetic connection or coupling. As shown, a magnet 94 may be mounted within the base 64 of the second agitating member 60, such as for connection to an end of the metal shaft 62 (FIG. 14). Accordingly, application of a force to the second agitating member 60 that exceeds the magnetic force coupling the second agitating member 60 to the shaft 62 will be sufficient to separate the second agitating member 60 from the shaft 62. Although the magnetic connection is described as being between the second agitating member 60 and the metal shaft 62, it should be understood that the magnetic connection may be formed with another magnet, such as shown in FIG. 13. Further, implementations where the magnetic connection is formed at another location, such as between the shaft 62 and a portion of the manual input device 72 or at an intermediate portion of the shaft 62 for example, are also within the scope of the disclosure.

Figure 15:
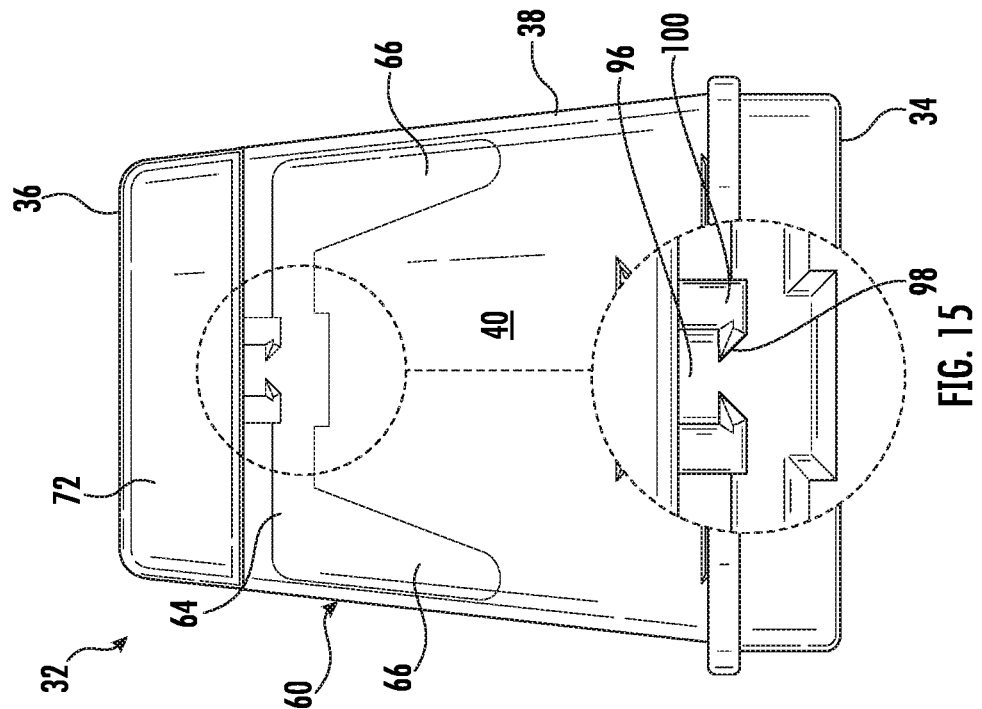
FIG. 15 is a front view of an attachment including an agitating member that is separable from the manual input device and the container.

In yet another implementation, the processing assembly may be removably connected to the manual input device 72 via a snap fit or spring clip type of connection. As shown in FIG. 15, in an implementation, a feature 96 defining one or more grooves 98 may extend from a portion of the second agitating member 60, such as the base 64 for example, for connection to a plurality of resilient members 100. As the feature 96 is moved towards the clearance, the engagement with the resilient members causes the members to flex outwardly, to receive the feature therein. Once the feature 96 reaches a specific position, the bias of the resilient members 100 will cause them to engage the grooves 98 of the feature 96. The between the grooves 98 and the resilient members 100 prevents separation of the second agitating member 60 from the manual input device 72.

To separate the second agitating member 60 from the resilient members 100, a force applied to the second agitating member 60 must be sufficient to push the resilient members 100 outwardly, out of engagement with grooves 98. In another implementation, shown in FIG. 16, the resilient members 100 may extend from a first side of the second agitating member 60 and the grooves 98 may be formed in feature 96 extending from the manual input device 72, or alternatively formed in the shaft 62. One or more release levers 102 operably coupled to the resilient members 100 may extend from a second, opposite side of the second agitating member 60. When the distal or free end of the release levers 102 are squeezed together, the resilient members 100 flex outwardly, to decouple from the grooves 98, thereby allowing the second agitating member 60 to separate from the dial. When the force is removed from the release levers 102, the resiliency of the material causes the resilient members 100 to bias back to a neutral position. It should be understood that the mechanisms and configurations for removably coupling the second agitating member 60 to the shaft 62 and/or manual input device 72 are provided as examples only and any suitable coupling mechanism for removably mounting the processing assembly within the processing chamber 40 is within the scope of the disclosure.

Figure 17:
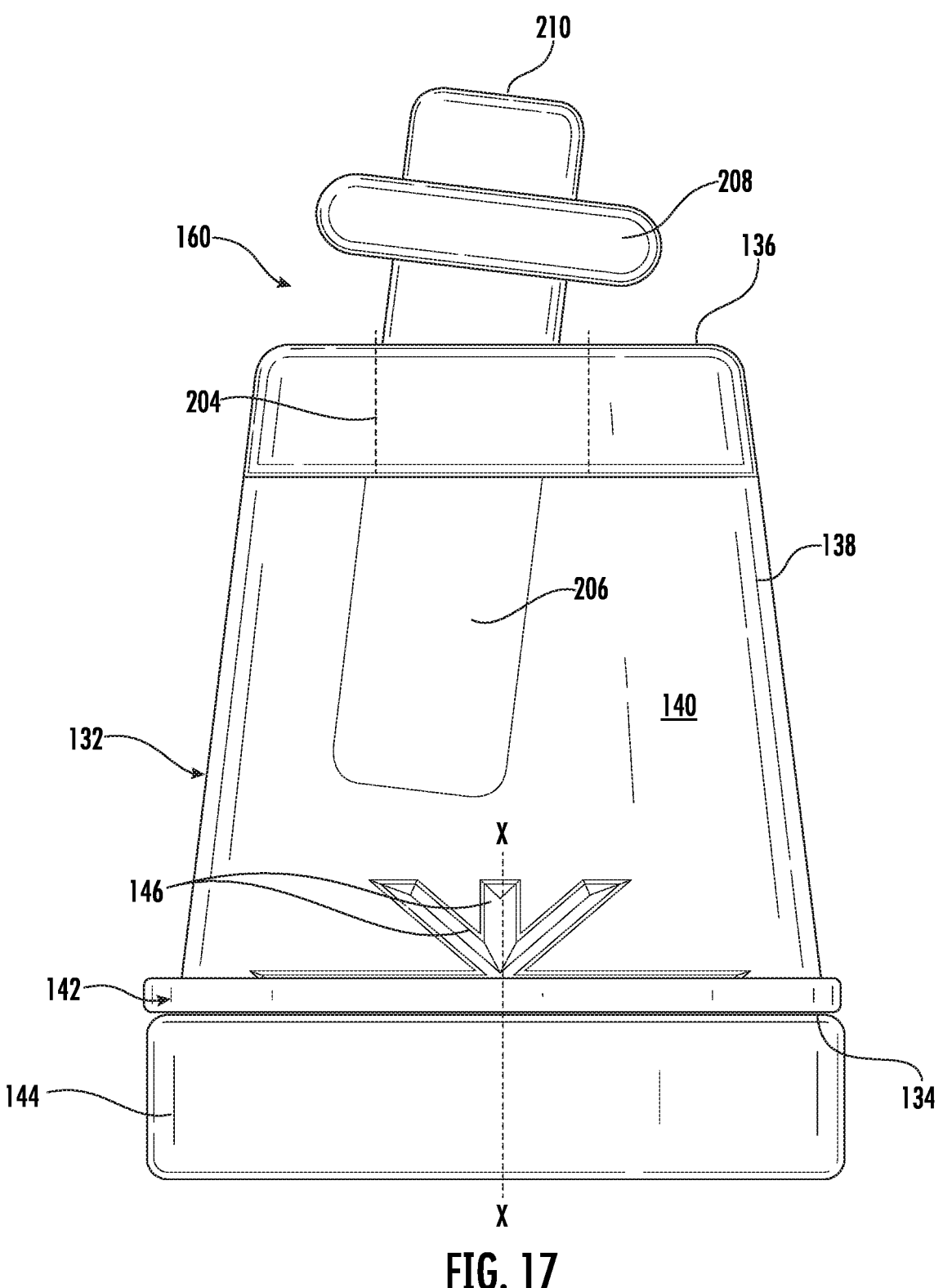
FIG. 17 is a front view of an attachment including an agitating member.
Figure 17A:
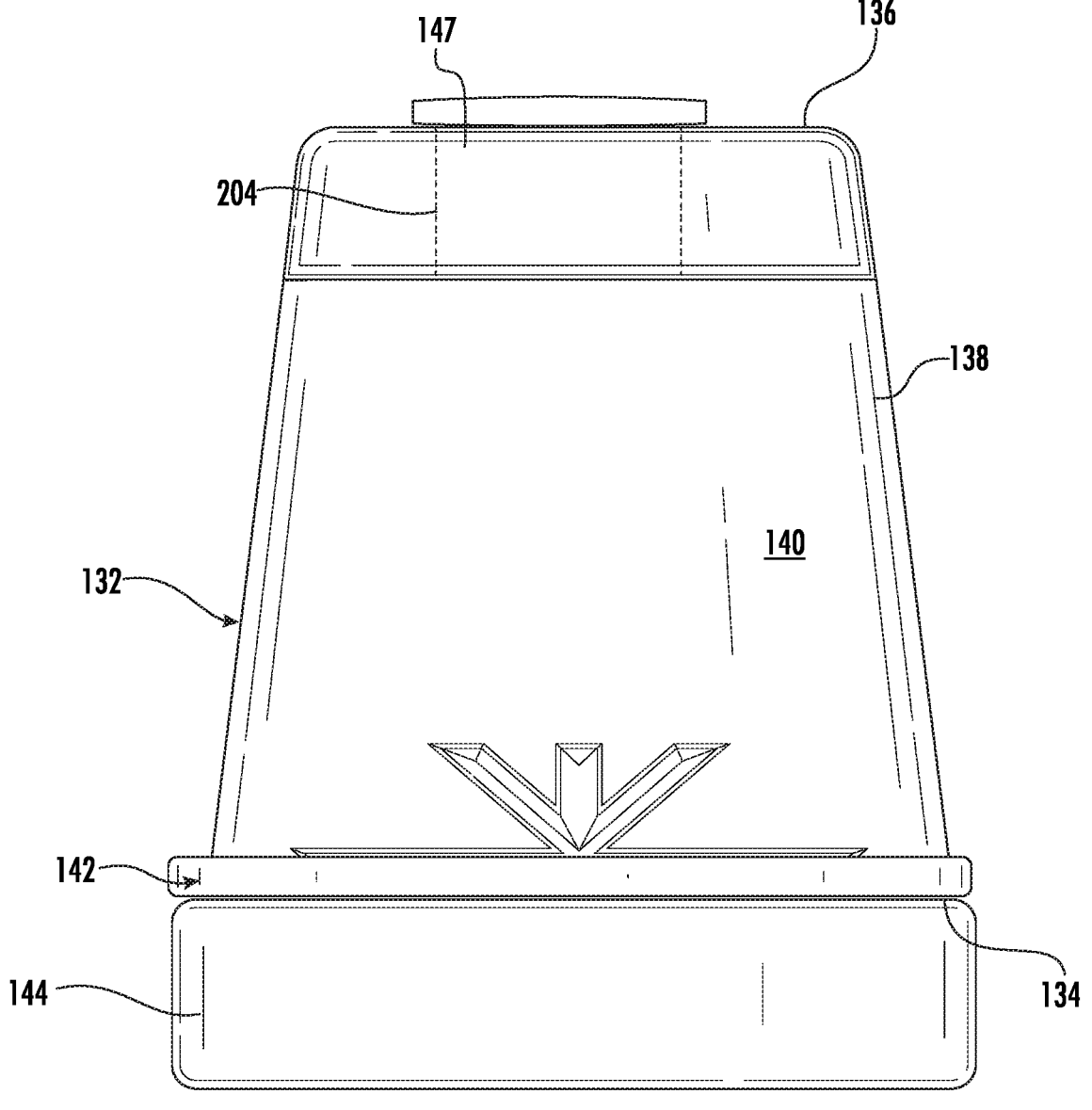
FIG. 17A is a front view of an attachment including a cap member.

With reference now to FIGS. 17 and 17A, another implementation of an attachment 130 suitable for use with the food processing base is illustrated. As shown, the attachment 130 similarly includes an inverted jar or container 132 having a first open end 134, a second generally closed end 136, and one or more sidewalls 138 extending between the first end 134 and the second end 136 to define a hollow interior or processing chamber 140 of the container 132. The attachment 130 further includes a first agitating member 142, such as a cutting assembly for example, configured to removably couple to the first open end 134 of the container 132 to seal the processing chamber 140. The attachment 130 may further include a second agitating member 160 selectively positionable within the chamber 140. In the illustrated, non-limiting implementation, a removable seal or cap member 147 (see FIG. 17A) is positionable within an opening, illustrated schematically via broken lines at 204, formed at the second end 136 of the container 132, and the second agitating member 160 is a tamper that is insertable into the chamber 140 via the opening 204. Accordingly, a user may remove the cap member 147 and insert the tamper 160 the opening 204 in the second end 136. A user may then manually manipulate the tamper 160 to push unprocessed food or food stuck at the sidewall of the container towards the cutting assembly 142. When a user is finished using the tamper 160, the cap member 147 may be reinserted into the opening 204 to seal the second end 136 of the container 132. It should be understood that the first agitating member 142 may be operated when either the tamper 160 or the cap member 147 is inserted within the opening 204.

As shown, the tamper 160 has a generally cylindrical body 206 having a diameter smaller than the diameter of the opening 204; however, it should be understood that a body 206 having any cross-sectional shape is within the scope of the disclosure. A radially outwardly extending flange 208 is connected to the cylindrical body 206 adjacent a first end 210 thereof. The diameter of the flange 208 is greater than the opening 204 to restrict the end 210 of the tamper 160 from falling through the opening 204 into the chamber 140. As a result, in use, a portion of the tamper 160 is positioned within the chamber of the container 132 and a portion of the tamper 160 remains adjacent an exterior of the container 132. In any implementation including a tamper 160, the cylindrical body 206 of the tamper 160 arranged within the chamber 140 is operable as an agitating member to stir or move the one or more food items arranged within the chamber 140. The agitation performed by movement of the body 206 within the chamber 140 occurs in response to a manual input applied to the end 210 thereof.

Figure 18:
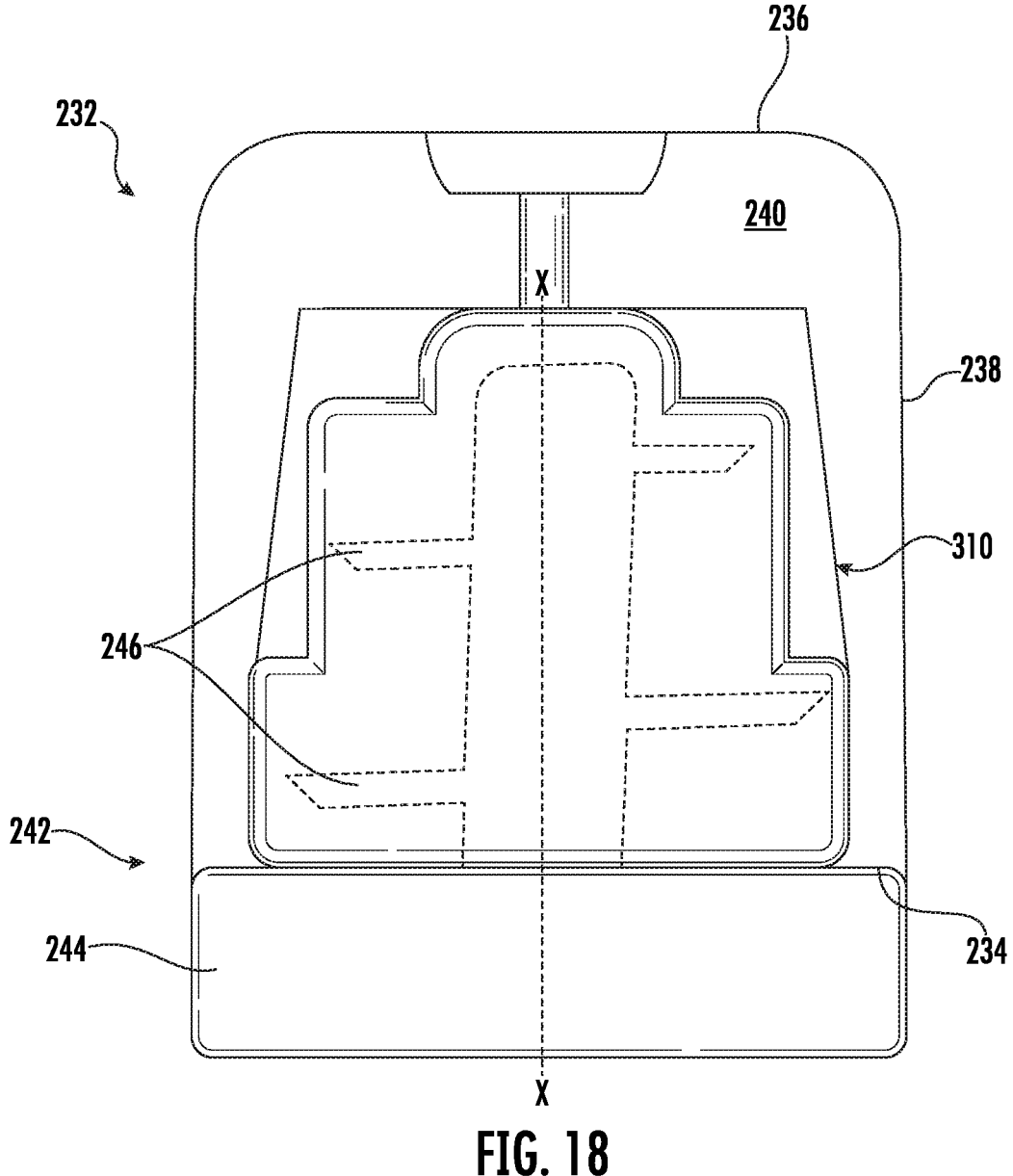
FIG. 18 is a front view of an attachment including an agitating member positioned in overlapping arrangement with the cutting assembly.
Figures 19, 20:
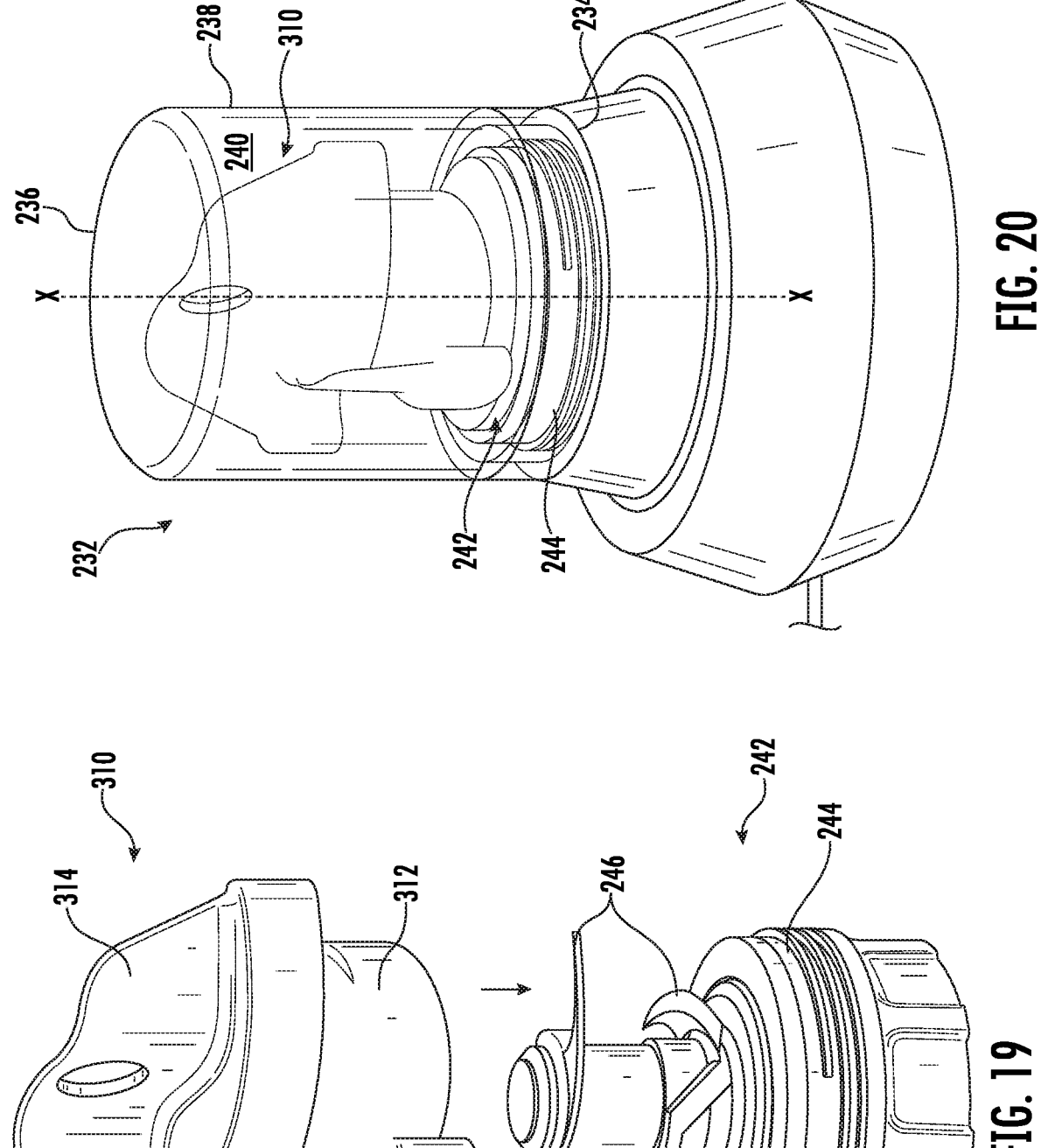
FIG. 19 is an exploded perspective view of an attachment including an agitating member positionable in overlapping arrangement with the cutting assembly.
FIG. 20 is a perspective view of a food processing system including an agitating member positioned in overlapping arrangement with the cutting assembly.

With reference now to FIGS. 18-20, another implementation of an attachment 230 suitable for use with the food processing base is illustrated. As shown, the attachment 230 similarly includes an inverted jar or container 232 having a first open end 234, a second closed end 236, and one or more sidewalls 238 extending between the first end 234 and the second end 236 to define a hollow interior or processing chamber 240 of the container 232. The attachment 230 further includes a first agitating member 242, such as a cutting assembly for example, configured to removably couple to the first open end 234 of the container 232 to seal the processing chamber 240. As previously described, the cutting assembly 242 typically includes a body 244 and one or more blades 246 rotatable about an axis X relative to the body 244. The container 232 may, but need not include a second agitating member 60, 160 positioned within the processing chamber, adjacent the second end 236 of the container 232, as described above.

In the illustrated, non-limiting implementation, another agitating member 310 is positioned in overlapping arrangement with a portion of the cutting assembly 242. The agitating member 310 includes a body 312 having a generally hollow interior (not shown) within which the one or more blades 246 of the cutting assembly 242 are receivable (see FIG. 19). When the agitating member 310 is installed about the blades 246 of the cutting assembly 242, the body 312 of the agitating member 310 forms a cover or barrier to block the blades 246 from interacting with one or more food items within the chamber 240. Further, when the agitating member 310 is installed about the blades 246 of the cutting assembly 242, the agitating member 310 is rotationally coupled to the blades 246 of the cutting assembly 242. As a result, operation of the cutting assembly 242 drives rotation of the agitating member 310 about the axis X, and this rotation is used to perform a processing operation via the agitating member 310.

A contour of the exterior of the agitating member 310 may be shaped to perform a desired processing operation. In an implementation, the agitating member 310 is operable to perform a mixing operation rather than a cutting or chopping operation. As best shown in FIGS. 19 and 20, the body 312 of the agitating member 310 may be formed with a plurality of generally arcuate contours. Further, a paddle 314 having a large surface area may extend generally perpendicularly from an end 316 of the body 312, such as towards the second end 236 of the container 232 for example. Rotation of the body 312, and therefore the paddle 314, causes the food items within the chamber to swirl about the axis and mix together. It should be understood that the configuration of the agitating member 310 illustrated and described herein is intended as an example only, and that any suitable configuration is within the scope of the disclosure.

A single-serve or personal blending container including an agitating member 60, 160 or 210 as illustrated and described herein allows for the production of a thick, consistent culinary output, while minimizing excessive cavitation. Further, minimal input is required from a consumer to operate the processing assembly to encourage the flow of ingredients back towards the blades performing the blending operation.

Figure 21:
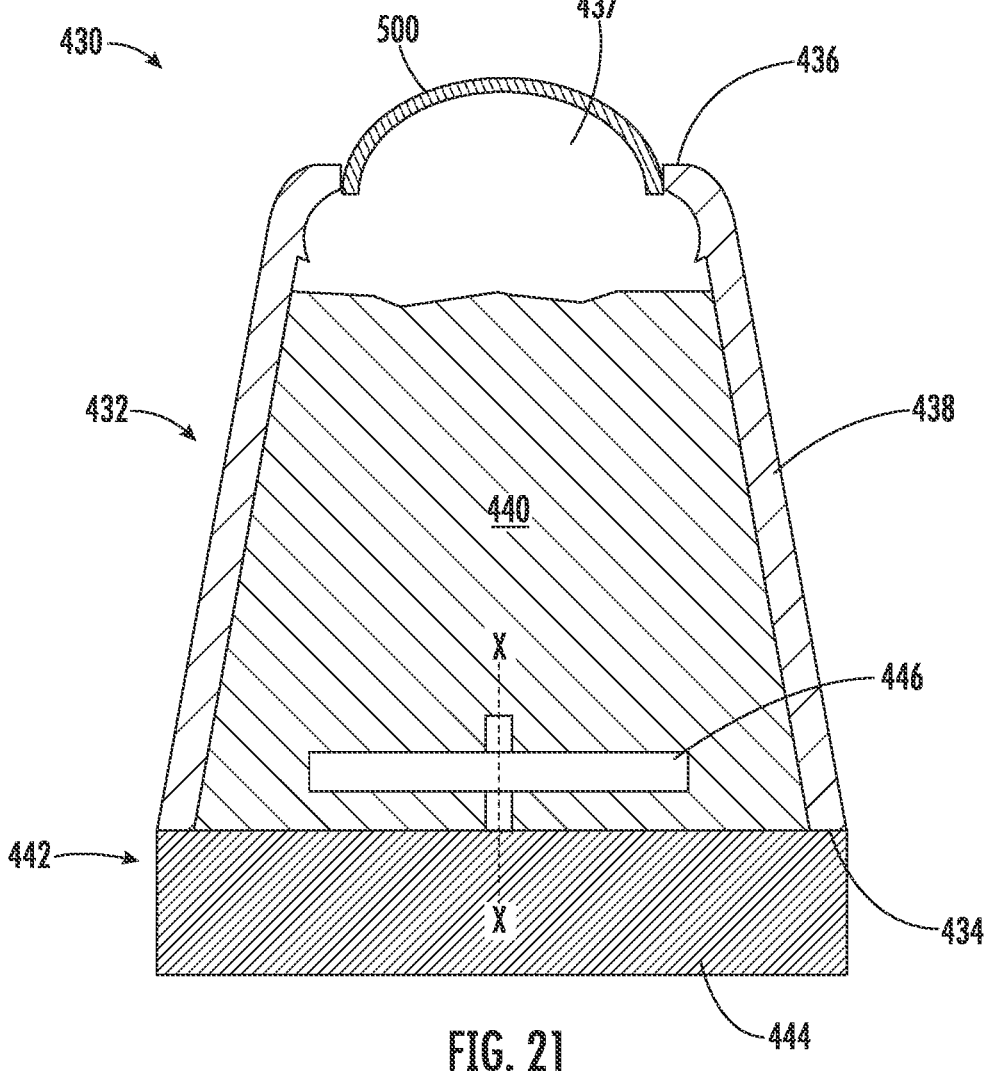
FIG. 21 is a front view of an attachment including a displacement member in a first configuration.
Figure 22:
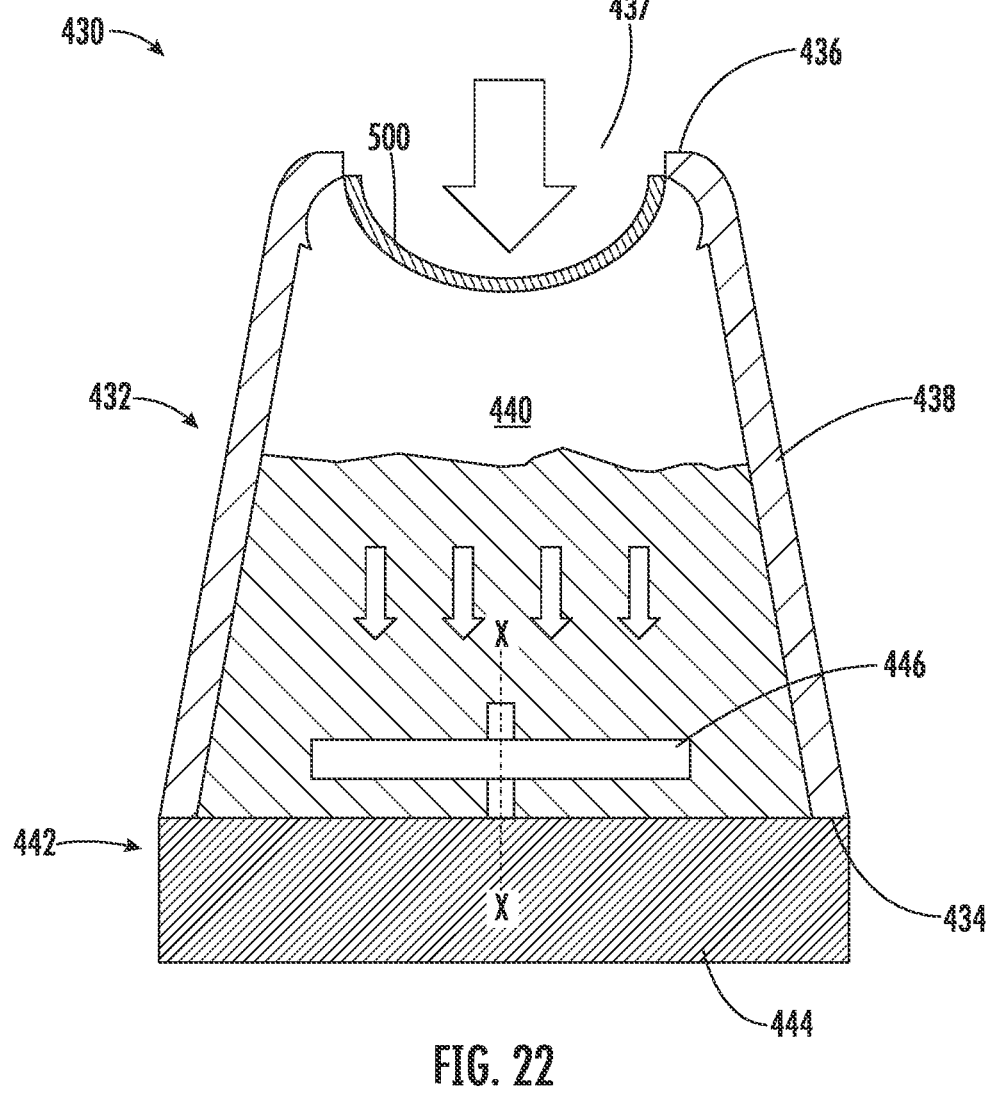
FIG. 22 is a front view of the attachment of FIG. 21 when the displacement member is in a second configuration.

With reference now to FIGS. 21 and 22, an example of an attachment 430 according to yet another implementation is illustrated. In the illustrated, non-limiting implementation, the second end 436 of the container 432 is substantially open, or includes a wall having a generally centrally located opening 437 formed therein. A displacement member 500 is connected to the container 432 in overlapping arrangement with the opening 437, such that the displacement member 500 cooperates with the body of the container 432 to seal the second end 436 thereof. The displacement member 500 may be connected to an exterior surface, or alternatively, to an interior surface of the container 432. Further, the displacement member 500 may be removably or permanently connected to the container 432 via any suitable manner, such as via a connector or fastener for example. In an implementation, the displacement member 500 is over-molded relative to a portion of the container 432, such as the second end 436 for example.

The displacement member 500 may be formed from a resilient or flexible material such that the displacement member 500 is transformable between a first configuration (FIG. 21) and a second configuration (FIG. 22). In an implementation, the displacement member 500 is a diaphragm. However, it should be understood that a displacement member 500 formed from any suitable component is within the scope of the disclosure. When the displacement member 500 is in the first configuration, the displacement member 500 may be located partially, and in some implementations wholly, external to the processing chamber 440 of the container 432. In implementations where the displacement member 500 is mounted at an interior of the container 432, in the first configuration, the displacement member 500 may, but need not extend through the opening 437 formed in the second end 436 of the container 432. In the second configuration, the displacement member 500 extends inwardly into the processing chamber 440 of the container 432, towards the first end 434. In implementations where the displacement member 500 is mounted at an exterior of the container 432, when in the second configuration, the displacement member 500 extends through the opening 437 formed in the second end 436 of the container 432.

The processing chamber 440 of the container 432 has a processing volume in which foods are processed. In an implementation, a portion of the displacement member 500 defines a boundary of this processing volume, such as an upper boundary of the processing volume when the container 432 is attached to a food processing base 22 for example. The contour of the displacement member 500 may be selected such that the processing volume when the displacement member 500 is in the second configuration is reduced relative to the processing volume when the displacement member 500 is in the first configuration. When in the second configuration, the displacement member 500 occupies a portion of the processing chamber 440. In the illustrated, non-limiting implementation, the portion of the displacement member 500 that is received within the chamber 440, such as the portion that extends through the opening 437 of the second end 436 for example, has a concave contour. Accordingly, when the displacement member 500 is in the second configuration and occupies a portion of the processing chamber 440, the remaining portion of the processing chamber 440, such as extending between the first end 434 of the container 432 and the surface of the displacement member 500 facing the first end 434 for example, defines the reduced processing volume.

Further, the displacement member 500 may have a similar but opposite contour, such as a convex contour for example, when the displacement member 500 is in the first configuration. In such implementations, such as where a portion of the displacement member 500 is arranged external to the processing chamber 440 when in the first configuration, the processing volume of the container 432 includes not only the volume of the processing chamber 440 but also the additional volume defined by the portion of the displacement member 440 arranged external to the processing chamber 440. However, implementations where the processing volume is generally equal to or even slightly less than the volume of the processing chamber 440 and/or the container 432 when the displacement member 500 is in the first configuration are also contemplated herein. In such implementations, the contour of the displacement member 500 in the first configuration need not be generally equal and opposite to the configuration of the displacement member 500 in the second configuration.

In an implementation, the displacement member 500 is transformable from the first configuration to the second configuration in response to a manual input, such as application of a force to the displacement member 500 by a user. The force may be applied directly to a surface of the displacement member 500, such as to a portion of the displacement member 500 adjacent to, within, or overlapping the opening 437, or alternatively, may be applied indirectly to another component coupled to or associated with the displacement member 500.

During a food processing operation, at least a portion of the first agitating member 442 is rotated about its axis X to process, for example, chop, cut, dice, blend, or mix, the contents of the food processing chamber. During a food processing operation, the contents of the food processing chamber 440 may be propelled outwardly, towards the sidewalls 438 of the container 432 and may stick thereto. To facilitate the return of these particles of food stuck to the sidewall 438 to the first end 434 of the container 432, the displacement member 500 is transformed to the second configuration. By pushing the displacement member 500 into the interior of the container 432, the volume of the processing chamber 440 is reduced. As a result, the pressure within the processing chamber 440 is increased, thereby pushing the food downwardly towards the cutting assembly 442. In an implementation, this increased pressure acts on and loosens the stuck food particles within the container 432. This transformation of the displacement member 500 from the first configuration to the second configuration may occur when the first agitating member 442 is operational, or alternatively, when the rotatable blade 446 of the first agitating member 442 is stationary, such as after a processing operation or during a pause of a processing operation.

In response to further processing, such as rotation of the cutting assembly 442 about its axis X, the heat and pressure within the processing chamber 440 will increase. Because of its resilient nature, the increased pressure within the processing chamber 440 acting on a surface of the displacement member 500 will cause the displacement member 500 to deform. In an implementation, this pressure will move the displacement member 500 through the opening 437, to an exterior of the container 432. Accordingly, this increased pressure generated by operation of the first agitating member 442 will ultimately transform the displacement member 500 from the second configuration back to the first configuration. Although the displacement member 500 is not illustrated or described herein as including a second agitating member, it should be understood that implementations where a second agitating member is arranged within the interior of the container 432 and operably coupled to the displacement member 500 are also contemplated herein.

Figure 23A:
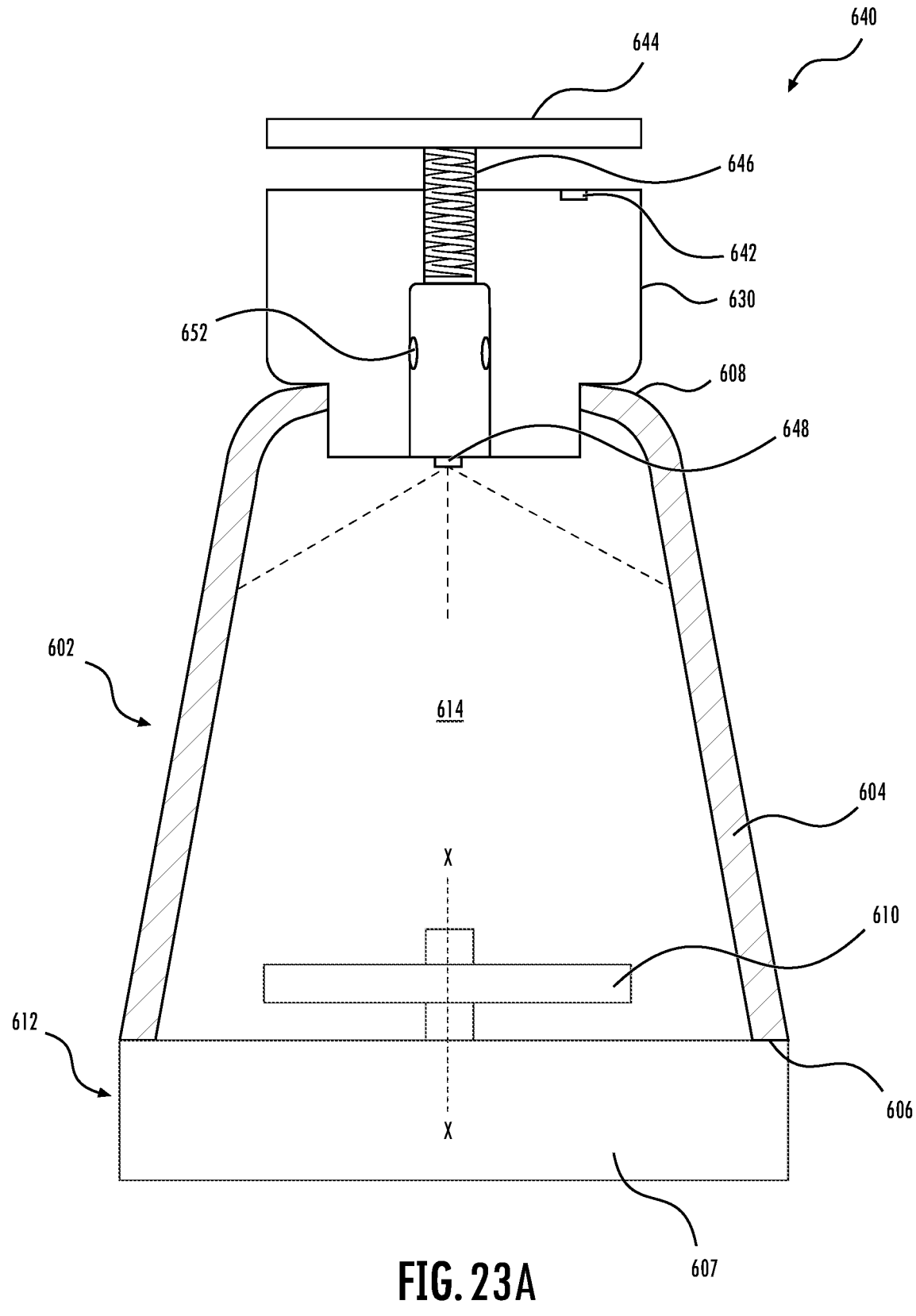
FIG. 23A is a front view of an attachment including a fluid agitator and/or pump.
Figure 23B:
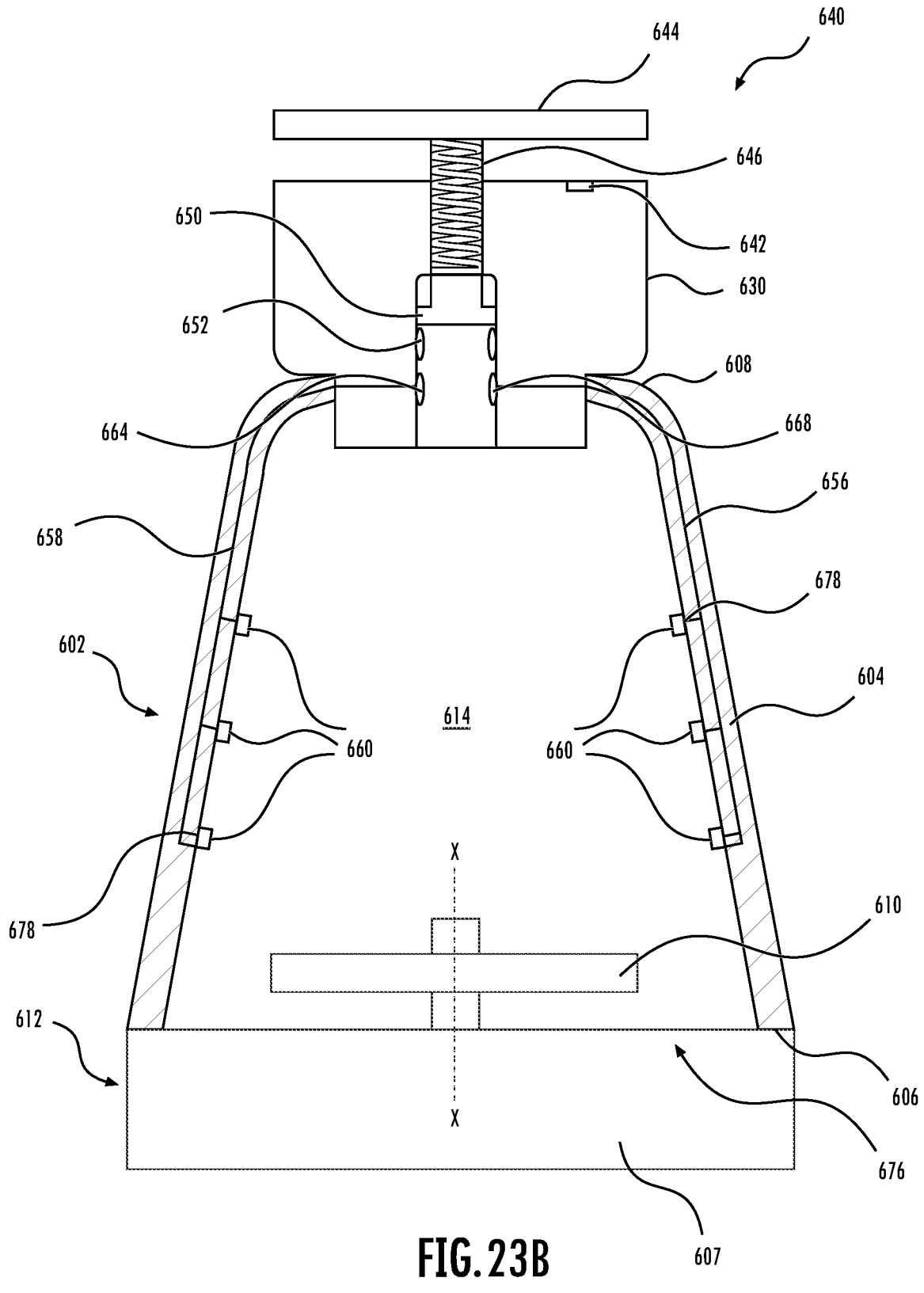
FIG. 23B is a front view of an attachment including a fluid agitator and/or pump.
Figures 24, 25:
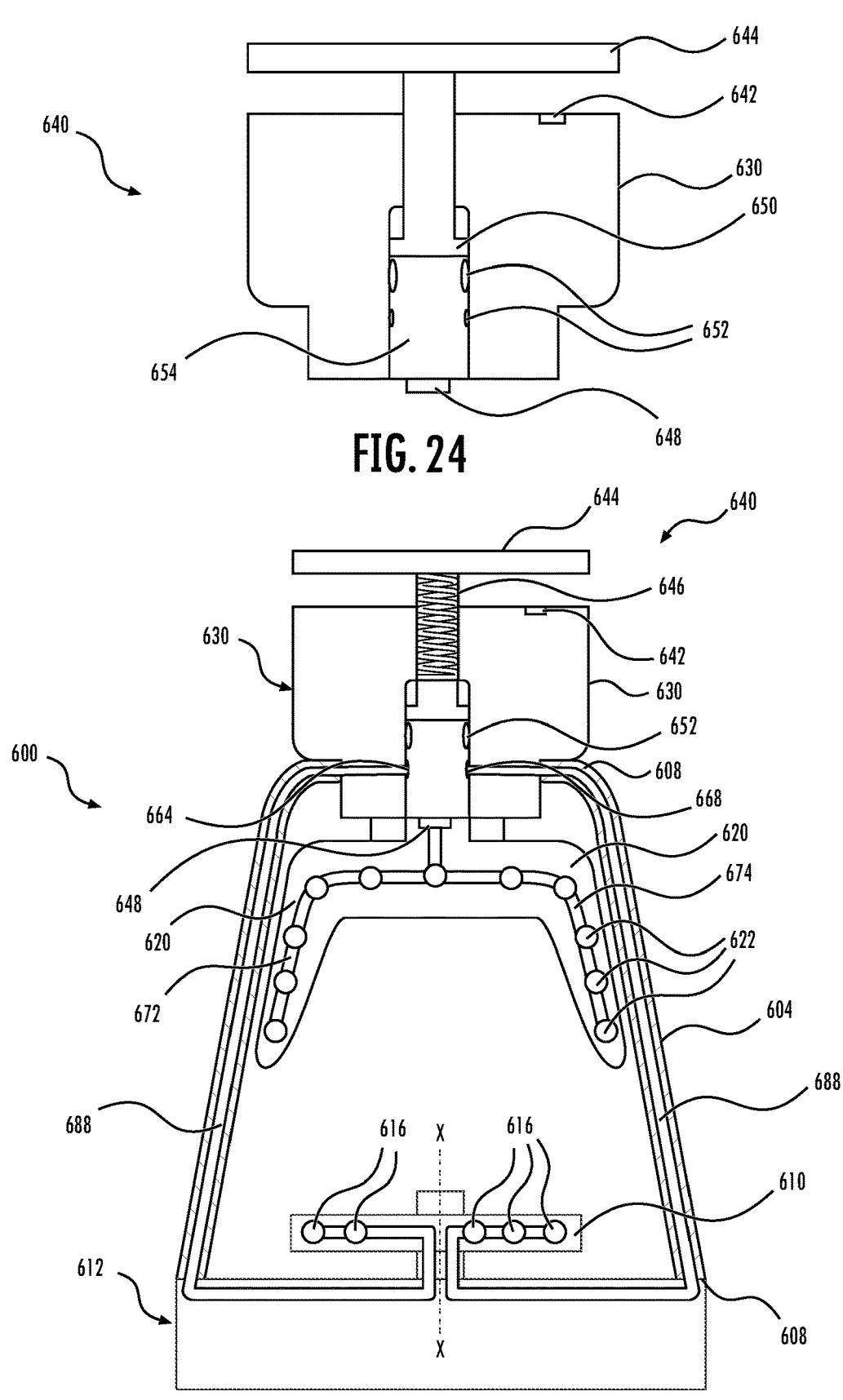
FIG. 24 is a front view of the fluid agitator and/or pump of FIGS. 23A-C.
FIG. 25 is a front view of an attachment including a fluid agitator and/or a pump according to an implementation.

FIGS. 23A, 23B, and 25 illustrate attachment 600 of the food processing system 20 suitable for use to process a thick or frozen mixture. As shown, the attachment 600 includes a container body 602 having sidewall 604, a first end 606 and a second end 608. The sidewall 604 in combination with one or more ends 606, 608 of the container 602 define a hollow interior or processing chamber 614 of the container 602. The attachment 600 includes a first agitating member 610 which includes a cutting assembly and is at least partially disposed within a chamber 614.

As discussed above in relation to FIGS. 3 and 4, the first end 606 of the container body 602 is open and the first agitating member 612 may be removably coupled to the first end 606 in such a way as to attach to the container body 602.

In other words, the first agitating member 612 is receivable at the first end 606. After installment of the first agitating member 612, the first end 606 is closed and sealed. The first agitating member 612 includes a body 607 and one or more blades 610 to cut, chop, blend, or, in general, process food. When the first agitating member 610 is installed on the container 602, the blades 610 are disposed within the container 602. The container 602 may be threadably coupled to the first agitating member 612. However, other mechanisms for removably connecting the container 602 to the first agitating member 612 are also contemplated here including, for example, a snap connection, magnetic connection, bayonet connection, and so on. In each of the various attachment configurations, the first agitating member 612 is configured to operably couple to the food processing base 22 of the food processing system 20.

As shown in FIG. 25, the attachment 600 can also include a second agitating member 620 positioned at the second end 608 of the container body 602 and at least partially disposed within the processing chamber 614 of the container body 602. The structure and mechanism of second agitating member 620 may be similar to the second agitating members discussed in FIGS. 3-20.

Referring back to FIGS. 23A and 25, the attachment 600 includes a fluid agitator and/or pump 640 to assist in removing ingredients from the interior of chamber 614 by directing fluid toward the interior of the chamber 614. The fluid agitator and/or pump 640 is in fluid communication with its surrounding environment and receives fluid via inlet 642. The pump 640 can receive any kind of fluid via inlet 642 when an actuator 644 (arm 644) is extended. In some implementations, the fluid is air. The fluid may include a liquid such as water and/or an ingredient derived from or related to the fluid such as milk, juice, coffee, and so on. In some implementations, pump 640 includes a spring 646 in physical communication with the actuator 644 and pump reservoir 630. Actuation of arm 644 may happen in various ways. In one application, a user may apply a downward force and/or press down on arm and/or platform 644 to actuate and/or initiate the agitation process. The arm may be spring-loaded via spring 646 such that when the user releases the arm 644, the arm 644 returns to an extended and/or ready position for subsequent actuation. In some implementations (shown in FIG. 24), the fluid agitator and/or pump has a displacement member 650. The displacement member 650 can be any flexible membrane. In some implementations, the displacement member 650 is a diaphragm. In this case, the actuator arm 644 is actuated by a downward force applied by a user and returned to a ready position through a restorative force such as a spring 646. The displacement member 650 and/or actuator arm 644 may also or alternatively be restored to the ready position when fluid fills chamber 654. However, in some implementations, the restorative force of, for example, spring 646 draws the actuator arm 644 and member 650 upward which, in turn, draws fluid into chamber 654 so that chamber 654 is at least partially filled and arm 644 is extended and ready for a user to initiate a subsequent fluid agitation event. The fluid fills chamber 654 via openings 652 to enable the displacement member 650 to then force the fluid out of chamber 654 upon application of pressure or force to arm 644 and a downward motion of member 650 toward outlet 648. Inlet 642 may include a one-way check valve and/or similar mechanism arranged to allow fluid to enter reservoir 630, but not exit via inlet 642. Openings 652 may include a one-way check valves and/or similar mechanisms arranged to allow fluid to enter chamber 654, but not exit. While FIG. 24 illustrates one type of fluid agitator and/or pump, other fluid agitators and/or pump devices may be implemented that one or ordinary skill would be readily able to implement.

As discussed above, the fluid agitator and/or pump 640 receives fluid via inlet 642 to fill the pump reservoir 630 (pump chamber 630). The restorative force of, for example, spring 646 draws the actuator arm 644 and member 650 upward which, in turn, draws fluid into chamber 654 from reservoir 630 so that chamber 654 is at least partially filled and arm 644 is extended and ready for a user to initiate a fluid agitation operation or event. When the actuator 644 is actuated, e.g., pressed, pushed down, extended, or actuated in any mechanical operation, the fluid in chamber 654 is expelled via an outlet 648 into the interior of the chamber 614. The expelled fluid will impact at least a portion of any materials adhering to sidewall 604 and/or the second agitator with sufficient force to overcome any adhesion or other forces holding the materials against sidewall 604 to, thereby, release the materials to fall toward the first agitator for further processing. This process can be repeated as long as there is sufficient fluid in reservoir 630 to draw into chamber 654.

Outlet 648 may include an opening along an interior surface of sidewall 604. In some configurations, outlet 648 includes a nozzle arranged to disperse the fluid expelled into chamber 614. The nozzle may be arranged to direct the fluid in a predetermined direction or multiple predetermined directions from the outlet 648. Alternatively, outlet 648 may include an opening that is oriented and/or configured to direct fluid in a predetermined direction or multiple predetermined directions. Outlet 648 may include multiple openings with each opening being oriented to direct fluid flow toward an area of chamber 614. The orientations of the multiple openings may be coordinated to optimize a force generated by the fluid against a portion of food material in chamber 614 such that, for example, the food material is directed downward toward the first end 676.

FIG. 23B shows an implementation where the fluid may be directed by a fluid agitator to one or more regions of the chamber 614 via one or more channels 656 and 658 in communication via one or more chamber outlets 664 and 668. Channel 656 may include one or more outlet openings 660. Each outlet opening 660 may include an outlet nozzle 678 and/or be oriented or configured to direct fluid flow in a predetermined direction such as in a downward direction or in a counter direction to the flow of food material generated by the first agitating member 612. Channel 658 may include one or more outlet openings 662. Each outlet opening 662 may include an outlet nozzle 678 and/or be oriented or configured to direct fluid flow in a predetermined direction such as in a downward direction or in a counter direction to the flow of food material generated by the first agitating member 612.

The one or more channels 656 and 658 may be located on or within any parts, or combination thereof, of the interior of the container body 602. For example, the channels may be on or within the blades 610, second agitating member 620, sidewalls 604, or first agitating member 612. The one or more regions of the chamber 614 may include, sidewalls 604, first agitating member 612 at a first end 676, second agitating member 620 at second end 608, or blades 610.

Figure 23C:
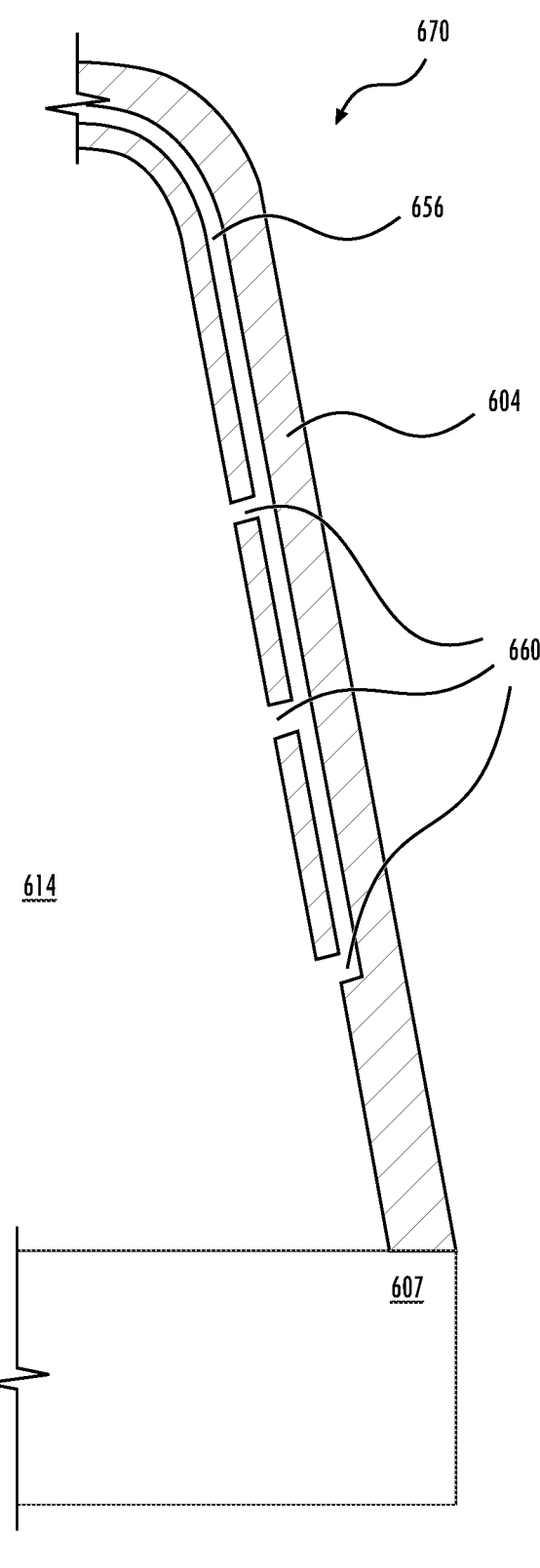
FIG. 23C is a zoomed-in side view of a sidewall and fluid channel of the attachment of FIG. 23B.

FIG. 23C shows a zoomed-in side view 670 of sidewall 604 and fluid channel 656 including multiple openings 660 arranged to direct fluid from channel 656 into chamber 614. As show in FIG. 25, channels 672 and 674 are located on the second agitating member 612 and fluid is expelled through outlets 622 into the chamber 614. The blades 610 also include openings/outlets 616 to expel the fluid to the chamber 614, similar to the outlets 622, to release and/or detach any ingredients stuck or adhering to the interior of the chamber body 602 during the operation of the first agitating member 612. The fluid enters the channels 686 and 688 via outlets 664 and 668 of the pump 640 and passes through outlets 616 of the blades 610 of the first agitating member 612. As a result, the released ingredients from the sidewall will be processed again by the cutting assembly 612 to produce more uniform product.

Figure 26:
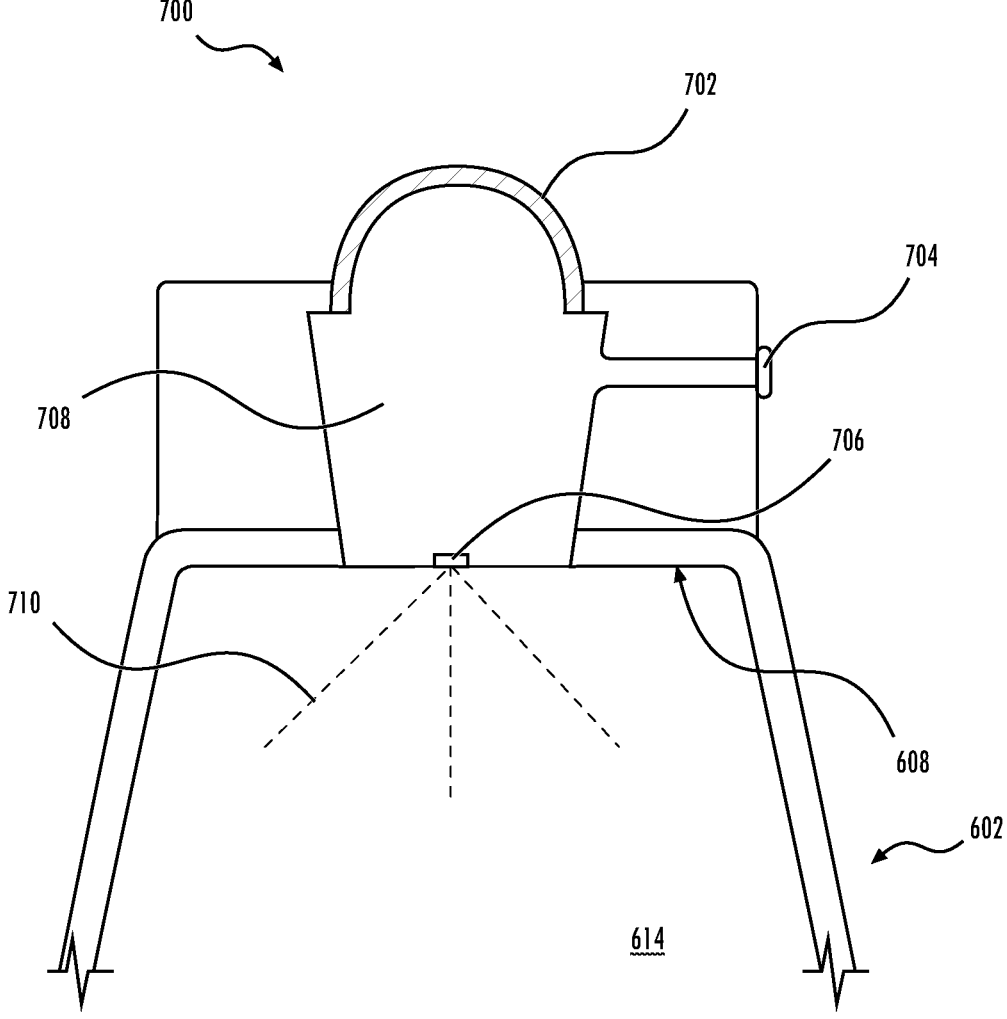
FIG. 26 is a front view of a fluid agitator and/or a pump according to an implementation.

FIG. 26 shows a fluid agitator 700 located at the second end 608 of container body 602. Displacement member 702 consists of material arranged to deform when pressed downward by an operator which, in turn, compresses the fluid in chamber 708 that is then expelled into chamber 614 via one or more streams 710. Displacement member 702 may consist of similar materials and operate in a similar manner as displacement member 500 of FIGS. 21 and 22. When displacement member 702 is released, member 702 returns to its original un-deformed configuration which pulls fluid into chamber 708 via inlet 704. Hence, when displacement member 702 returns to its un-deformed position, fluid agitator 700 is ready to perform another fluid agitation operation. Fluid inlet 704 may include a one-way check valve and/or restrictor to only allow fluid to enter chamber 708 but not exit chamber 708 via inlet 704. In some implementations, the fluid agitator of FIGS. 23A through 26 is included in a second agitating member 60 receivable at the first end of the container body. But, in other implementations, the fluid agitator may be located at any location exterior to the chamber 614 and/or within or adjacent to a portion of the container body 602. In some configurations, the second agitating member may include an agitating device in addition to the fluid agitator of FIGS. 23A to 26.

Figure 27:
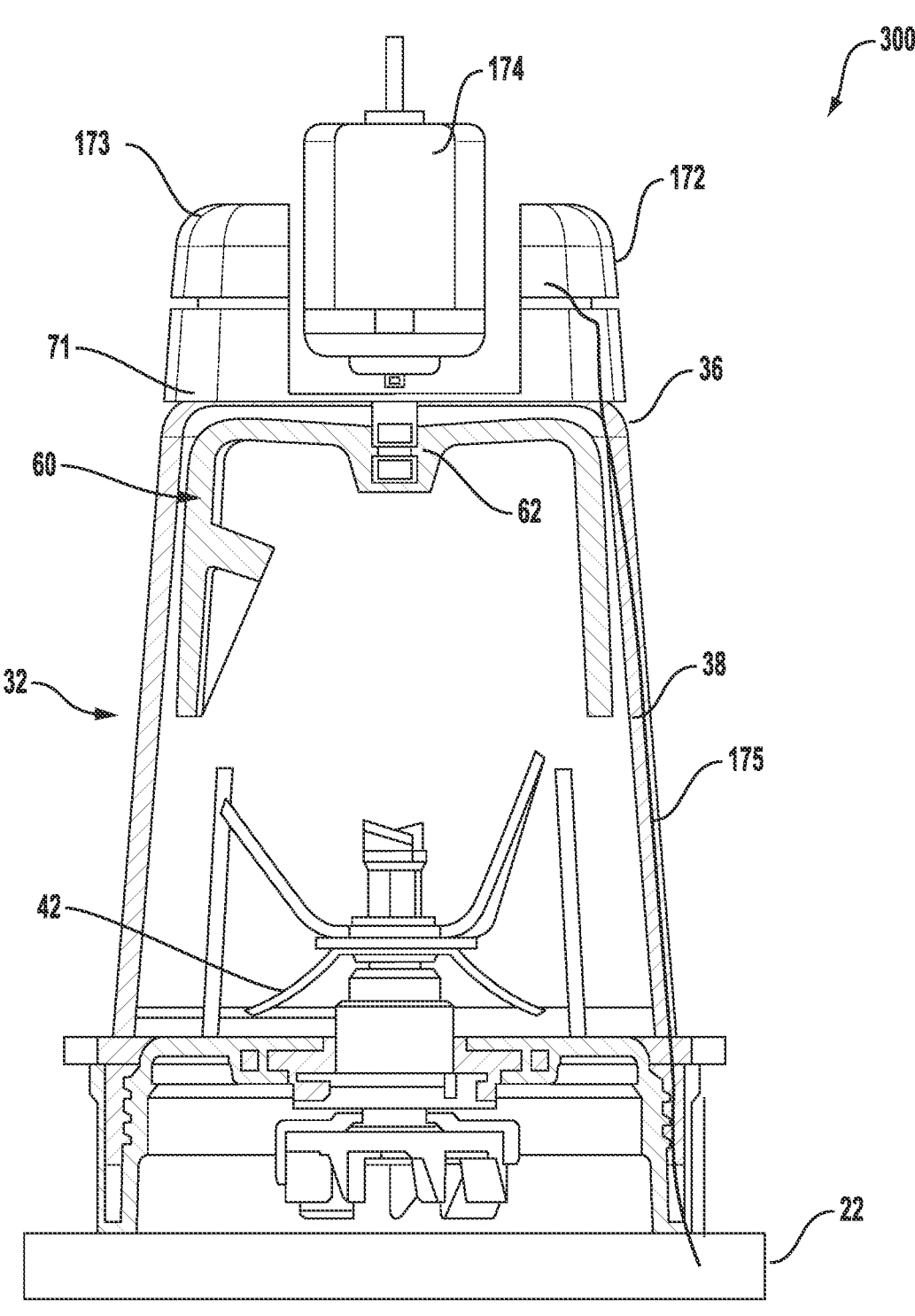
FIG. 27 is a front view of an attachment including a device.

In another implementation of an attachment 300 shown in FIG. 27, the second agitating member 60 is automatically rotated by motor 172. The motor 172 can be electrically driven by battery 174 via an electrical connection. As shown on FIG. 27, the battery 174 is located on top 173 of the motor 172. However, battery 174 does not need to be physically located in proximity with or near motor 172. In some implementations, motor 172 is coupled via a drive shaft 62 to the second agitating member to effect rotation of the second agitating member 60 corresponding to rotation of the shaft 62 of motor 172. The motor 172 may be connected to the shaft 62 at a location external to the container 32. As shown in FIG. 27, the motor 172 and the second agitating member 60 are disposed on opposite sides of the mounting member 71. However, in other configurations, the mounting member 71 and the motor 172 may be located near or directly adjacent to the second sealed end 36 of the container 32. The motor 172 may have an electrical connection with a power source in the base 22 of the food processing system. In certain configurations, the container 32 include an electrical conduit arranged to convey an electrical drive signal to motor 172 from an electrical power source in the base 22. In some configurations, the motor 172 is in direct electrical connection with the base 22 through electronic connections 175. As explained with respect to manual input device 72, the motor 172 is rotatable in one or more directions to drive rotation of the second agitating member 60 about axis Y to "scrape" or loosen food stuck at the sidewall 38 of the container 32.

In some implementations, the motor 172 is continuously operating, e.g., rotating, as the food processor operates. In some configurations, the motor 172 is simultaneously rotating with the operation of the first agitating member 42. The second agitating member 60 is also rotating while the motor rotates to scrape and/or loosen the food stuck at the sidewall 38 and/or push the food downwardly toward the cutting assembly 42 while the first agitating member/cutting assembly 42 operates. In some implementations, the motor 172 rotates in one direction during the whole operation. In other configurations, the motor 172 rotates in one direction, e.g., clockwise, during a first portion of the operation of the motor 172 and changes its direction of the rotation, e.g., counterclockwise direction, during a second portion of operation of the motor 172. In another implementation, the motor 172 changes its rotation after one or more cycles of the rotation in one direction, e.g., clockwise, and continues to change the direction of its rotations after each set of cycles in one direction. This may result in a better processed food product of the food processing system by enhancing the ability of second agitating member 60 to loosen and scrape any food stuck to the sidewall 38.

Alternatively, or in addition, in some implementations, the motor 172 may be operable to translate the second agitating member 60 along the axis Y, such as to push food downwardly towards the cutting assembly 42. In such configurations, the motor 172 may be threadably coupled to the container 32 (see FIG. 9), such that rotation of the motor 172 causes the second agitating member 60 to both rotate and translate in axial direction, resulting in movement of the second agitating member 60 along a helical and/or reciprocating path.

The motor 172 may be directly connected to the second agitating member 60 via a drive shaft such that a single turn of the motor 172 results in a corresponding single turn of the second agitating member 60. However, implementations where the motor 172 is indirectly coupled to the second agitating member 60, such as via a gearing mechanism, are also within the scope of the disclosure. In such configurations, a single turn of the motor 172 may result in several turns of the second agitating member, or alternatively, less than one turn of the second agitating member 60.

Figure 28B:
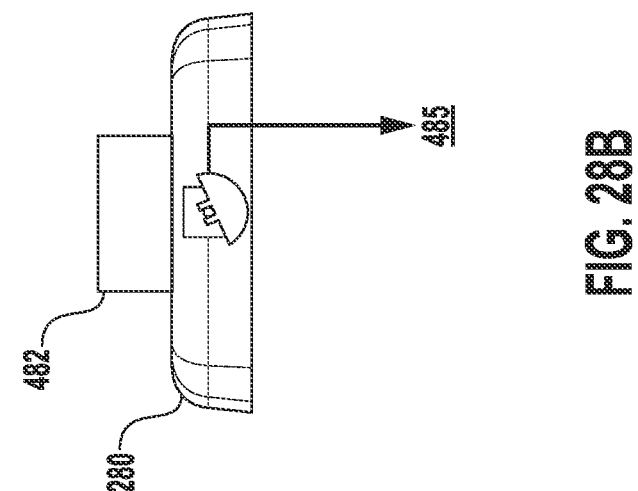
FIG. 28B is a zoomed-in side view of the vibrator of the attachment of FIG. 28A.
Figure 28A:
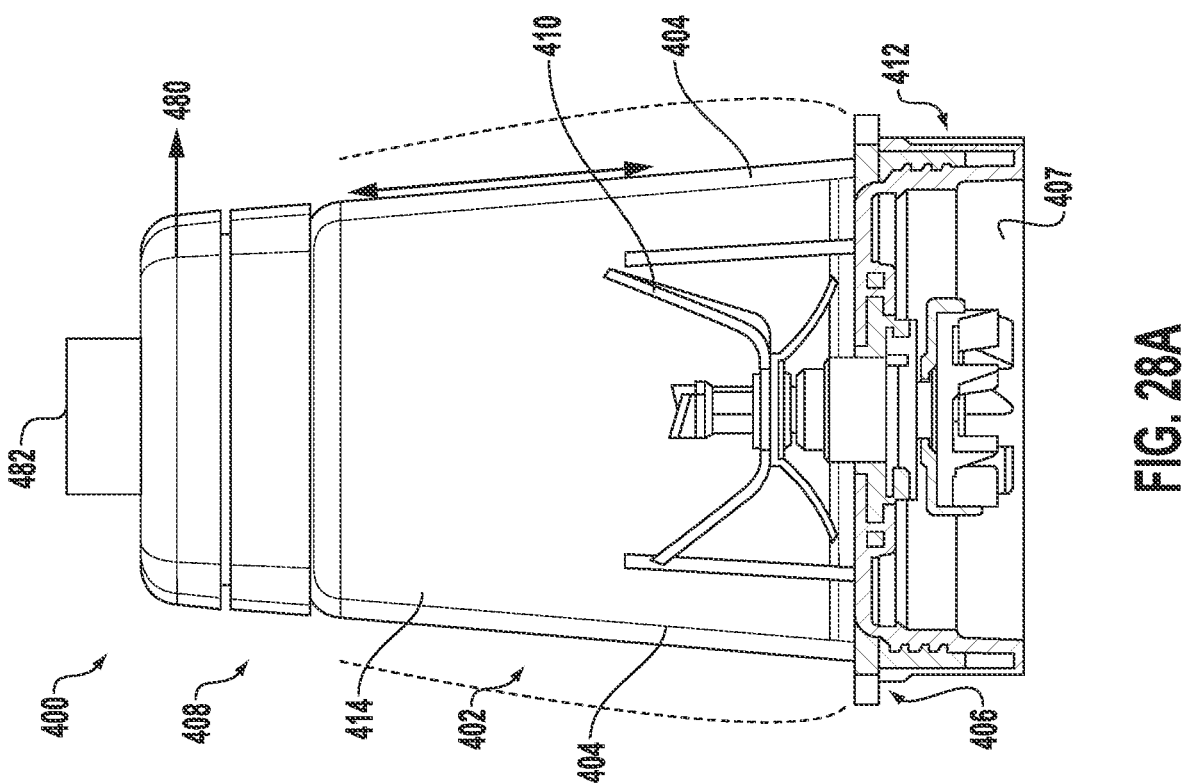
FIG. 28A is a front view of an attachment including a vibrator.

In another configuration shown in FIG. 28A, attachment 400 of the food processing system 20 is suitable for use to process a thick or frozen mixture. As shown in FIG. 28A, attachment 400 includes a container body 402 having sidewall 404, a first end 406 and a second end 408. The sidewall 404, in combination with one or more ends 406 and 408 of the container 402, defines a hollow interior or processing chamber 414 of the container 402. The attachment 400 includes a first agitator 410 having a cutting assembly that is at least partially disposed within a chamber 414.

As discussed above in relation to FIGS. 3 and 4, the first end 406 of the container body 402 is open and the first agitator 412 may be removably coupled to the first end 406 and attach to the container body 402. In other words, the first agitator 412 is receivable at the first end 406. After attachment of the first agitator 412, the first end 406 is closed and sealed. The first agitator 412 includes a body 407 and one or more blades 410 to cut, chop, blend, and/or process food. When the first agitator 412 is attached to the container 402, the blades 410 are also disposed within the container 402. The container 402 may be threadably coupled to the first agitator 412. However, other mechanisms for removably connecting the container 402 to the first agitator 412 may also be implemented including, for example, a snap connection, magnetic connection, bayonet connection, and so on. In each of the various attachment configurations, the first agitator 412 is configured to operably couple to the food processing base 22 of the food processing system 20. In some implementations, the attachment 400 also includes a vibrator 480 arranged adjacent to and/or in contact with the container body 402. As shown in FIG. 28A, the vibrator 480 may be located at the second end 408 of the container body 402.

Figure 29:
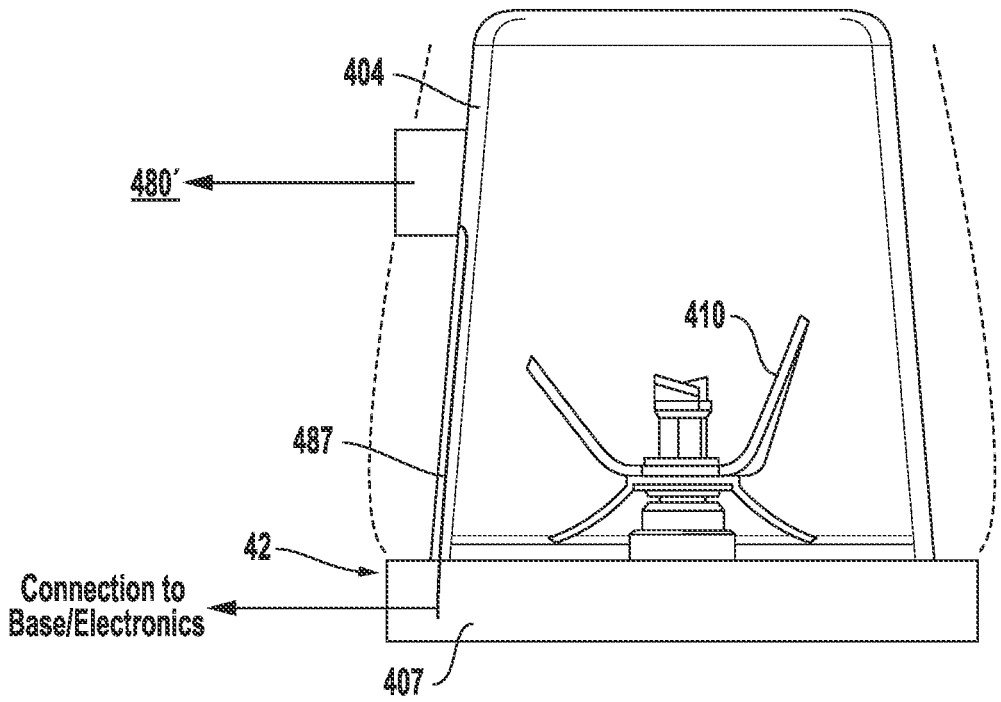
FIG. 29 is a front view of an attachment including a vibrator.

FIG. 29 is a front view of an attachment including a vibrator 480' located on the sidewall 404 of the container body 402. When the vibrator 480, 480' is activated, it vibrates the container body 402. Vibration of the container body 402 will loosen the food stuck to the sidewall 404, enabling the food to move toward the center of the chamber 414 and/or toward the first end 406 where the cutting assembly 412 is located. This will result in a more uniform processed food by the food processing system 20. The vibrator 480, 480' can vibrate the container body 402 during a period of operation of the food processing system 20 or during the entire time of operation of the food processing system 20. In some implementations, shown in FIGS. 28A, 28B, and 24, the vibrator 480 may include a direct current (DC) motor 485 arranged to generate haptic signals and/or vibrations. As shown in FIGS. 28A-28B, the DC motor 485 can be powered by a battery 482. In other configurations, the DC motor 485 may be connected electrically through connection 487 to the base 42 of the food processing system 20. In some configurations, the food processing system 20 provides the necessary power for the operation of the vibrator 480, 480' (shown in FIG. 29). A user may activate and/or deactivate the vibrator 480 or 480' via a user interface and/or switch. Activation and/or deactivation of vibrator 480 or 480' may be controlled automatically by a controller and/or processor.

Figure 30:
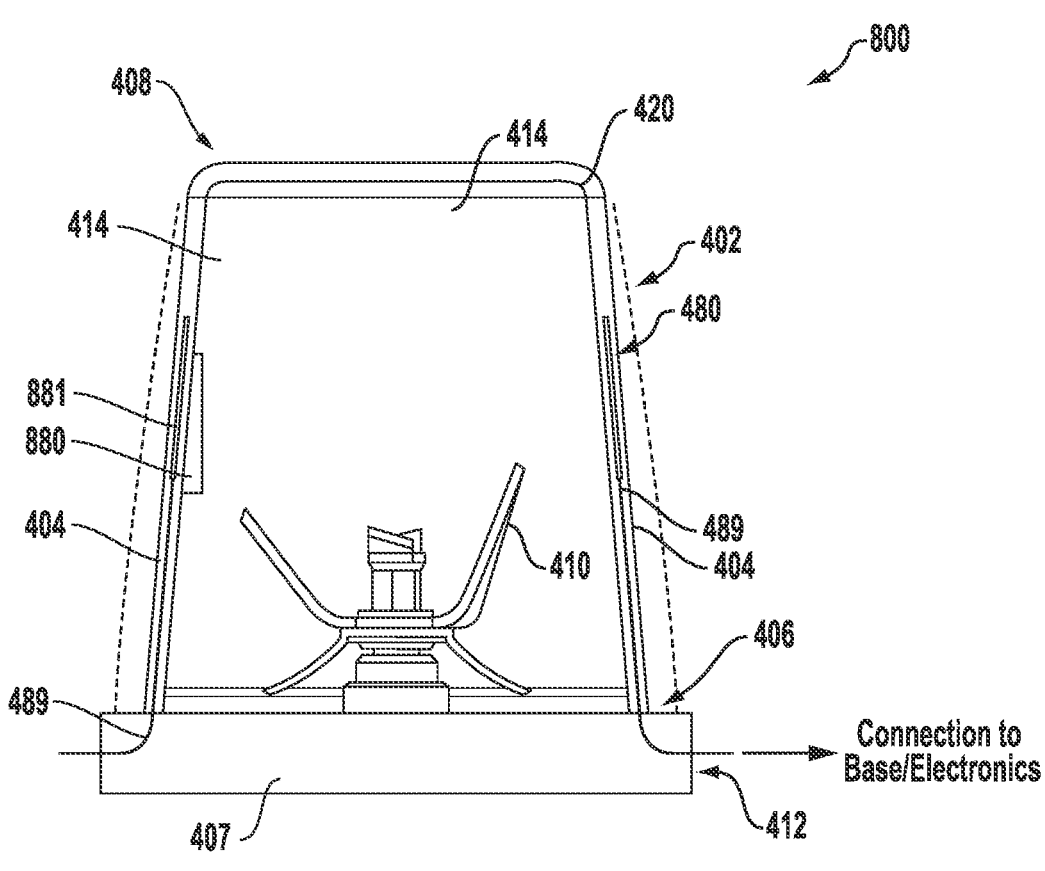
FIG. 30 is a front view of an attachment including a vibrator.

FIG. 30 shows another implementation of an attachment 800 of the food processing system 20 suitable to process a thick or frozen mixture. As shown, the attachment 800 includes sonic vibrator 880 that is in contact with the container body 402. The container body 402 has sidewall 404, a first end 406 and a second end 408. The sidewall 404, in combination with one or more ends 406 and 408 of the container body 402, define a hollow interior or processing chamber 414 of the container body 402. The attachment 800 includes a first agitator 410 having a cutting assembly that is at least partially disposed within chamber 414. The sonic vibrator 880 may be located in portions or regions of the sidewall 404 of the container body 402. In this configuration, the second end 408 is at least partially closed by end wall 420. The end wall 420 and the sidewall 404 may form a unitary structure. In some configurations, the second end 408 is completely closed. However, the sonic vibrator 880 may also and/or alternatively be located on one or more portions or regions of the sidewall 404 on an exterior of the container body 402. For example, as shown in FIG. 30, the sonic vibrator 880 may be located on the sidewall 404 within the chamber 414. In some configurations, the sonic vibrator 880 may be located on or built in the end wall 420. Similar to the vibrator 480, 480', when the sonic vibrator 880 is activated, it vibrates the container body 402. Vibration of the container body 402 will loosen the food stuck and/or attached to the sidewall 404 causing the food to move toward the center of the chamber 414 or toward the first end 406 where the cutting assembly 412 is located. Therefore, the cutting assembly 412 processes the food, e.g., dice, chop, cut, slice, mix, blend, crush, and/or the like multiple times to achieve a more uniform processed food by the food processing system 20. The sonic vibrator 880 can vibrate the container body 402 during a portion or period of an operation of the food processing system 20 or during the whole time of the operation of the food processing system 20. Base 20 may be electronically connected through connections 489 to the sonic vibrator 880 to provide power. In some configurations, the sonic vibrator 880 may include piezoelectric crystals 881 such that when they are electrically powered, they mechanically deform to produce vibrations. A user may activate and/or deactivate sonic vibrator 880 via a user interface and/or switch. Activation and/or deactivation of sonic vibrator 880 may be controlled automatically by a controller and/or processor.

Figure 31A:
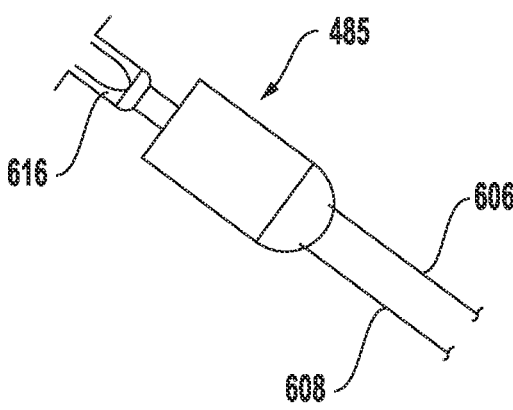
FIG. 31A is a perspective view of a DC motor.
Figure 31B:
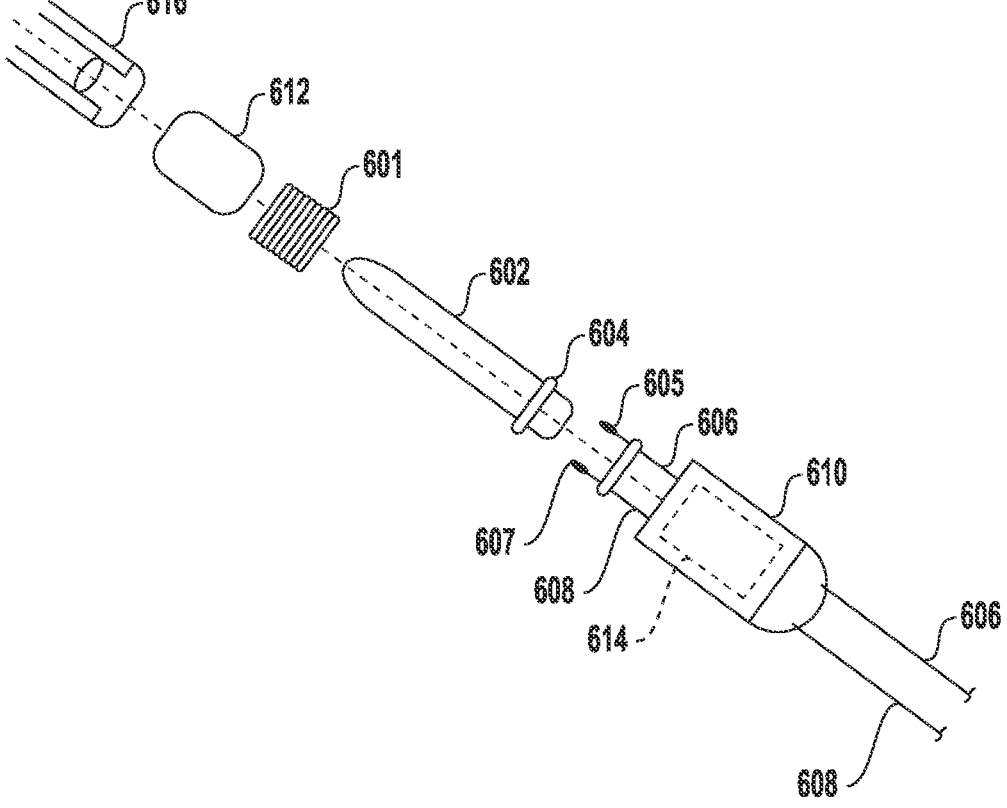
FIG. 31B is an exploded view of the Dc motor of FIG. 31A.

FIGS. 31A-31B show an exemplary implementation for a DC motor 485 used as a haptic signal generator and/or vibrator. The DC motor 485 can be any suitable DC motor. The armature 601 of the DC motor 485 is mounted on the shaft 602 and has windings terminated to a commutator 604. Motor terminals 606 and 608 are connected to the engine winding 610 through the electric motor brushes 605 and 607. The stator magnet 612 may have at least two permanent magnet poles. The electromechanical motor is designed such that opposite magnetic fields of the energized winding 610 and the stator magnet 612 cause the shaft 602 to rotate. When the armature 601 is aligned with the stator magnets 612, the brushes 605 and 607, which are also fixed to the housing 614, will connect to the next commutator segment and thereby energize another winding. This will change the magnetic field of the armature 601, which causes the motor 485 to continue rotating. The rotation of an unbalanced mass 616 caused by the rotation of the DC motor 485, results in vibration of the surface or object it is in contact with such as, for example, vibration of the vibrator 480 or 480'. That is, the rotation of mass 616 results in vibration of the container body 402. The frequency and amplitude of the vibration depends on several factors including, for example, the weight and/or radius of mass 616. Other types of motors and/or haptic signal generators may be used to generate vibrations including for example an alternating current (AC) motor, eccentric rotating mass (ERM) actuator, linear resonant actuator (LRA), and/or a piezoelectric actuator.

Figure 32:
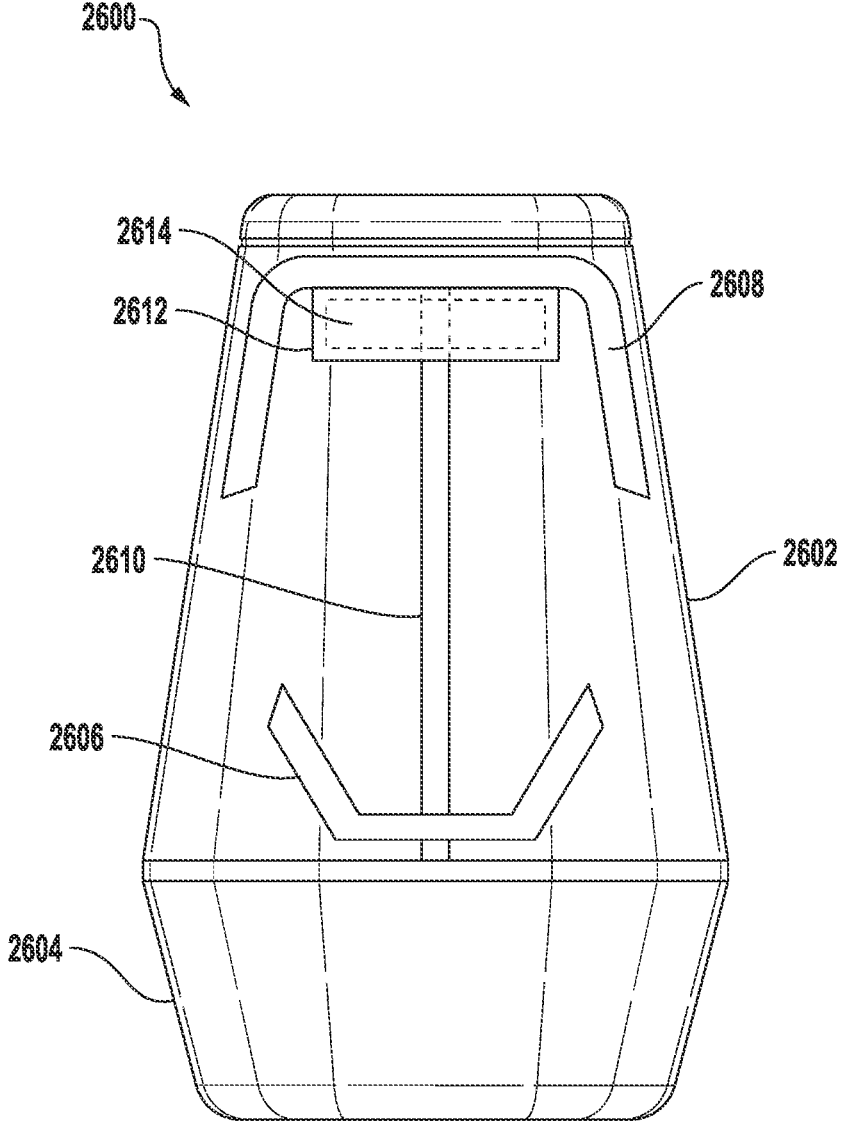
FIG. 32 side view of a food processor system including an attachment having a spring driven second agitator.

FIG. 32 shows a side view of a food processing system 2600 including an attachment and/or container body 2602 having a mainspring 2614 that drives rotation of second agitator 2608. System 2600 includes a base 2604 having a motor (not shown) arranged to drive shaft 2610 rotationally and, thereby, drive the rotation of first agitator 2606. In one configuration, shaft 2610 and first agitator 2606 are rotated in a clockwise direction. In another configuration, shaft 2610 and first agitator 2606 are rotated in a counter-clockwise direction. Shaft 2610 may also engage with second agitator 2608. Shaft 2610 may be coupled to mainspring 2614 within spring housing 2612. Spring housing 2612 may be coupled to second agitator 2608 and/or integrally formed as part of second agitator 2608.

In operation, in one implementation, mainspring 2614 is wound to a compressed position substantially against and/or adjacent to shaft 2610 while shaft 2610 and first agitator 2606 are rotated in a clockwise direction by a motor in base 2604. When the motor stops and first agitator 2606 and shaft 2610 stop rotating, mainspring 2614 will unwind and/or decompress, causing second agitator 2608 to rotate in a counter-clockwise direction (or opposite direction to the original motor-driven direction of rotation of shaft 2610 and first agitator 2606). To prevent overwinding or over-tightening of mainspring 2614, shaft 2610 may be coupled to mainspring 2614 via a slipping clutch as will be explained further in FIG. 33. Mainspring 2614 will rotate second agitator 2608 until it reaches an unwound and/or decompressed position. In such a process, second agitator 2608 via its blades will scrape and/or push food portions adjacent to the sidewall of container 2602 away from the sidewall and downward in container 2602. In some configuration, mainspring 2702 includes a stopwork or winding stops arranged to prevent mainspring 2702 from being wound excessively and/or prevent mainspring 2702 from unwinding excessively.

Figure 33:
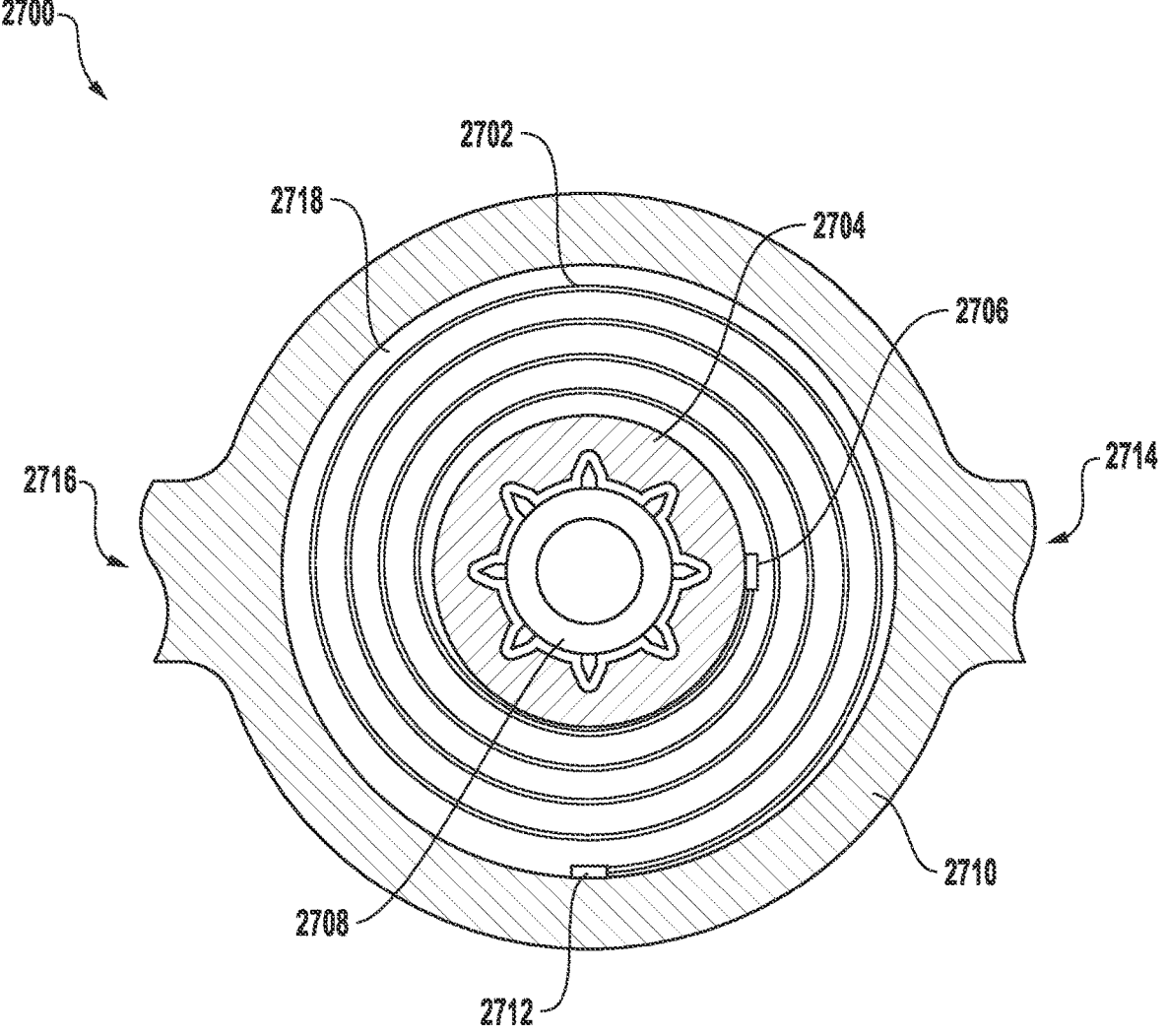
FIG. 33 is a top down view of a main spring within a spring housing arranged to drive the rotation of the second agitator of FIG. 32.

FIG. 33 is a top down view 2700 of a mainspring 2702 arranged to drive the rotation of a second agitator 2710 such as second agitator 2608 of FIG. 32. Mainspring 2702 may reside in a housing 2718 that is formed by and/or attached to second agitator 2710. Mainspring 2702 may be attached via inner end to slipping clutch and/or bridle 2704 at connector 2706. Mainspring 2702 may be attached via an outer ender to second agitator 2710 via connector 2712.

In one configuration, the outer end of mainspring 2702, instead of attaching to the barrel or shaft 2708 or 2610, is attached to a circular expansion ring and/or spring clutch 2704, sometimes called the bridle, that presses against the inner wall of the barrel and/or shaft 2708, which may have serrations or notches to hold the slip clutch 2704. During normal winding, the bridle 2704 holds by friction to the barrel and/or shaft 2708, allowing mainspring 2702 to wind. When mainspring 2702 reaches its full tension, its pull is stronger than the bridle 2704. Further rotation of the mainspring 2702 causes the bridle 2704 to slip along the barrel and/or shaft 2708 or 2610, preventing further winding of mainspring 2702 or 2614. Blade connection regions 2714 and 2716 enable an extension of blades from the second agitator 2710 adjacent to the sidewalls of a container such as container 2602.

In some configurations, the spring housing 2614 resides within a lid of container 2602 substantially adjacent to second agitator 2608. In other configurations, the spring housing 2614, mainspring 2614, and other component within spring housing 2614 may be located substantially adjacent to first agitator 2606 within container 2602. In yet another configuration, spring housing 2614 is located within base 2604. In a further configuration, the spring housing is located within a first agitator housing and/or assembly of the first agitator 2602.

Figure 34:
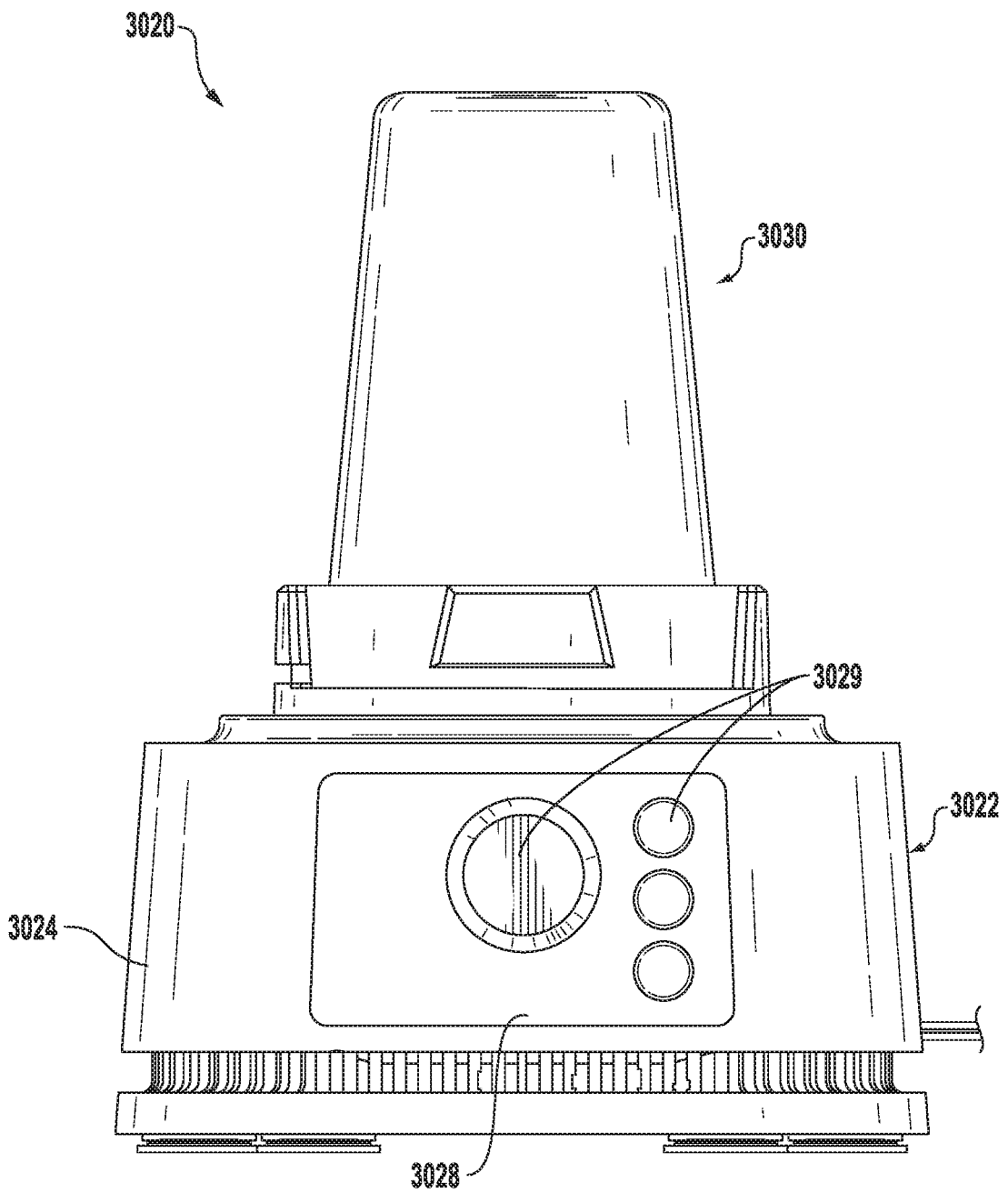
FIG. 34 is a front view of another example of a food processing system.
Figure 35:
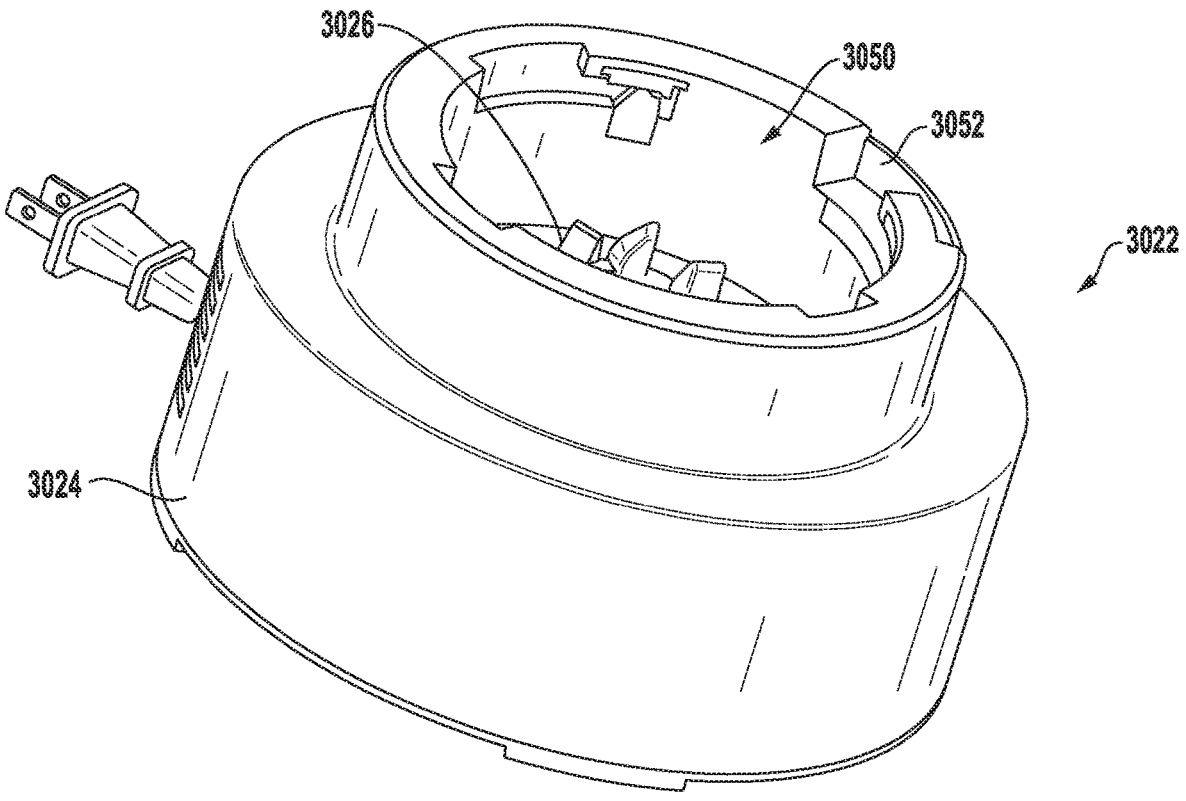
FIG. 35 is a perspective view of an example of a base of the food processing system.

Referring now to FIGS. 34 and 35, an example of a multi-functional food processing system 3020 is illustrated. In general, the food processing system 3020 can be adapted to perform any food processing or blending operation including, without limitation, dicing, chopping, cutting, slicing, mixing, blending, stirring, crushing, or the like. Although the food processing system illustrated and described herein is a personal blender system, other food processing systems are within the scope of the present disclosure.

The food processing system 3020 includes a food processing base 3022 having a body or housing 3024 within which a drive unit (not shown) and at least one controller not shown) are located. The drive unit includes at least one rotary component, such as a drive coupler 3026 (see FIG. 35) for example, driven by a motorized unit (not shown) located within the housing 3024. The food processing base 3022 may additionally include a control panel or user interface 3028 (best shown in FIG. 34) having one or more inputs 3029 for turning the motorized unit on and off and for selecting various modes of operation, such as pulsing, blending, or continuous food processing. However, aspects where the food processing system 3020 does not include a user interface, such as where the food processing system 3020 is operable via an application and aspects where the application of a force to a switch or other component formed in the food processing base 3022 (is sufficient to initiate operation of the motorized unit such as in push to operate systems) for example, are also within the scope of the disclosure. The at least one drive coupler 3026 is configured to engage a portion of an attachment 3030 coupled to the food processing base 3022 for the processing of food products located within an interior of the attachment 3030.

Figure 36:
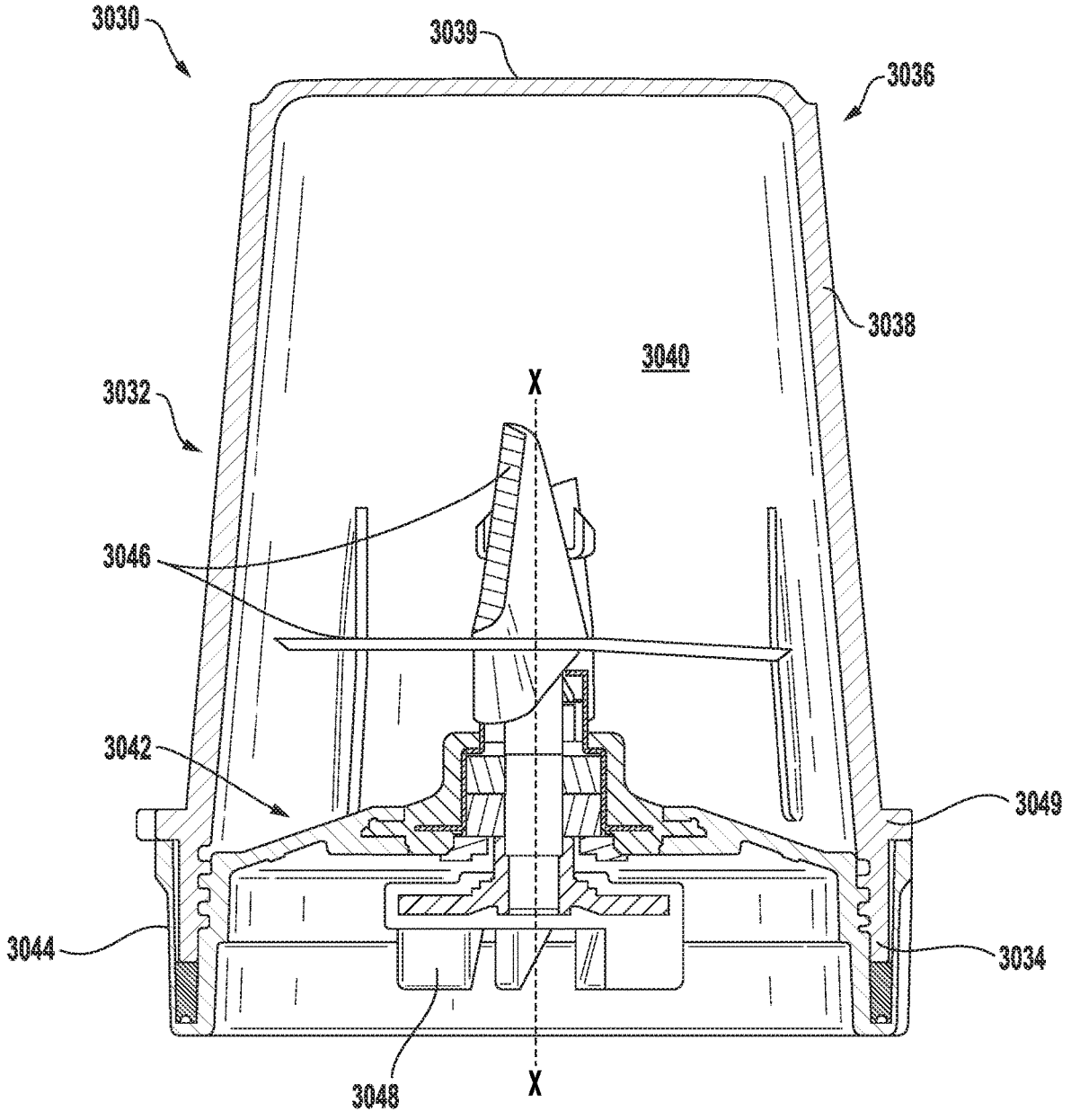
FIG. 36 is a front view of an attachment connectable to the base of the food processing system.
Figure 37:
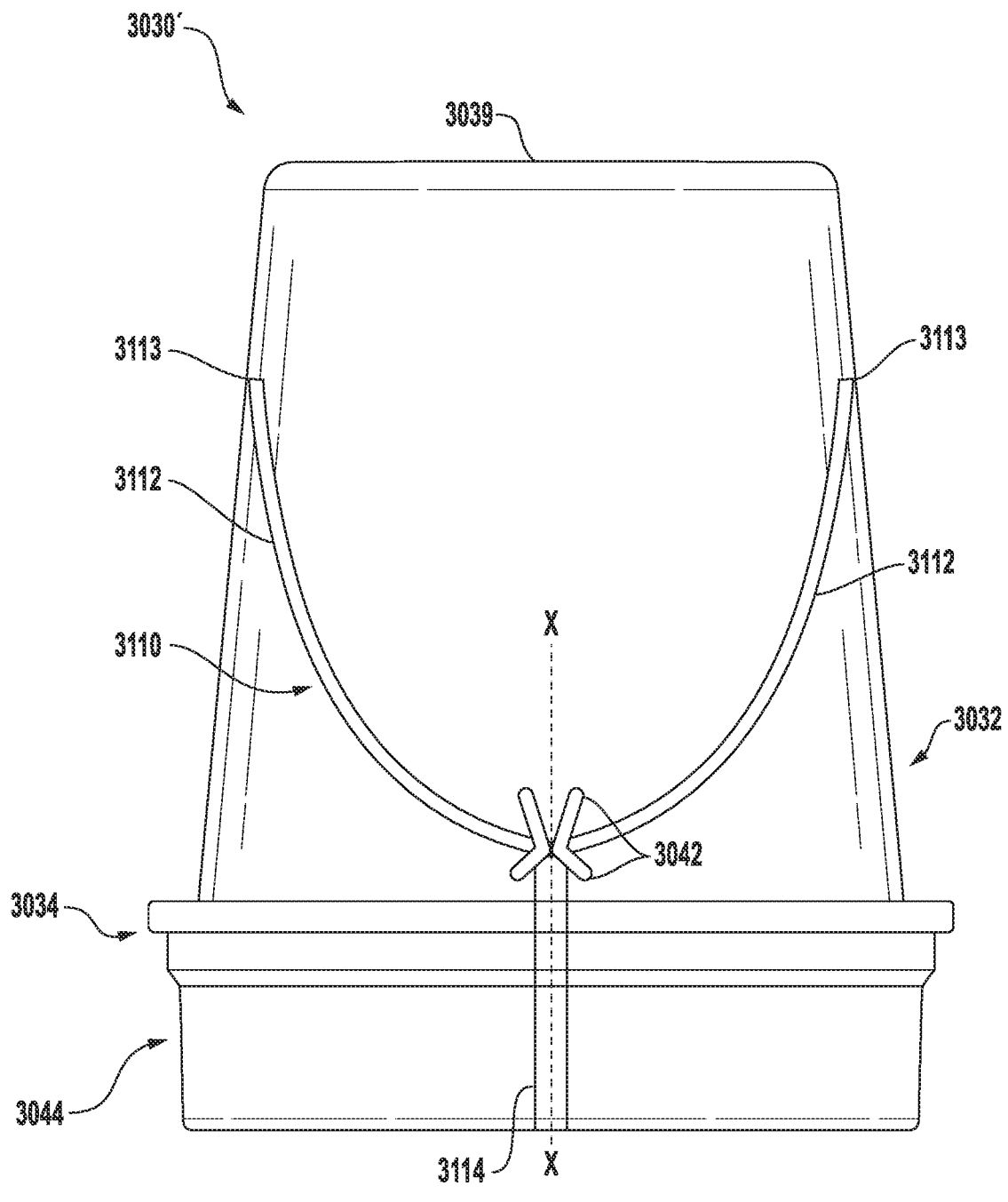
FIG. 37 is a front view of an attachment connectable to the base of the food processing system.

One or more attachments 3030 varying in size and/or functionality may be configured for use with the food processing base 22. An example of an attachment 3030 suitable for use with the food processing base 22 is illustrated in FIGS. 36, 37, 38A, and 39. As shown in FIG. 36, the attachment 3030 includes an inverted jar or container 3032. The container 3032 may include a body having a first open end 3034, a second closed end 3036, and one or more sidewalls 3038 extending between the first end 3034 and the second end 3036. The sidewalls 3038, in combination with one or more of the ends 3034 and 3036 of the container 3032, define a hollow interior or processing chamber 3040 of the container 3032. In some implementations, the container 3032 is a "personal blending container" or "cup" that has a first configuration when separated from the food processing base 3022 and a second inverted configuration when coupled to the food processing base 3022. As shown in FIGS. 36, 37, 38B, the second end 3036 includes an end wall 3039. In some configurations, end wall 3039 is a continuous part of sidewall 3038 forming a unitary structure.

In such configurations, the attachment 3030 further includes a first agitator 3042, having a cutting assembly, configured to removably couple to the first open end 3034 of the container 3032 to seal the processing chamber 3040. In the illustrated implementation, the cutting assembly 3042 includes a body 3044 and one or more blades 3046 rotatable about an X axis relative to the body 3044. When the cutting assembly 3042 is connected to the end 3034 of the container 3032, the first agitator 3042 including the least one blade 3046 is disposed within the processing chamber 3040 of the container 3032. The container 3032 and the cutting assembly 3042 may be threadably coupled together. However, other mechanisms for removably connecting the container 3032 and the cutting assembly 3042, such as a bayonet connection or a clip for example, may be implemented.

In each of the various attachment configurations 3030, 3030', 3030", and 3030"', the cutting assembly 3042 is configured to operably couple to the food processing base 3022 of the food processing system 3020. A driven coupler 3048 (see FIG. 36) associated with the cutting assembly 3042 is positioned at an exterior of the attachment 3030. The at least one drive coupler 3026 is configured to engage the driven coupler 3048 to rotate the at least one blade 3046 about the X axis to process the food products located within the chamber 3040 of the container 3032. It should be understood that the attachment 3030 including an inverted container 3032 and a cutting assembly 3042 is intended as an example only, and that other attachments, are also contemplated herein.

In implementations where the attachments 3030, 3030', 3030", and 3030"' include an inverted container 3032, the attachment 3030 may include one or more contact members 3049 (FIG. 36), such as tabs positioned about the periphery of the attachment 3030.

Attachment 3030, 3030', 3030", or 3030"' may have any number of contact members 3049 is within the scope of the disclosure. In implementations where the attachment 3030, 3030', 3030", or 3030"' includes an inverted container 3032, the contact members 3049 may extend outwardly from the container 3032, the cutting assembly 3042, or both.

The contact members 3049 of the attachment 3030, 3030', 3030", and 3030"' may be configured to cooperate with a mounting area 3050 (see FIG. 35) of the food processing base 3022 to couple the attachments 3030, 3030', 3030", and 3030"' to the food processing base 3022. The mounting area 3050 may include one or more receiving slots 3052 within which each of the plurality of contact members 3049 of the attachments 3030, 3030', 3030", and 3030"' is receivable. The attachments 3030, 3030', 3030", and 3030"' may be configured to slidably connect to the food processing base 3022 of the food processing system 3020. Alternatively, or in addition, the attachment 3030 may be configured to rotatably connect to the food processing base 3022 such that the attachment 3030 is locked relative to the food processing base 3022. However, it should be understood that any suitable mechanism for coupling the attachment to the food processing base 3022 is within the scope of the disclosure.

Figure 38A:
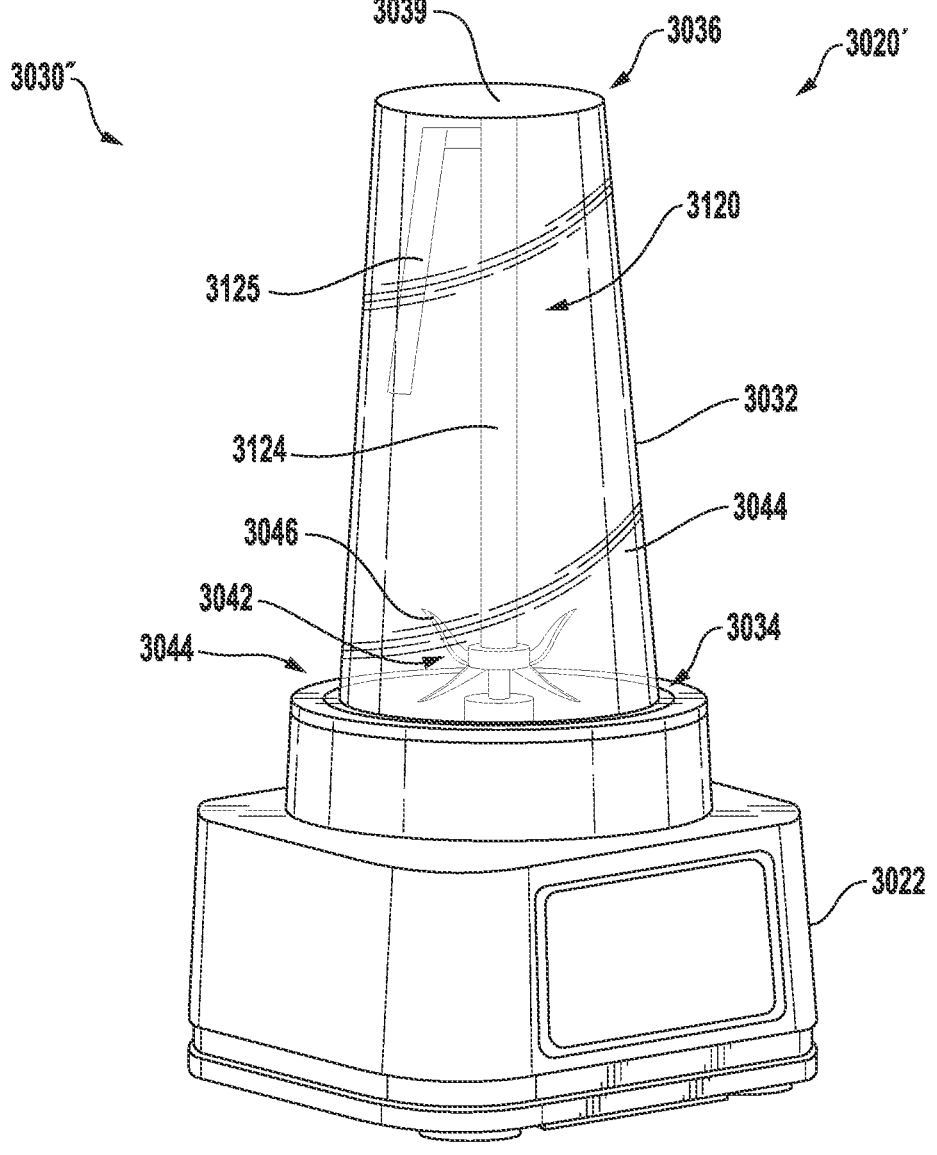
FIG. 38A is a front view of an example of a food processing system.
Figure 38B:
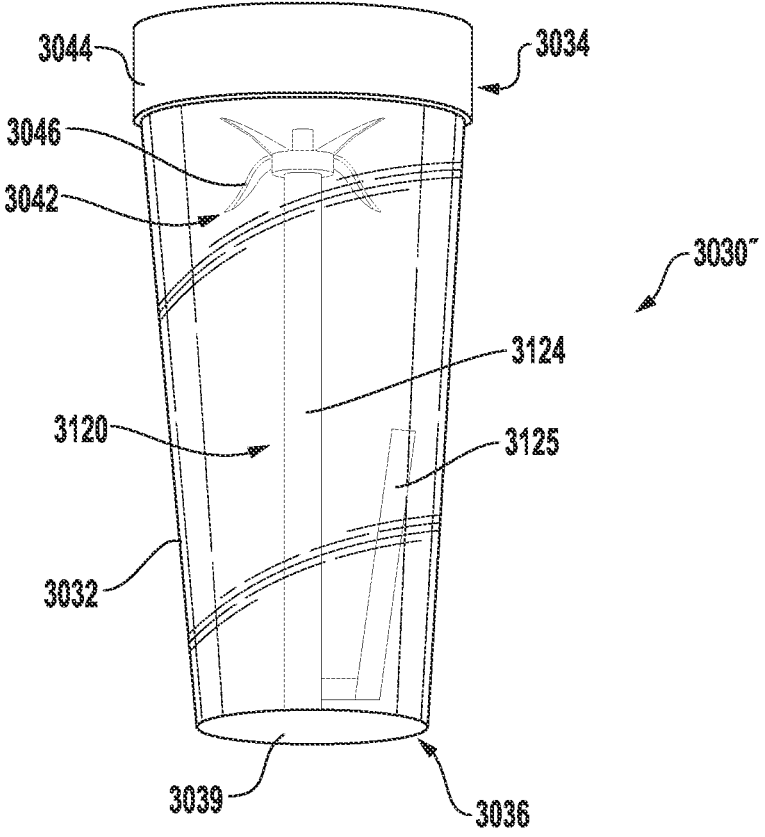
FIG. 38B is a front view of an attachment connectable to the base of the food processing system of FIG. 5A.
Figure 39:
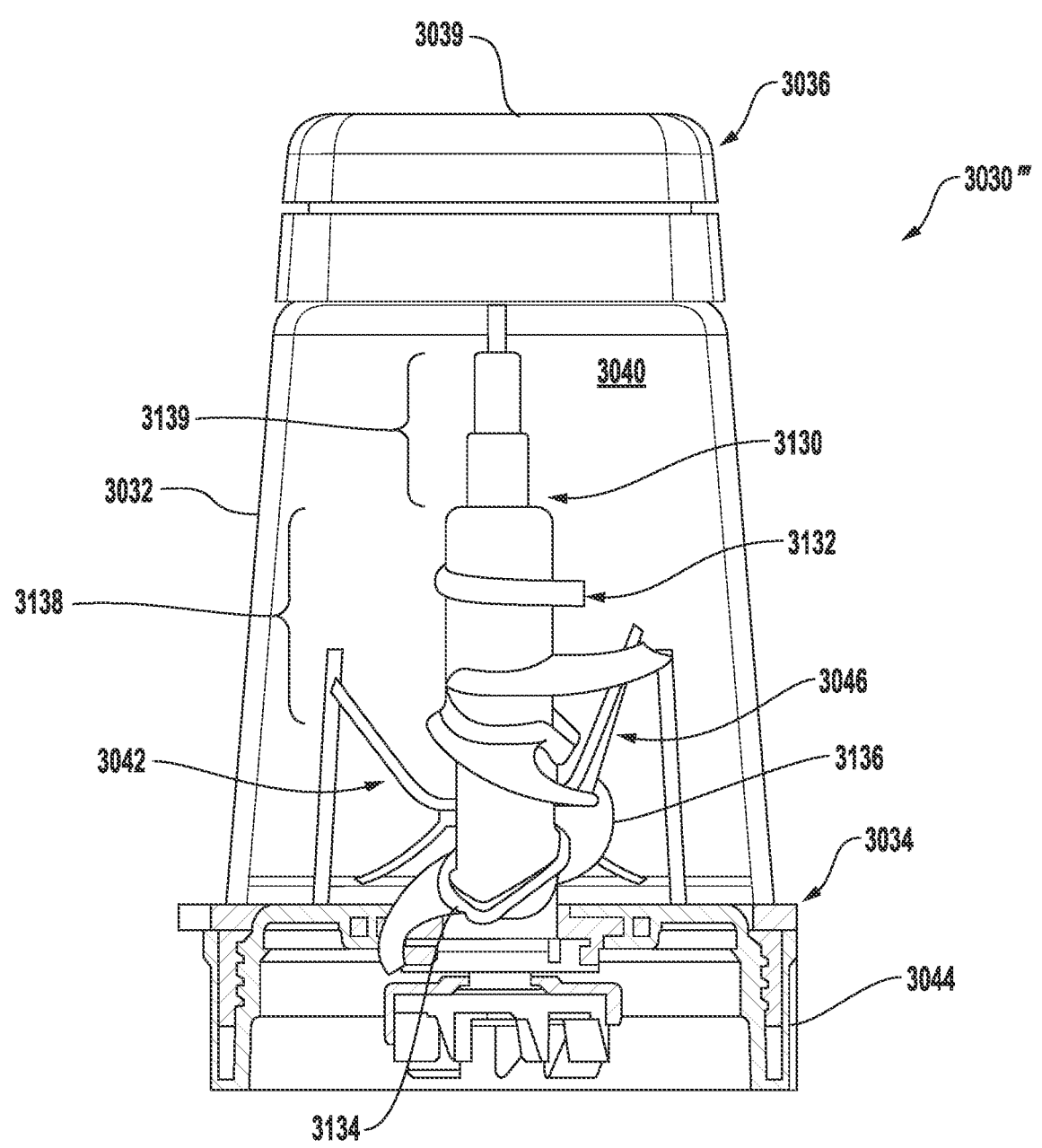
FIG. 39 is a front view of an attachment connectable to the base of the food processing system.

With continued reference to FIGS. 37, 38B and 39, attachment 3030', 3030", and 3030"', similar to attachment 3030, of the food processing system 3020 are arranged to process a thick or frozen mixture. Similar to attachment 3030 of FIG. 36, attachment 3030' incudes a body having a first open end 3034, a second closed end 3036, and one or more sidewalls 3038 extending between the first end 3034 and the second end 3036. The sidewalls 3038, in combination with one or more of the ends 3034 and 3036 of the container 3032, define a hollow interior or processing chamber 3040 of the container 3032. In certain configurations, the container 3032 is a "personal blending container" or "cup" that has a first configuration and/or orientation when separated from the food processing base 3022 and a second inverted configuration and/or orientation when coupled to the food processing base 3022.

Further, the attachment 3030' may include a first agitator 3042, including a cutting assembly, configured to removably couple to the first open end 3034 of the container 3032 to seal the processing chamber 3040. In the illustrated implementation, the cutting assembly 3042 includes a body 3044 and one or more blades 3046 rotatable about an X axis relative to the body 3044. When the cutting assembly (first agitator) 3042 is connected to the end 3034 of the container 3032, the first agitator 3042, including at least one blade 3046, is disposed within the processing chamber 3040 of the container 3032.

As shown in FIG. 37, the attachment 3030' may include a second agitator 3110 which includes one or more flexible sections and/or structures, and is extendable through the container body 3032 and through the first end 3034. The second agitator 3110 may have any length up to the length of the sidewall 3038 and can have any shape. FIG. 37 shows the second agitator 3110 having two paddle-like portions and/or sections 3112 and a drive/shaft 3114 through which it is connectable to the base 3022 of the food processing system 3020. As shown in the implementation of FIG. 37, the first agitator 3042 and the second agitator 3110 are connected to each other and, as a result, both are connected to the base 3022 (not shown) to be able to operate. The attachment of the first agitator 3042 and the second agitator 3110 to the base 3022 is similar to the configuration as explained in connection to FIG. 36. During the operation of the food processing system 3020, the first agitator 3042 is activated and rotates to cut and process the ingredients/food and the second agitator 3110 is also activated, e.g., rotates, to remove/scrape at least a portion of the food which is attached to the sidewall 3038.

In order to better remove the attached food from the sidewall 3038, the second agitator 3110 may extend along the sidewall 3038. As shown in FIG. 37, the paddles 3112 may also contact with the sidewall 3038. Depending on the shape of the second agitator 3110, the second agitator 3110 may contact the sidewall 3038 at one point or several points.

FIG. 37 shows that each paddle 3112 comes into contact with the sidewall 3038 at point 3113. In other implementations, not shown, the second agitator 3110 does not contact the sidewall 3038. However, various configurations, the second agitator 3110 positioned in close proximity to the sidewall 3038 to be able to scrape at least portion of the stuck foods off the sidewall 3038. The second agitator 3110 is also able to stir the food during the operation of the food processing system 3020. As a result, these features of the second agitator 3110 enable the food processing system 3020 to better process food to achieve a more uniform product. The second agitator 3110 may operate simultaneously with the first agitator 3042 during food processing operations. However, in some configurations, the agitator 3120 may operate in intervals or during a portion of the operation of the first agitator 3042.

FIG. 38A shows food processing system 3020' with attachment 3030" having an exemplary second agitator 3120. Similar to attachment 3030' of FIG. 37, the attachment 3030" incudes a body having a first open end 3034, a second closed end 3036, and one or more sidewalls 3038 extending between the first end 3034 and the second end 3036. The sidewalls 3038, in combination with one or more of the ends 3034 and 3036 of the container 3032, define a hollow interior or processing chamber 3040 of the container 3032. Similarly, the attachment 3030" includes a first agitator 3042, having a cutting assembly, configured to removably couple to the first open end 3034 of the container 3032 to seal the processing chamber 3040. In the illustrated implementation, the cutting assembly 3042 includes a body 3044 and one or more blades 3046 rotatable about an X axis relative to the body 3044. When the cutting assembly 3042 is connected to the end 3034 of the container 3032, the first agitator 3042, including the least one blade 3046, is disposed within the processing chamber 3040 of the container 3032.

As shown in FIGS. 38A-38B, the attachment 3030" includes a second agitator 3120 which is flexible and extendable through the container body 3032 through the first end 3034. The second agitator 3120 has a drive assembly and/or shaft 3124 through which it is connectable to the base 3022 of the food processing system 3020'. The first agitator 3042 and the second agitator 3120 are connected to each other and, as a result, both are connected to the base 3022 to enable their operation via the motorized unit (explained in relation to FIG. 35) of the food processing system 3020' (not shown). The drive/shaft 3124 may have a length approximately the same as the length of the container body 3032. In some configurations, the length of the drive/shaft 3120 is less than the length of the container body 3032. The second agitator 3120 may include one paddle 3125 which rotates during at least a part of the operation of the first agitator and/or cutting assembly 3042 to remove food from the sidewall 3038. As a result, the food moves toward the center of the chamber 3040 and cutting assembly 3042 to be processed and achieving more uniform processed food. As stated above in connection to FIG. 37, the paddle 3125 may extend along the sidewall 3038 and have a very small distance from the sidewall 3038. In some configurations, the paddle 3125 may contact the sidewall 3038.

FIG. 39 illustrates an attachment 3030''' with a second agitator 3130. The attachment 3030''' is similar to attachments 3030, 3030', and 3030" meaning that is has a similar container body 3032 and first agitator 3042. The second agitator 3130 of the attachment 3030''' is connected to the base 3022 and to the first agitator 3042 at the first end 3034 by an attachment 3134 to enable the motorized unit of the food processing system 3020 to rotate both first agitator 3042 and second agitator 3130. As shown in FIG. 39, the second agitator 3130 is extendable through the container body 3032 and includes a spiral structure 3132. The second agitator 3130 may be configured in various lengths. For example, it may be in any range as small as ¼ of the length of the container body 3032 up to the length of the container body 3032. The spiral structure 3132 of the second agitator 3130 assists in removing at least a portion of a food attached to the sidewall 3038 by providing a turbulent flow of food materials in the container body 3032 during operation of the food processing system 3020. In some implementations, the second agitator 3130 is configured to stir food during the operation of the food processing system 3020.

Figure 40C:
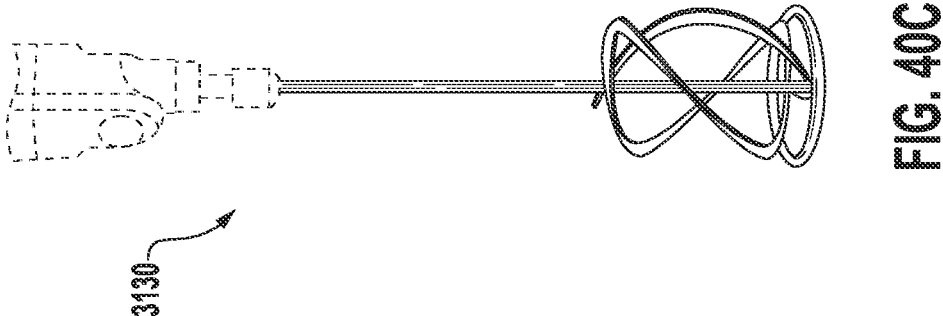
FIGS. 40A-40C are examples of a second agitator of an attachment connectable to the base of the food processing system of FIG. 39.
Figure 40B:
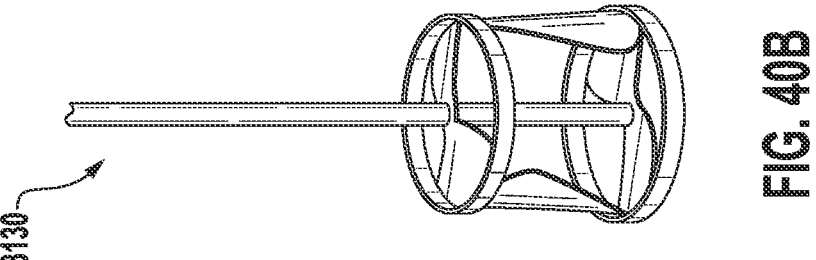
Figure 40A:
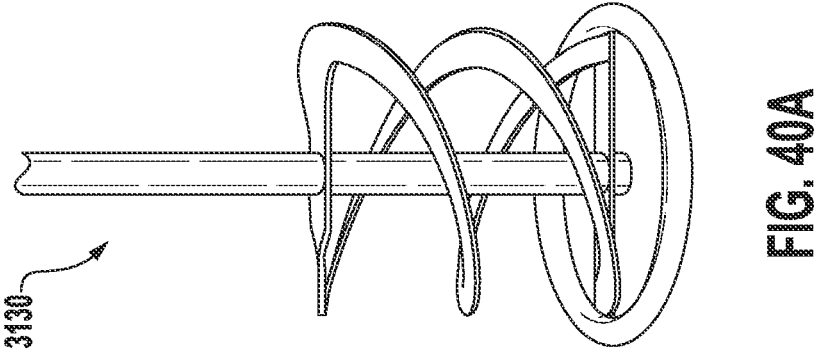

As shown in FIG. 39, the second agitator 3130 may have three different sections, a first portion 3136 close to the first end 3034, a middle portion 3138 having the spiral structure 3132, and a third portion 3139 close to the second end 3036. In some configurations, the second agitator 3130 includes a spiral structure which extends from near first end 3034 to near second end 3036. In some implementations, the spiral structure 3132 has a larger diameter near the first end 3034 and smaller diameter near the second end 3036. Further, a diameter of the spiral structure 3132 may increase from the first end 3034 as it extends toward the second end 3036. In other implementations, a diameter of the spiral structure 3132 may decrease from the first end 3034 as it extends toward the second end 3036. Examples of various configurations of a second agitating member 3130 are illustrated in FIGS. 40A-40C. As shown, the second agitator 3130 may have any spiral or helical structure with any suitable length in order to produce turbulent flow during the operation of the food processing system 3020 to remove stuck food from the sidewall 3038 and/or stir food in chamber 3040 while the cutting assembly 3042 operates. This result to a more uniform processed food.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Elements or steps of different implementations described may be combined to form other implementations not specifically set forth previously. Elements or steps may be left out of the systems or processes described previously without adversely affecting their operation or the operation of the system in general. Furthermore, various separate elements or steps may be combined into one or more individual elements or steps to perform the functions described in this specification.

Other implementations not specifically described in this specification are also within the scope of the following claims.

What is claimed is:

1. An attachment for use with a food processing system, comprising:

a container body having a sidewall, a first end configured to be mounted to a food processing base, and a second end remote from the first end, the first end being open and the second end being at least partially closed;

a first agitator including one or more blades configured to directly contact and process food within the container body; and a second agitator including one or more flexible sections and being extendable through the container body, wherein the one or more flexible sections extend along the sidewall of the container body, wherein the first agitator and the second agitator are connected to each other and are receivable at the first end.

2. The attachment of claim 1, wherein the second end of the container body is entirely closed to a surrounding environment.

3. The attachment of claim 1, wherein the second end including an end wall oriented transverse to said sidewall.

4. The attachment of claim 1, wherein the one or more flexible sections of the second agitator include at least one paddle.

5. The attachment of claim 4, wherein the at least one paddle is in contact with the sidewall.

6. The attachment of claim 1, wherein the second agitator is configured to remove at least a portion of a food attached to the sidewall during operation of the food processing system.

7. The attachment of claim 1, wherein the second agitator is configured to stir a food during the operation of the food processing system.

8. The attachment of claim 1, further comprising a motor to activate the first agitator and the second agitator.

9. The attachment of claim 8, wherein the first agitator and the second agitator operate simultaneously.

* * * * *